(12) United States Patent
Nie et al.

(10) Patent No.: US 11,214,718 B2
(45) Date of Patent: Jan. 4, 2022

(54) ABRASIVE PARTICLES WITH VITRIFIED BOND AND FILLER

(71) Applicant: SAINT-GOBAIN CERAMICS & PLASTICS, INC., Worcester, MA (US)

(72) Inventors: Pinxu Nie, Shanghai (CN); Shuqiong Liang, Shanghai (CN)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 0 days.

(21) Appl. No.: 15/857,041

(22) Filed: Dec. 28, 2017

(65) Prior Publication Data

US 2018/0187058 A1 Jul. 5, 2018

Related U.S. Application Data

(60) Provisional application No. 62/450,231, filed on Jan. 25, 2017.

(30) Foreign Application Priority Data

Dec. 29, 2016 (CN) .......................... 201611246800.7

(51) Int. Cl.
| | |
|---|---|
| *C09K 3/14* | (2006.01) |
| *C01F 7/02* | (2006.01) |
| *C01G 25/02* | (2006.01) |
| *C04B 35/111* | (2006.01) |
| *C04B 35/628* | (2006.01) |

(Continued)

(52) U.S. Cl.
CPC .............. *C09K 3/1445* (2013.01); *C01F 7/02* (2013.01); *C01G 25/02* (2013.01); *C04B 35/119* (2013.01); *C04B 35/1115* (2013.01); *C04B 35/628* (2013.01); *C04B 35/62805* (2013.01); *C04B 35/62828* (2013.01); *C04B 35/62886* (2013.01); *C04B 41/00* (2013.01); *C01P 2004/60* (2013.01)

(58) Field of Classification Search
None
See application file for complete search history.

(56) References Cited

U.S. PATENT DOCUMENTS

| | | |
|---|---|---|
| 1,910,444 A | 5/1933 | Nicholson |
| 2,527,044 A | 10/1950 | Walton et al. |
| 4,278,449 A | 7/1981 | Helletsberger et al. |

(Continued)

FOREIGN PATENT DOCUMENTS

| | | |
|---|---|---|
| CN | 1537082 A | 10/2004 |
| CN | 1662626 A | 8/2005 |

(Continued)

OTHER PUBLICATIONS

International Search Report and Written Opinion for PCT/US2017/068727, dated Apr. 23, 2018, 14 pages.

(Continued)

*Primary Examiner* — Ronak C Patel
(74) *Attorney, Agent, or Firm* — Abel Schillinger, LLP; Adrian Lawrence

(57) ABSTRACT

An abrasive particle having a body and a coating overlying the body, the coating including an amorphous material and at least one filler contained within the amorphous material. The abrasive particle may be included in a fixed abrasive article.

16 Claims, 35 Drawing Sheets

(51) Int. Cl.
*C04B 35/119* (2006.01)
*C04B 41/00* (2006.01)

(56) References Cited

U.S. PATENT DOCUMENTS

| | | |
|---|---|---|
| 4,472,173 A | 9/1984 | Bruening et al. |
| 4,951,427 A | 8/1990 | St. Pierre |
| 5,213,591 A | 5/1993 | Celikkaya et al. |
| 5,633,084 A | 5/1997 | Hiraiwa et al. |
| 6,066,189 A | 5/2000 | Meyer et al. |
| 6,797,023 B2 | 9/2004 | Knapp et al. |
| 6,811,582 B1 | 11/2004 | Wurzer et al. |
| 7,803,203 B2 | 9/2010 | De Rege Thesauro et al. |
| 7,959,695 B2 | 6/2011 | Yener et al. |
| 8,491,681 B2 | 7/2013 | Chuda et al. |
| 8,864,862 B2 | 10/2014 | Gebhardt |
| 9,074,119 B2 | 7/2015 | Panzarella et al. |
| 9,193,631 B2 | 11/2015 | Marlin et al. |
| 9,200,187 B2 | 12/2015 | Bauer et al. |
| 2003/0126804 A1 | 7/2003 | Rosenflanz et al. |
| 2007/0181535 A1* | 8/2007 | De Rege Thesauro .. C09G 1/02 216/89 |
| 2008/0168717 A1 | 7/2008 | Can et al. |
| 2009/0235591 A1* | 9/2009 | Yener .................... B24D 11/00 51/308 |
| 2011/0053478 A1 | 3/2011 | Marlin et al. |
| 2012/0077419 A1* | 3/2012 | Zhang ................ C01F 17/206 451/36 |
| 2012/0186161 A1 | 7/2012 | Marlin et al. |
| 2013/0337262 A1* | 12/2013 | Bauer ................. C09K 3/1409 428/402 |
| 2015/0068130 A1 | 3/2015 | Louapre et al. |
| 2015/0113882 A1 | 4/2015 | Tumavitch et al. |
| 2015/0118845 A1* | 4/2015 | Noller .................... C09G 1/02 438/693 |
| 2015/0217428 A1 | 8/2015 | Provow et al. |
| 2015/0291865 A1* | 10/2015 | Breder ................. C09K 3/1409 51/309 |
| 2016/0289520 A1* | 10/2016 | Bujnowski ........... C09K 3/1409 |
| 2020/0139511 A1 | 5/2020 | Yan et al. |

FOREIGN PATENT DOCUMENTS

| | | |
|---|---|---|
| CN | 101412902 A | 4/2009 |
| CN | 101506325 A | 8/2009 |
| CN | 101801610 A | 8/2010 |
| CN | 101977877 A | 2/2011 |
| CN | 102015211 A | 4/2011 |
| CN | 104540639 A | 4/2015 |
| CN | 104736298 A | 6/2015 |
| CN | 104994995 A | 10/2015 |
| EP | 0161578 A2 | 4/1985 |
| JP | S5831241 U | 3/1983 |
| JP | S58031241 U | 3/1983 |
| JP | H01113485 A | 5/1989 |
| JP | H06154440 A | 6/1994 |
| JP | H08112765 A | 5/1996 |
| JP | H11188635 A | 7/1999 |
| JP | 2001252860 A | 9/2001 |
| JP | 2002264020 A | 9/2002 |
| JP | 2003513145 A | 4/2003 |
| JP | 2009096993 A | 5/2009 |
| JP | 2013501121 A | 1/2013 |
| JP | 2015503460 A | 2/2015 |
| JP | 2016528330 A | 9/2016 |
| TW | 201043686 A | 12/2010 |
| WO | 9402562 A1 | 2/1994 |
| WO | 2007088461 A1 | 8/2007 |
| WO | 2016003439 A1 | 1/2016 |

OTHER PUBLICATIONS

JIS Handbook Tool 2009, Japanese Standards Association, ISBN 978-4-542-17678-2, dated 2009, 16 pages.

* cited by examiner

ABRASIVE PARTICLES WITH VITRIFIED BOND AND FILLER

CROSS-REFERENCE TO RELATED APPLICATIONS

This application claims priority to Chinese Patent Application No. 201611246800.7, filed Dec. 29, 2016, entitled "AN ABRASIVE PARTICLE, A FIXED ABRASIVE ARTICLE AND A METHOD OF FORMING THE FIXED ABRASIVE ARTICLE," by Pinxu Nie, which is assigned to the current assignee hereof and incorporated herein by reference in its entirety. This application further claims priority under 35 U.S.C. § 119(e) to U.S. Provisional Patent Application No. 62/450,231, filed Jan. 25, 2017, entitled "ABRASIVE PARTICLES WITH VITRIFIED BOND AND FILLER," by Pinxu Nie, which is assigned to the current assignee hereof and incorporated herein by reference in its entirety.

BACKGROUND

Field of the Disclosure

The following is directed to fixed abrasive articles, and more particularly, to fixed abrasive articles including abrasive particles and a coating that includes an amorphous phase and a filler.

Description of the Related Art

Abrasive articles incorporating abrasive particles are useful for various material removal operations including grinding, finishing, polishing, and the like. Depending upon the type of abrasive material, such abrasive particles can be useful in shaping or grinding various materials in the manufacturing of goods. Certain types of abrasive particles have been formulated to date that have particular geometries, such as triangular shaped abrasive particles and abrasive articles incorporating such objects. See, for example, U.S. Pat. Nos. 5,201,916; 5,366,523; and 5,984,988.

Previously, three basic technologies that have been employed to produce abrasive particles having a specified shape are fusion, sintering, and chemical ceramic. In the fusion process, abrasive particles can be shaped by a chill roll, the face of which may or may not be engraved, a mold into which molten material is poured, or a heat sink material immersed in an aluminum oxide melt. See, for example, U.S. Pat. No. 3,377,660. In sintering processes, abrasive particles can be formed from refractory powders having a particle size of up to 10 micrometers in diameter. Binders can be added to the powders along with a lubricant and a suitable solvent to form a mixture that can be shaped into platelets or rods of various lengths and diameters. See, for example, U.S. Pat. No. 3,079,242. Chemical ceramic technology involves converting a colloidal dispersion or hydrosol (sometimes called a sol) to a gel or any other physical state that restrains the mobility of the components, drying, and firing to obtain a ceramic material. See, for example, U.S. Pat. Nos. 4,744,802 and 4,848,041.

The industry continues to demand improved abrasive materials and abrasive articles.

BRIEF DESCRIPTION OF THE DRAWINGS

The present disclosure may be better understood, and its numerous features and advantages made apparent to those skilled in the art by referencing the accompanying drawings.

DETAILED DESCRIPTION

In accordance with an embodiment an abrasive particle is disclosed. The abrasive particle may be suitable for material removal operations on a variety of workpieces including for example metal or metal alloy materials and other non-metal materials. The abrasive particle of the embodiments herein may be incorporated into a fixed abrasive article such as a bonded abrasive article or coated abrasive article, and more particularly, a thin wheel, a cut-off wheel, a chop saw, a roll mill grinding wheel, a centerless grinding wheel, a grinding belt, a flap disc, and the like. Such products may be particularly suitable for material removal operations including for example, grinding, cutting, dicing, and the like.

Figure 1:
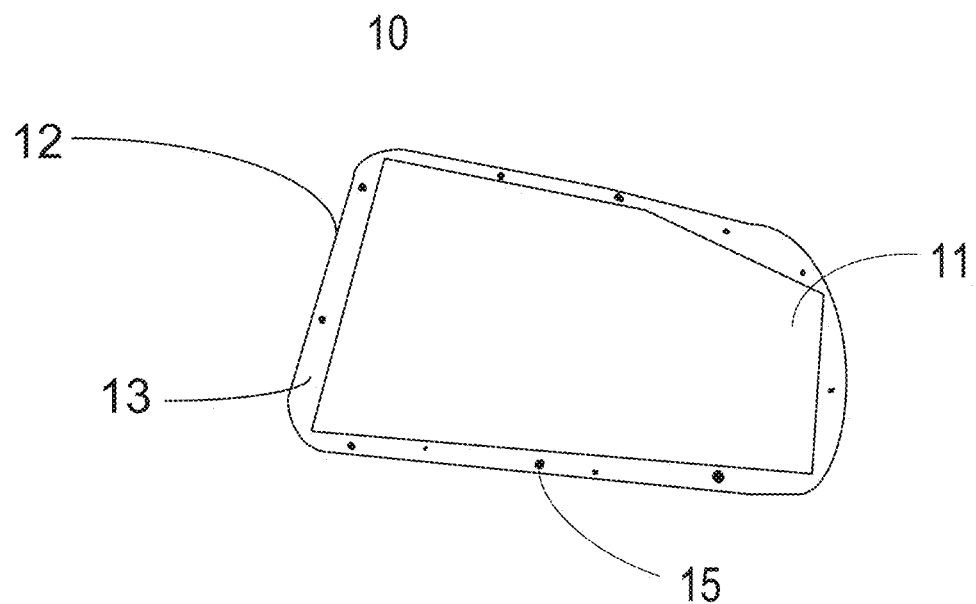
FIG. 1 includes a cross section illustration of an abrasive particle according to an embodiment.

FIG. 1 includes an illustration of an example abrasive particle according to embodiments described herein. As shown in FIG. 1, an abrasive particle 10 can have a body 11 and a coating 12 overlying the body. The coating 12 can include an amorphous material 13 and at least one filler 15. The filler 15 may be one or more phases that are distinct from the amorphous material 13. According to an aspect, the filler 15 may be partially contained in the coating 12. In a further aspect, the filler 15 may be entirely contained in the coating 12.

In certain embodiments, the body 11 can be a shaped abrasive grain, such as that formed from a dispersion or gel. In other embodiments, the body 11 can be an unshaped abrasive grain, such as that formed by crushing and sieving of bulk material. In further embodiments, there can be multiple bodies 11 including a combination of shaped and unshaped abrasive grains.

In certain aspects, the body may include alumina, zirconia, or a combination of alumina and zirconia. In a further aspect, the body 11 may consist essentially of alumina and zirconia. In another aspect, the body 11 may consist essentially of alumina. As used herein, to "consist essentially" of one material or combination of materials means that the amount of other materials present, if any, is not sufficient to alter the properties of the abrasive particle 10. For example, the body 11 may be considered to "consist essentially" of a material if any impurities present are in an amount lower than that which would alter the properties of the body 11, and thus the body 11 would be considered to consist essentially of such material. For example, for certain materials the quantity may be greater than 99.9 wt. %. Furthermore, in certain instances the abrasive particle 10 may consist entirely of a material. In contrast to "consist essentially" of, "consist entirely" of a material means 100 wt. % of that material.

In other aspects, the body 11 can have not greater than 75 wt. % alumina for the total weight of the body 11, or not greater than 70 wt. %, or not greater than 65 wt. %, or not greater than 60 wt. %, or not greater than 59 wt. %, or not greater than 58 wt. %, or not greater than 57 wt. %, or not greater than 56 wt. %, or not greater than 55 wt. %, or not greater than 54 wt. %, or not greater than 53 wt. %, or not greater than 52 wt. %, or not greater than 51 wt. %, or not greater than 50 wt. %, or not greater than 49 wt. %, or not greater than 48 wt. %, or not greater than 47 wt. %, or not greater than 46 wt. %, or not greater than 45 wt. %, or not greater than 44 wt. %, or not greater than 43 wt. %, or not greater than 42 wt. %, or not greater than 40 wt. %. In still other aspects, the body 11 can have at least 35 wt. % alumina for the total weight of the body 11, or at least 40 wt. %, or at least 42 wt. %, or at least 43 wt. %, or at least 44 wt. %, or at least 45 wt. %, or at least 46 wt. %, or at least 47 wt. %, or at least 48 wt. %, or at least 49 wt. %, or at least 50 wt. %, or at least 51 wt. %, or at least 52 wt. %, or at least 53 wt. %, or at least 54 wt. %, or at least 55 wt. %, or at least 56 wt. %, or at least 57 wt. %, or at least 58 wt. %, or at least 59 wt. %, or at least 60 wt. %, or at least 65 wt. %, or at least 70 wt. %. It will be appreciated that the body 11 may have an alumina content within a range between any of the minimum and maximum values noted above. It will be further appreciated that the body 11 may have an alumina content of any value between any of the minimum and maximum values noted above.

In other aspects, the body 11 can have not greater than 60 wt. % zirconia for a total weight of the body 11, or not greater than 50 wt. %, or not greater than 49 wt. %, or not greater than 48 wt. %, or not greater than 47 wt. %, or not greater than 46 wt. %, or not greater than 45 wt. %, or not greater than 44 wt. %, or not greater than 43 wt. %, or not greater than 42 wt. %, or not greater than 41 wt. %, or not greater than 40 wt. %, or not greater than 39 wt. %, or not greater than 38 wt. %, or not greater than 37 wt. %, or not greater than 36 wt. %, or not greater than 35 wt. %, or not greater than 34 wt. %, or not greater than 33 wt. %, or not greater than 32 wt. %, or not greater than 31 wt. %, or not greater than 30 wt. %. In still other aspects, the body 11 can have at least 20 wt. % zirconia for a total weight of the body 11, or at least 30 wt. %, or at least 31 wt. %, or at least 32 wt. %, or at least 33 wt. %, or at least 34 wt. %, or at least 35 wt. %, or at least 36 wt. %, or at least 37 wt. %, or at least 38 wt. %, or at least 39 wt. %, or at least 40 wt. %, or at least 41 wt. %, or at least 42 wt. %, or at least 43 wt. %, or at least 44 wt. %, or at least 45 wt. %, or at least 46 wt. %, or at least 47 wt. %, or at least 48 wt. %, or at least 49 wt. %, or at least 50 wt. %. It will be appreciated that the body 11 may have a zirconia content within a range between any of the minimum and maximum values noted above. It will be further appreciated that the body 11 may have a zirconia content of any value between any of the minimum and maximum values noted above. It will also be appreciated that hafnia ($HfO_2$) is not typically chemically dissociable of zirconia. Accordingly, hafnia may be naturally present in the sources of zirconia at contents generally lower than 2%.

According to still another aspect, the body 11 may include a particular combination of alumina and zirconia. For example, the body 11 may include about 60 wt. % alumina and about 40 wt. % zirconia for a total weight of the body 11. According to another aspect, the body may include about 75 wt. % alumina and 25 wt. % zirconia for a total weigh of the body 11.

In another particular aspect, the body 11 may include an additive of less than about 10 wt. % of the body 11. The additive can include yttrium oxide, titanium oxide, magnesium oxides, calcium oxide, rare earth oxides, or any combination thereof. The rare earth oxides can include oxides of neodymium, lanthanum, cerium, dysprosium, erbium, or any combination thereof. Particularly, the body 11 can include between about 0.1 wt. % and about 1.2 wt. %, such as between about 0.4 wt. % and 0.6 wt. %, of $Y_2O_3$. Further, the body 11 can include less than about 3.0 wt. % $TiO_2$, less than about 0.4 wt. % $SiO_2$, and less than about 1.2 wt. % impurities. Further, the $TiO_2$ can be in an amount of less than about 0.5 wt. %, such as less than about 0.2 wt. %, even less than about 0.15 wt. %. Generally, when $TiO_2$ is present, the $TiO_2$ can be in an amount of at least about 0.01 wt. %.

In another aspect, the body 11 can be substantially free of nitrides, borides, or any combination of nitrides and borides. In a further aspect, the body 11 can be substantially free of metals, metal alloys, or any combination of metals and metal alloys. As used herein, "substantially free" of a substance means that the amount of the substance present, if any, is not sufficient to alter the properties of the abrasive particle 10. For example, impurity contents of material may be considered present but not present in an amount that would alter the properties of the abrasive particle 10, and thus the abrasive particle 10 would be considered substantially free of such material. For example, for certain materials the quantity may be not greater than 0.1 wt. %. Furthermore, in certain instances the abrasive particle 10 may be absolutely free of a material. In contrast to "substantially free" of, "free" of a material means 0 wt. % of that material.

The body 11 of the abrasive particle 10 can have a particular size that can be described as a median particle size (D50). In the case of one body, the median particle size (D50) is the longest dimension of the body 11 as measured from one point on the surface of the body 11 to another point on the surface of the body 11. If there are more than one body, the median particle size (D50) is the median value of the particle size of each body.

In some aspects, the body 11 can have a median particle size (D50) of not greater than 40000 microns or not greater than 30000 microns or not greater than 20000 microns or not greater than 10000 microns or not greater than 5000 microns or not greater than 4000 microns or not greater than 3000 microns or not greater than 2000 microns or not greater than 1000 microns or not greater than 500 microns or not greater than 200 microns or not greater than 100 microns or not greater than 80 microns or not greater than 50 microns or not greater than 40 microns or not greater than 20 microns or not greater than 10 microns. In other aspects, the body 11 can have a median particle size (D50) of at least 1 micron or at least 5 microns or at least 10 microns or at least 20 microns or at least 40 microns or at least 50 microns or at least 80 microns or at least 100 microns or at least 200 microns or at least 500 microns or at least 1000 microns or at least 2000 microns or at least 3000 microns or at least 4000 microns or at least 5000 microns or at least 10000 microns or at least 20000 microns or at least 30000 microns. It will be appreciated that the body 11 may have a median particle size (D50) within a range between any of the minimum and maximum values noted above. It will be further appreciated that the body 11 may have a median particle size (D50) of any value between any of the minimum and maximum values noted above.

The coating 12 may cover the entire outer surface of the body 11. In other embodiments, the coating 12 may cover a certain portion of the outer surface of the body 11. For example, the coating 12 may cover a majority of the outer surface of the body 11. In particular embodiments, the coating 12 can cover not greater than 99% of the outer surface of the body 11 or not greater than 98% or not greater than 97% or not greater than 96% or not greater than 95% or not greater than 90% or not greater than 85% or not greater than 80% or not greater than 75% or not greater than 70% or not greater than 65% or not greater than 60% or not greater than 55% or not greater than 50% or not greater than 45% or not greater than 40% or not greater than 35% or not greater than 30% or not greater than 25% or not greater than 20% or not greater than 15% or not greater than 10%. In further embodiments, the coating 12 can cover at least 1% of the outer surface of the body 11 or at least 2% or at least 3% or at least 4% or at least 5% or at least 10% or at least 15% or at least 20% or at least 25% or at least 30% or at least 35% or at least 40% or at least 45% or at least 50% or at least 55% or at least 60% or at least 65% or at least 70% or at least 75% or at least 80% or at least 85% or at least 90% or at least 95% or at least 96% or at least 97% or at least 98% or at least 99%. It will be appreciated that the coating 12 may cover a portion of the outer surface of the body 11 within a range between any of the minimum and maximum values noted above. It will be further appreciated that the coating 12 may cover a portion of the outer surface of the body 11 between any of the minimum and maximum values noted above.

In one aspect, the coating 12 may be present in a particular quantity, such as a weight relative to the weight of the abrasive particle 10. In particular aspects, the weight of the coating 12 can be not greater than 10 wt. % of the total weight of the abrasive particle 10 including the body 11 and the coating 12 or not greater than 9 wt. % or not greater than 8 wt. % or not greater than 7 wt. % or not greater than 6 wt. % or not greater than 5 wt. % or not greater than 4 wt. % or not greater than 3 wt. % or not greater than 2 wt. % or not greater than 1.5 wt. % or not greater than 1 wt. %. In further aspects, the weight of the coating 12 can be at least 0.1 wt. % of the weight of the abrasive particle 10 including the body 11 and the coating 12 or at least 0.5 wt. % or at least 1 wt. % or at least 1.5 wt. % or at least 2 wt. % or at least 2.5 wt. % or at least 3 wt. % or at least 4 wt. % or at least 5 wt. % or at least 6 wt. % or at least 7 wt. % or at least 8 wt. % or at least 9 wt. %. It will be appreciated that the weight of the coating 12 relative to the total weight of the abrasive particle 10 may be within a range between any of the minimum and maximum values noted above. It will be further appreciated that the weight of the coating 12 relative to the total weight of the abrasive particle 10 may be between any of the minimum and maximum values noted above.

In one aspect, the coating 12 can have a particular softening point. As used herein, "softening point" refers to the temperature at which the coating 12 is sufficiently soft that adjacent abrasive particles agglomerate without applying external pressure. In particular aspects, the coating 12 can have a softening point of not greater than 700° C. or not greater than 690° C. or not greater than 680° C. or not greater than 670° C. or not greater than 660° C. or not greater than 650° C. or not greater than 640° C. or not greater than 630° C. or not greater than 620° C. or not greater than 610° C. or not greater than 600° C. or not greater than 590° C. or not greater than 580° C. or not greater than 570° C. or not greater than 560° C. or not greater than 550° C. or not greater than 540° C. or not greater than 530° C. or not greater than 520° C. or not greater than 510° C. or not greater than 500° C. or not greater than 490° C. or not greater than 480° C. or not greater than 470° C. or not greater than 460° C. or not greater than 450° C. In further aspects, the coating 12 can have a softening point of at least 400° C. or at least 410° C. or at least 420° C. or at least 430° C. or at least 440° C. or at least 450° C. or at least 460° C. or at least 470° C. or at least 480° C. or at least 490° C. or at least 500° C. or at least 510° C. or at least 520° C. or at least 530° C. or at least 540° C. or at least 550° C. or at least 560° C. or at least 570° C. or at least 580° C. or at least 590° C. or at least 600° C. or at least 610° C. or at least 620° C. or at least 630° C. or at least 640° C. or at least 650° C. or at least 660° C. or at least 670° C. or at least 680° C. or at least 690° C. It will be appreciated that the softening point of the coating 12 may be within a range between any of the minimum and maximum values noted above. It will be further appreciated that the softening point of the coating 12 may be between any of the minimum and maximum values noted above. For example, in one aspect the coating 12 may have a softening point within a range of 400° C. to not greater than 700° C.

The coating 12 may have various elemental components. In one aspect, the coating 12 may include silicon. In another aspect, the coating 12 may include boron. In another aspect, the coating 12 may include zinc. In another aspect, the coating 12 may include iron. In another aspect, the coating 12 may include sodium. In another aspect, the coating 12 may include potassium. In another aspect, the coating 12 may include lithium.

As previously mentioned, the coating 12 may include an amorphous material 13 and a filler 15. The amorphous material 13 may have a composition different than the filler 15. In one aspect, the amorphous material 13 may include silicon. In another aspect, the amorphous material 13 may include boron. In another aspect, the amorphous material 13 may include boron oxide. According to yet another aspect, the amorphous material 13 may include at least about 20 wt. % boron oxide, such as at least about 25 wt. % boron oxide, at least about 27 wt. % boron oxide or even at least about 30 wt. % boron oxide. In another aspect, the amorphous material 13 may include zinc. In another aspect, the amorphous material 13 may include zinc oxide. According to yet another aspect, the amorphous material 13 may include at least about 5 wt. % zinc oxide, such as at least about 7 wt. % zinc oxide, at least about 9 wt. % zinc oxide or even at least about 10 wt. % zinc oxide. In another aspect, the amorphous material 13 may include bismuth. According to yet another aspect, the amorphous material 13 may include at least about 1 wt. % bismuth, such as, at least about 5 wt. % bismuth, at least about 10 wt. % bismuth, at least about 15 wt. % bismuth, at least about 20 wt. % bismuth, at least about 25 wt. % bismuth, at least about 30 wt. % bismuth, at least about 35 wt. % bismuth, at least about 40 wt. % bismuth, at least about 45 wt. % bismuth, at least about 50 wt. % bismuth, at least about 55 wt. % bismuth, at least about 60 wt. % bismuth, at least about 65 wt. % bismuth, at least about 70 wt. % bismuth, at least about 75 wt. % bismuth or even at least about 79 wt. % bismuth. In another aspect, the amorphous material 13 may include iron. In another aspect, the amorphous material 13 may include sodium. In another aspect, the amorphous material 13 may include potassium. In another aspect, the amorphous material 13 may include lithium.

The coating 12 may have limited amounts of certain materials. In certain aspects, the coating 12 may include no greater than 10 wt. % of any one of aluminum oxide, cobalt oxide, magnesium oxide, tin oxide, calcium oxide, zirconium oxide, barium oxide, or bismuth oxide, or no greater than 8 wt. %, or no greater than 6 wt. %, or no greater than 4 wt. %, or no greater than 2 wt. %, or no greater than 1 wt. %, or no greater than 0.5 wt. %. In further aspects, the coating 12 may include no greater than 10 wt. % of any combination of aluminum oxide, cobalt oxide, magnesium oxide, tin oxide, calcium oxide, zirconium oxide, barium oxide, or bismuth oxide, or no greater than 8 wt. %, or no greater than 6 wt. %, or no greater than 4 wt. %, or no greater than 2 wt. %, or no greater than 1 wt. %, or no greater than 0.5 wt. %. In other aspects, the coating 12 may be essentially free of at least one of aluminum oxide, cobalt oxide, magnesium oxide, tin oxide, calcium oxide, zirconium oxide, barium oxide, bismuth oxide, or any combination thereof.

It will be appreciated that although the amorphous material comprises covalently bonded atoms rather than an ionic crystalline structure, oxygen is often present adjacent to other atoms that are capable of forming oxides. Accordingly, this specification refers to oxide molecules by referencing their respective elements when they are found in their covalent form. Moreover, it will be understood that other practitioners may speak of oxides when referring to elements in the amorphous material.

In an aspect, the amorphous phase of the abrasive particle 10 may have a particular weight ratio of boron to silicon [B:Si]. In particular aspects, the amorphous material 13 may have a weight ratio of boron to silicon [B:Si] of at least 1:1 or at least 1.1:1 or at least 1.2:1 or at least 1.3:1 or at least 1.4:1 or at least 1.5:1 or at least 1.6:1 or at least 1.7:1 or at least 1.8:1 or at least 1.9:1 or at least 2:1 or at least 2.2:1 or at least 2.4:1 or at least 2.5:1 or at least 2.6:1 or at least 2.8:1 or at least 3:1 or at least 3.5:1 or at least 4:1 or at least 5:1 or at least 6:1 or at least 7:1 or at least 8:1 or at least 9:1 or at least 10:1 or at least 12:1 or at least 15:1 or at least 20:1 or at least 30:1. In further aspects, the amorphous material 13 may have a weight ratio of boron to silicon [B:Si] of not greater than 40:1 or not greater than 30:1 or not greater than 20:1 or not greater than 15:1 or not greater than 12:1 or not greater than 10:1 or not greater than 9:1 or not greater than 8:1 or not greater than 7:1 or not greater than 6:1 or not greater than 5:1 or not greater than 4:1 or not greater than 3.5:1 or not greater than 3:1 or not greater than 2.8:1 or not greater than 2.6:1 or not greater than 2.5:1 or not greater than 2.4:1 or not greater than 2.2:1 or not greater than 2:1 or not greater than 1.9:1 or not greater than 1.8:1 or not greater than 1.7:1 or not greater than 1.6:1 or not greater than 1.5:1 or not greater than 1.4:1 or not greater than 1.3:1 or not greater than 1.2:1. It will be appreciated that the weight ratio of boron to silicon [B:Si] in the amorphous material 13 may be within a range between any of the minimum and maximum values noted above. It will be further appreciated that the weight ratio of boron to silicon [B:Si] in the amorphous material 13 may be between any of the minimum and maximum values noted above.

In another aspect, the amorphous material 13 may have a particular weight of silicon as a percentage of the total weight of the amorphous material 13. In certain aspects, the total weight of the amorphous material 13 may be at least 7.5 wt. % silicon of a total weight of the amorphous material 13, or at least 8 wt. % or at least 8.5 wt. % or at least 9 wt. % or at least 9.5 wt. % or at least 10 wt. % or at least 10.5 wt. % or at least 11 wt. % or at least 11.5 wt. % or at least 12 wt. %. In further aspects, the total weight of the amorphous material 13 may be not greater than 15 wt. % silicon of a total weight of the amorphous material 13 or not greater than 14 wt. % or not greater than 12.5 wt. % or not greater than 12 wt. % or not greater than 11.5 wt. % or not greater than 11 wt. % or not greater than 10.5 wt. % or not greater than 10 wt. % or not greater than 9.5 wt. % or not greater than 9 wt. % or not greater than 8.5 wt. %. It will be appreciated that the amount (wt. %) of silicon in the amorphous material 13 may be within a range between any of the minimum and maximum values noted above. It will be further appreciated that the amount (wt. %) of silicon in the amorphous material 13 may be between any of the minimum and maximum values noted above.

In another aspect, the amorphous material 13 may have a particular weight of boron as a percentage of the total weight of the amorphous material 13. In certain aspects, the amorphous material 13 may be at least 10 wt. % boron of a total weight of the amorphous material 13, or at least 10.7 wt. % or at least 11.4 wt. % or at least 12 wt. % or at least 12.7 wt. % or at least 13.4 wt. % or at least 14 wt. % or at least 14.7 wt. % or at least 15.4 wt. % or at least 16 wt. % or at least 16.7 wt. %. In further aspects, the amorphous material 13 may be not greater than 20 wt. % boron of a total weight of the amorphous material 13 or not greater than 19.4 wt. % or not greater than 18.7 wt. % or not greater than 18 wt. % or not greater than 17.4 wt. % or not greater than 16.7 wt. % or not greater than 16 wt. % or not greater than 15.4 wt. % or not greater than 14.7 wt. % or not greater than 14 wt. % or not greater than 13.3 wt. % or not greater than 12.7 wt. % or not greater than 12 wt. % or not greater than 11.4 wt. % or not greater than 10.7 wt. %. It will be appreciated that the amount (wt. %) of boron in the amorphous material 13 may be within a range between any of the minimum and maximum values noted above. It will be further appreciated that the amount (wt. %) of boron in the amorphous material 13 may be between any of the minimum and maximum values noted above.

In another aspect, the amorphous material 13 may have a particular weight ratio of silicon to alkali metals [Si:X] where X is the total content of alkali metals in the amorphous material 13. In particular aspects, the amorphous material 13 may have a weight ratio of silicon to alkali metals [Si:X] of at least 1:1 or at least 1.1:1 or at least 1.2:1 or at least 1.3:1 or at least 1.4:1 or at least 1.5:1 or at least 1.6:1 or at least 1.7:1 or at least 1.8:1 or at least 1.9:1 or at least 2:1 or at least 2.2:1 or at least 2.4:1 or at least 2.5:1 or at least 2.6:1 or at least 2.8:1 or at least 3:1 or at least 3.5:1 or at least 4:1 or at least 5:1, wherein X is the total content of alkali metals in the amorphous material 13. In further aspects, the amorphous material 13 may have a weight ratio of silicon to alkali metals [Si:X] of not greater than 6:1 or not greater than 5:1 or not greater than 4:1 or not greater than 3.5:1 or not greater than 3:1 or not greater than 2.8:1 or not greater than 2.6:1 or not greater than 2.5:1 or not greater than 2.4:1 or not greater than 2.2:1 or not greater than 2:1 or not greater than 1.9:1 or not greater than 1.8:1 or not greater than 1.7:1 or not greater than 1.6:1 or not greater than 1.5:1 or not greater than 1.4:1 or not greater than 1.3:1 or not greater than 1.2:1, wherein X is the total content of alkali metals in the amorphous material 13. It will be appreciated that the weight ratio of weight ratio of silicon to alkali metals [Si:X] in the amorphous material 13 may be within a range between any of the minimum and maximum values noted above. It will be further appreciated that the weight ratio of weight ratio of silicon to alkali metals [Si:X] in the amorphous material 13 may be between any of the minimum and maximum values noted above.

In one aspect, the amorphous material 13 can include alkali metals. As used herein, the term "alkali metals" refers to Group IA of the Periodic Table of Elements, Copyright 2010 by Division of Chemical Education, Inc.

In another aspect, the amorphous material 13 can have a particular total content of alkali metals as a percentage of a total weight of the amorphous material 13. In certain aspects, the amorphous material 13 can have a total content of alkali metals of at least 4 wt. % of a total weight of the amorphous material 13 or at least 4.5 wt. % or at least 5 wt. % or at least 5.5 wt. % or at least 6 wt. % or at least 6.5 wt. % or at least 7 wt. % or at least 7.5 wt. % or at least 8 wt. %. In further aspects, the amorphous material 13 can have a total content of alkali metals not greater than 10 wt. % of a total weight of the amorphous material 13 or not greater than 9.5 wt. % or not greater than 9 wt. % or not greater than 8.5 wt. % or not greater than 8 wt. % or not greater than 7.5 wt. % or not greater than 7 wt. % or not greater than 6.5 wt. % or not greater than 6 wt. % or not greater than 5.5 wt. % or not greater than 5 wt. %. It will be appreciated that the total content (wt. %) of alkali metals in the amorphous material 13 may be within a range between any of the minimum and maximum values noted above. It will be further appreciated that the total content (wt. %) of alkali metals in the amorphous material 13 may be between any of the minimum and maximum values noted above.

In another aspect, the amorphous material 13 can have particular contents of each alkali metal. In certain aspects, the amorphous material 13 can have a content (wt. %) of sodium that is greater than a content (wt. %) of lithium, and a content (wt. %) of potassium that is greater than a content (wt. %) of lithium.

In other aspects, the amorphous material 13 can have a content (wt. %) of sodium of at least 1 wt. % of a total weight of the coating 12 or at least 1.5 wt. % or at least 2 wt. % or at least 2.5 wt. % or at least 3 wt. %. In further aspects, the amorphous material 13 can have a content (wt. %) of sodium of not greater than 5 wt. % of a total weight of the amorphous material 13 or not greater than 4.5 wt. % or not greater than 4 wt. % or not greater than 3.5 wt. % or not greater than 3 wt. % or not greater than 2.5 wt. % or not greater than 2 wt. %. It will be appreciated that the content (wt. %) of sodium in the amorphous material 13 may be within a range between any of the minimum and maximum values noted above. It will be further appreciated that the content (wt. %) of sodium in the amorphous material 13 may be between any of the minimum and maximum values noted above.

In other aspects, the amorphous material 13 can have a content (wt. %) of potassium of at least 1.3 wt. % of a total weight of the coating 12 or at least 2 wt. % or at least 2.7 wt. % or at least 3.4 wt. % or at least 4 wt. %. In further aspects, the amorphous material 13 can have a content (wt. %) of potassium of not greater than 7 wt. % of a total weight of the coating 12 or not greater than 6.3 wt. % or not greater than 5.4 wt. % or not greater than 4.7 wt. % or not greater than 4 wt. % or not greater than 3.4 wt. % or not greater than 2.7 wt. %. It will be appreciated that the content (wt. %) of potassium in the amorphous material 13 may be within a range between any of the minimum and maximum values noted above. It will be further appreciated that the content (wt. %) of potassium in the amorphous material 13 may be between any of the minimum and maximum values noted above.

In other aspects, the amorphous material 13 can have a content (wt. %) of lithium of at least 0.3 wt. % of a total weight of the amorphous material 13 or at least 0.7 wt. % or at least 1 wt. % or at least 1.3 wt. %. In further aspects, the amorphous material 13 can have a content (wt. %) of lithium of not greater than 2 wt. % of a total weight of the amorphous material 13 or not greater than 1.7 wt. % or not greater than 1.3 wt. % or not greater than 1 wt. % or not greater than 0.7 wt. %. It will be appreciated that the content (wt. %) of lithium in the amorphous material 13 may be within a range between any of the minimum and maximum values noted above. It will be further appreciated that the content (wt. %) of lithium in the amorphous material 13 may be between any of the minimum and maximum values noted above.

In one aspect, the amorphous material 13 may comprise a particular weight ratio of silicon to iron [Si:Fe]. In certain aspects, the amorphous material 13 may comprise a weight ratio of silicon to iron [Si:Fe] of at least 0.7:1 or at least 0.9:1 or at least 1.1:1 or at least 1.3:1 or at least 1.4:1 or at least 1.5:1 or at least 1.6:1 or at least 1.7:1 or at least 1.8:1 or at least 1.9:1 or at least 2:1 or at least 2.2:1 or at least 2.4:1 or at least 2.5:1 or at least 2.6:1 or at least 2.8:1 or at least 3:1 or at least 3.5:1 or at least 4:1 or at least 5:1. In other aspects, the amorphous material 13 may comprise a weight ratio of silicon to iron [Si:Fe] of not greater than 6:1 or not greater than 5:1 or not greater than 4:1 or not greater than 3.5:1 or not greater than 3:1 or not greater than 2.8:1 or not greater than 2.6:1 or not greater than 2.5:1 or not greater than 2.4:1 or not greater than 2.2:1 or not greater than 2:1 or not greater than 1.9:1 or not greater than 1.8:1 or not greater than 1.7:1 or not greater than 1.6:1 or not greater than 1.5:1 or not greater than 1.4:1 or not greater than 1.3:1 or not greater than 1.2:1. It will be appreciated that the weight ratio of silicon to iron [Si:Fe] in the amorphous material 13 may be within a range between any of the minimum and maximum values noted above. It will be further appreciated that the weight ratio of silicon to iron [Si:Fe] in the amorphous material 13 may be between any of the minimum and maximum values noted above.

In another aspect, the amorphous material 13 can comprise a particular content (wt. %) of iron. In certain aspects, the amorphous material 13 can comprise a content (wt. %) of iron of at least 5.3 wt. % of a total weight of the amorphous material 13 or at least 6 wt. % or at least 6.7 wt. % or at least 7.4 wt. % or at least 8 wt. % or at least 8.7 wt. %. In further aspects, the amorphous material 13 can comprise a content (wt. %) of iron of not greater than 12 wt. % of a total weight of the amorphous material 13 or not greater than 10 wt. % or not greater than 9.3 wt. % or not greater than 8.7 wt. % or not greater than 8 wt. % or not greater than 7.3 wt. % or not greater than 6.7 wt. % or not greater than 6 wt. %. It will be appreciated that the content (wt. %) of iron in the amorphous material 13 may be within a range between any of the minimum and maximum values noted above. It will be further appreciated that the content (wt. %) of iron in the amorphous material 13 may be between any of the minimum and maximum values noted above.

In another aspect, the amorphous material 13 can comprise a particular content (wt. %) of zinc. In certain aspects, the amorphous material 13 can comprise a content (wt. %) of zinc of at least 1 wt. % of a total weight of the amorphous material 13 or at least 2 wt. % or at least 3 wt. % or at least 4 wt. % or at least 5 wt. % or at least 6 wt. %. In further aspects, the amorphous material 13 can comprise a content (wt. %) of zinc of not greater than 10 wt. % of a total weight of the amorphous material 13 or not greater than 9 wt. % or not greater than 8 wt. % or not greater than 7 wt. % or not greater than 6 wt. % or not greater than 5 wt. % or not greater than 4 wt. % or not greater than 3 wt. %. It will be appreciated that the content (wt. %) of zinc in the amorphous material 13 may be within a range between any of the minimum and maximum values noted above. It will be further appreciated that the content (wt. %) of zinc in the amorphous material 13 may be between any of the minimum and maximum values noted above.

It will be appreciated that the amorphous material 13 may be any desirable type of glass suitable for coating a body 11 to form the abrasive particle 10 as described herein. While embodiments described herein may describe particular elemental ratios that are characteristic of one type of amorphous material, other desirable types of amorphous or glass materials may also be used that include different elemental ratios. According to certain aspects, desirable types of glass may be low melting point amorphous or glass material, such as, amorphous or glass materials have a melting point within a range between about 400° C. and 800° C.

As previously mentioned, the coating 12 may include an amorphous material 13 and a filler 15. In one aspect, the filler 15 can be a particulate material. In a further aspect, the filler 15 can be a polycrystalline particulate material.

In one aspect, the filler 15 can include at least one compound selected from the group consisting of oxides, fluorides, sulfides, phosphates, carbonates, halogenides, or any combination thereof. In another aspect, the filler 15 can include at least one oxide compound including at least one element selected from the group consisting of Fe; Co, Ti, Ni, V, Cr, Sb, Mn, Zn, or any combination thereof. In a different aspect, the filler 15 can include a fluorine-containing compound selected from the group consisting of $Na_3AlF_6$, $KNaAlF_6$, $NaSiF_6$, $KSiF_6$, $NaBF_4$, $KAlF_4$, $KBF_4$, $Cr_3C_2$, $CaF_2$ or any combination thereof. In still another aspect, the filler 15 can include at least one halogen-containing compound including at least one element selected from the group consisting of Na, K, Mg, Ca, Al, Mn, Cu, Sn, Fe, Ti, Sb, Zn, Bi or any combination thereof.

In a different aspect, the coating 12 may include more then one filler. In one aspect, the filler 15 includes a first filler contained in the coating and a second filler contained in the coating, wherein the first filler and second filler, wherein the first filler and second filler are each discrete compounds selected from the group consisting of oxides, fluorides, sulfides, phosphates, carbonates, halogenides, or any combination thereof. In a further aspect, the first filler can include $Fe_2O_3$ and the second filler can include $Na_3AlF_6$. The first filler and the second filler may be part of the same phase, or the first filler and the second filler may be part of different phases.

In one aspect, the filler 15 may include a particulate material having a median particle size (D50) less than a median particle size (D50) of the body 11. In certain aspects, the filler 15 may include a particulate material having a median particle size (D50) of not greater than 50 microns or not greater than 40 microns or not greater than 30 microns or not greater than 25 microns or not greater than 20 microns or not greater than 15 microns or not greater than 10 microns or not greater than 8 microns or not greater than 6 microns or not greater than 4 microns or not greater than 2 microns or not greater than 1.5 microns or not greater than 1 micron or not greater than 0.8 microns or not greater than 0.6 microns or not greater than 0.4 microns or not greater than 0.2 microns or not greater than 0.1 microns. In further aspects, the filler 15 may include a particulate material having a median particle size (D50) of at least 0.1 microns or at least 0.2 microns or at least 0.4 microns or at least 0.6 microns or at least 0.8 microns or at least 1 micron or at least 1.5 microns or at least 2 microns or at least 4 microns or at least 6 microns or at least 8 microns or at least 10 microns or at least 15 microns or at least 20 microns or at least 25 microns or at least 30 microns or at least 40 microns. It will be appreciated that the particulate material of the filler 15 may have a median particle size (D50) within a range between any of the minimum and maximum values noted above. It will be further appreciated that the particulate material of the filler 15 may have a median particle size (D50) between any of the minimum and maximum values noted above.

In another aspect, the filler 15 may have a particular weight relative to the total weight of the abrasive particle 10. The weight of the filler 15 may be calculated as an average of the total weight of filler 15 in a suitable sample size of abrasive particles 10. In certain aspects, the at least one filler 15 can be present in an amount of not greater than 10 wt. % of a total weight of the abrasive particle 10 or not greater than 8 wt. % or not greater than 6 wt. % or not greater than 4 wt. % or not greater than 3 wt. % or not greater than 2.5 wt. % or not greater than 2 wt. % or not greater than 1.5% or not greater than 1 wt. % or not greater than 0.8 wt. % or not greater than 0.5 wt. % or not greater than 0.2 wt. % or not greater than 0.1 wt. %. In other aspects, the at least one filler 15 can be present in an amount of at least 0.01 wt. % of a total weight of the abrasive particle 10 or at least 0.1 wt. % or at least 0.2 wt. % or at least 0.5 wt. % or at least 0.8 wt. % or at least 1 wt. % or at least 1.5 wt. % or at least 2 wt. % or at least 2.5 wt. % or at least 3 wt. % or at least 4 wt. % or at least 6 wt. % or at least 8 wt. %. It will be appreciated that the amount (wt. %) of particulate material of the filler 15 relative to the weight of the abrasive particle 10 may be within a range between any of the minimum and maximum values noted above. It will be further appreciated that the amount (wt. %) of particulate material of the filler 15 relative to the weight of the abrasive particle 10 may be between any of the minimum and maximum values noted above.

According to still another aspect, the abrasive particle 10 may include a particular amount of chromium (Cr) from the coating 12 (i.e., the combination of the amorphous material 13 and the filler 15). For example, the abrasive particle 10 may include chromium (Cr) in an amount of at least about 0.2 wt. % for a total weight of the abrasive particle, such as, at least about 0.5 wt. % or at least about 0.7 wt. % or at least about 1.0 wt. % or at least about 1.3 wt. % or at least about 1.5 wt. % or at least about 1.7 wt. % or at least about 2.0 wt. % or even at least about 2.3 wt. %. According to yet other aspects, the abrasive particle may include chromium (Cr) in an amount of not greater than about 20 wt. % for a total weight of the abrasive particle or not greater than about 15 wt. % or not greater than about 10 wt. % or not greater than about 7.0 wt. % or not greater than about 5.0 wt. % or not greater than about 2.5 wt. % or not greater than about 2.4 wt. % or not greater than about 2.3 wt. % or not greater than about 2.2 wt. % or even not greater than about 2.1 wt. %. It will be appreciated that the amount (wt. %) of chromium (Cr) relative to the weight of the abrasive particle 10 may be within a range between any of the minimum and maximum values noted above. It will be further appreciated that the amount (wt. %) of chromium (Cr) relative to the weight of the abrasive particle 10 may be between any of the minimum and maximum values noted above.

According to still another aspect, the abrasive particle 10 may include a particular amount of sodium (Na) from the coating 12 (i.e., the combination of the amorphous material 13 and the filler 15). For example, the abrasive particle 10 may include sodium (Na) in an amount of at least about 0.01 wt. % for a total weight of the abrasive particle, such as, at least about 0.05 wt. % or at least about 0.1 wt. % or at least about 0.2 wt. % or at least about 0.3 wt. % or at least about 0.4 wt. % or even at least about 0.5 wt. %. According to yet other aspects, the abrasive particle may include sodium (Na) in an amount of not greater than about 6.0 wt. % for a total weight of the abrasive particle, such as, not greater than about 5.0 wt. % or not greater than about 4.0 wt. % or not greater than about 3.0 wt. % or not greater than about 2.0 wt. % or not greater than about 1.0 wt. % or not greater than about 0.9 wt. % or not greater than about 0.8 wt. % or even not greater than about 0.7 wt. %. It will be appreciated that the amount (wt. %) of sodium (Na) relative to the weight of the abrasive particle 10 may be within a range between any of the minimum and maximum values noted above. It will be further appreciated that the amount (wt. %) of sodium (Na) relative to the weight of the abrasive particle 10 may be between any of the minimum and maximum values noted above.

According to still another aspect, the abrasive particle 10 may include a particular amount of calcium (Ca) from the coating 12 (i.e., the combination of the amorphous material 13 and the filler 15). For example, the abrasive particle 10 may include calcium (Ca) in an amount of at least about 0.05 wt. % for a total weight of the abrasive particle, such as, at least about 0.1 wt. % or at least about 0.2 wt. % or at least about 0.3 wt. % or at least about 0.4 wt. % or even at least about 0.5 wt. %. According to yet other aspects, the abrasive particle may include calcium (Ca) in an amount of not greater than about 7.0 wt. % for a total weight of the abrasive particle, such as, not greater than about 6.0 wt. % 1.1 wt. % or not greater than about 5.0 wt. % or not greater than about 4.0 wt. % or not greater than about 3.0 wt. % or not greater than about 2.0 wt. % or not greater than about 1.0 wt. % or even not greater than about 0.9 wt. %. It will be appreciated that the amount (wt. %) of calcium (Ca) relative to the weight of the abrasive particle 10 may be within a range between any of the minimum and maximum values noted above. It will be further appreciated that the amount (wt. %) of calcium (Ca) relative to the weight of the abrasive particle 10 may be between any of the minimum and maximum values noted above.

According to still another aspect, the abrasive particle 10 may include a particular amount of potassium (K) from the coating 12 (i.e., the combination of the amorphous material 13 and the filler 15). For example, the abrasive particle 10 may include potassium (K) in an amount of at least about 0.01 wt. % for a total weight of the abrasive particle, such as, at least about 0.05 wt. % or at least about 0.1 wt. % or at least about 0.2 wt. % or at least about 0.3 wt. % or at least about 0.4 wt. % or even at least about 0.5 wt. %. According to yet other aspects, the abrasive particle may include potassium (K) in an amount of not greater than about 10 wt. % for a total weight of the abrasive particle, such as, not greater than about 9.0 wt. % or not greater than about 8.0 wt. % or not greater than about 7.0 wt. % or not greater than about 6.0 wt. % or not greater than about 5.0 wt. % or not greater than about 4.0 wt. % or not greater than about 3.0 wt.

% or not greater than about 2.0 wt. % or not greater than about 1.0 wt. % or even not greater than about 0.9 wt. %. It will be appreciated that the amount (wt. %) of potassium (K) relative to the weight of the abrasive particle 10 may be within a range between any of the minimum and maximum values noted above. It will be further appreciated that the amount (wt. %) of potassium (K) relative to the weight of the abrasive particle 10 may be between any of the minimum and maximum values noted above.

Figure 2:
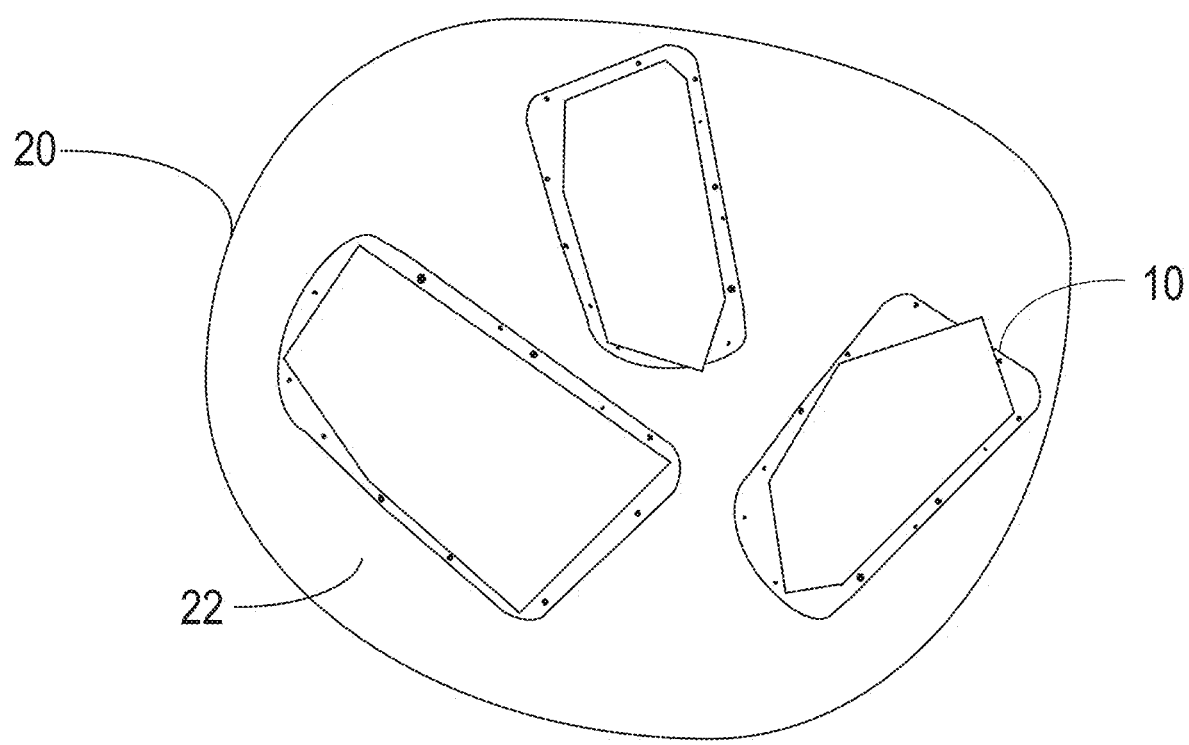
FIG. 2 includes a cross section illustration of a fixed abrasive article according to an embodiment.

FIG. 2 includes an illustration of an example fixed abrasive article according to embodiments described herein. As shown in FIG. 2, a fixed abrasive article 20 can include one or more abrasive particles 10. Each abrasive particle 10 can be embedded in a matrix material 22. In particular aspects, the matrix material 22 can include a bond or a nonwoven material used to secure the abrasive particles 10. In a further aspect, the matrix material 22 may be secured to a backing or a substrate. It will be appreciated that each abrasive particle 10 of the fixed abrasive article 20 in FIG. 2 can include any of the characteristics described herein with respect to the abrasive particle 10 in FIG. 1.

In another aspect, a fixed abrasive article 20 may be formed using a method that includes creating a mixture including a particulate material having a body 11, a coating precursor material, and at least one filler 15; forming a coated particulate material from the mixture, the coated particulate material including a coating 12 comprising an amorphous material 13 overlying the body 11 and the at least one filler 15 contained in the coating 12. In a further aspect, forming a coated particulate material may further include heating the mixture to a temperature of at least 400° C. and not greater than 700° C. In another aspect, the mixture may also include at least one binder selected from the group consisting of wax, polyvinyl acetate (PVA), polyethylene glycol (PEG), polyvinylpyrrolidone (PVP), water or any combination thereof. In another aspect, at least one binder may include other organic adhesive materials or inorganic adhesive materials.

EXAMPLES

Example 1

A sample of coated abrasive particles Sample 1 was formed according to the following method. Fused amorphous borosilicate-based material was fractured and placed in a 1 L container of a ball mill, QM-WX4 manufactured by Nanjing university instrument plant, Hankou Road No. 22 Nanjing. 12 mm corundum balls were added. The weight ratio of corundum balls to fused amorphous material was 5:1. The ball mill was operated at a speed of 200 RPMs for 2 hours. The resulting powder of amorphous material was analyzed by layer particle size analysis and found to have a D50 equal to 23.955 microns. Polyethylene glycol (PEG1000) solution diluted to 0.5 wt. % concentration in water was obtained. Alumina zirconia abrasive grains having a particle size of P36, commercially available as AZ40 from Saint-Gobain Ceramic Materials (Zhengzhou) Co., Ltd, located at Yangcheng Industrial Zone, Dengfeng, Zhengzhou 452477, China.

50 grams of the PEG solution and 2 kilograms of alumina zirconia abrasive grains were added to a mixer, ARM-01, manufactured by Thunderbird Food Machinery Inc., 4602 Brass Way, Dallas, Tex. 75236, and mixed for 30 minutes until the PEG solution wetted the surface of the abrasive grains. 50 grams of the powdered amorphous material was added and the mixture was mixed for an additional 30 minutes. The resulting coated abrasive grains were sintered in a furnace at approximately 650° C. for approximately 2 hours. The resulting agglomeration of sintered grains was then removed from the furnace and sieved with P36 control sieve for 5 minutes.

Example 2

A sample of coated abrasive particles Sample 2 was formed according to the same method used for Sample 1 except that 50 grams of a cryolite ($Na_3AlF_6$) powder was added to the mixer along with the powdered amorphous material.

Figure 3A:
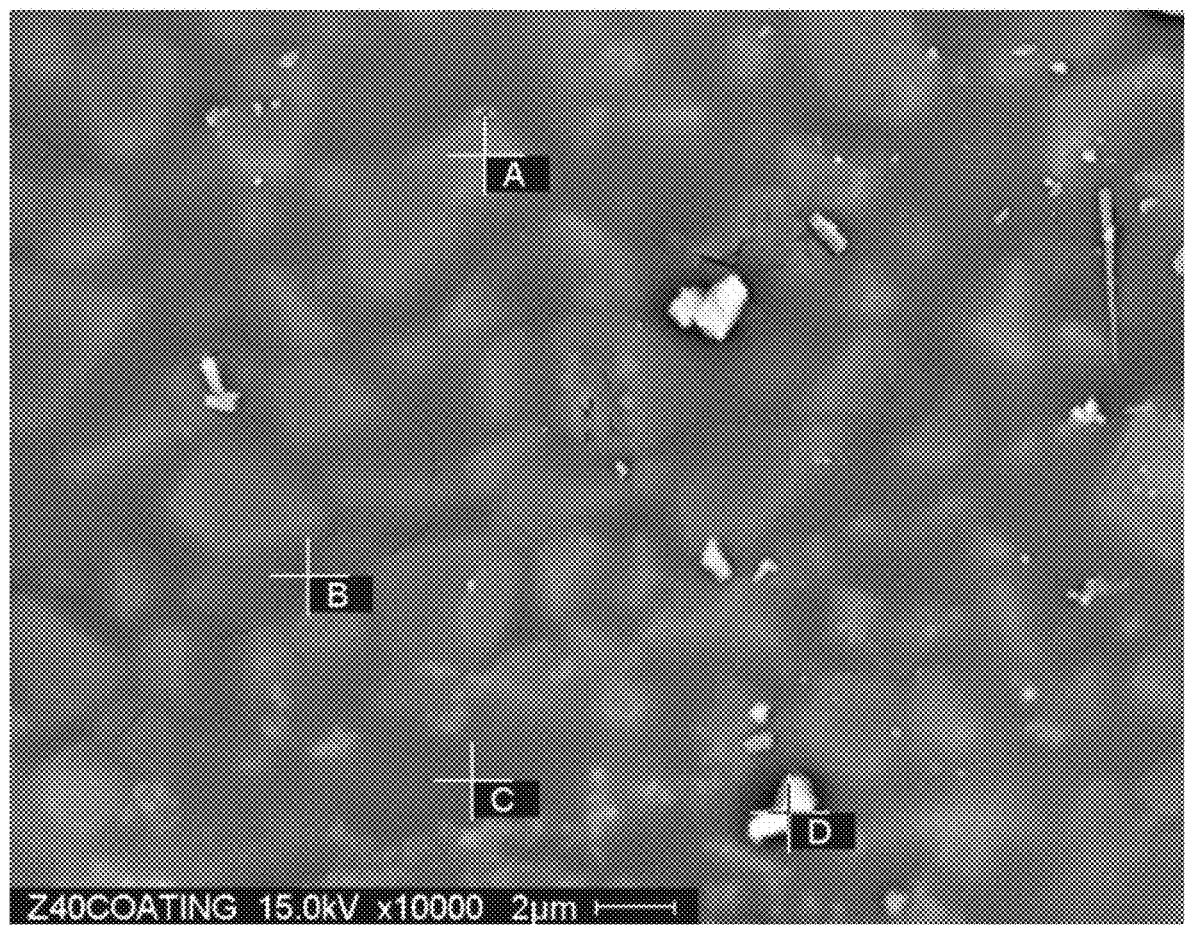
FIG. 3A includes an SEM image of a sample shaped abrasive particle.
Figure 3B:
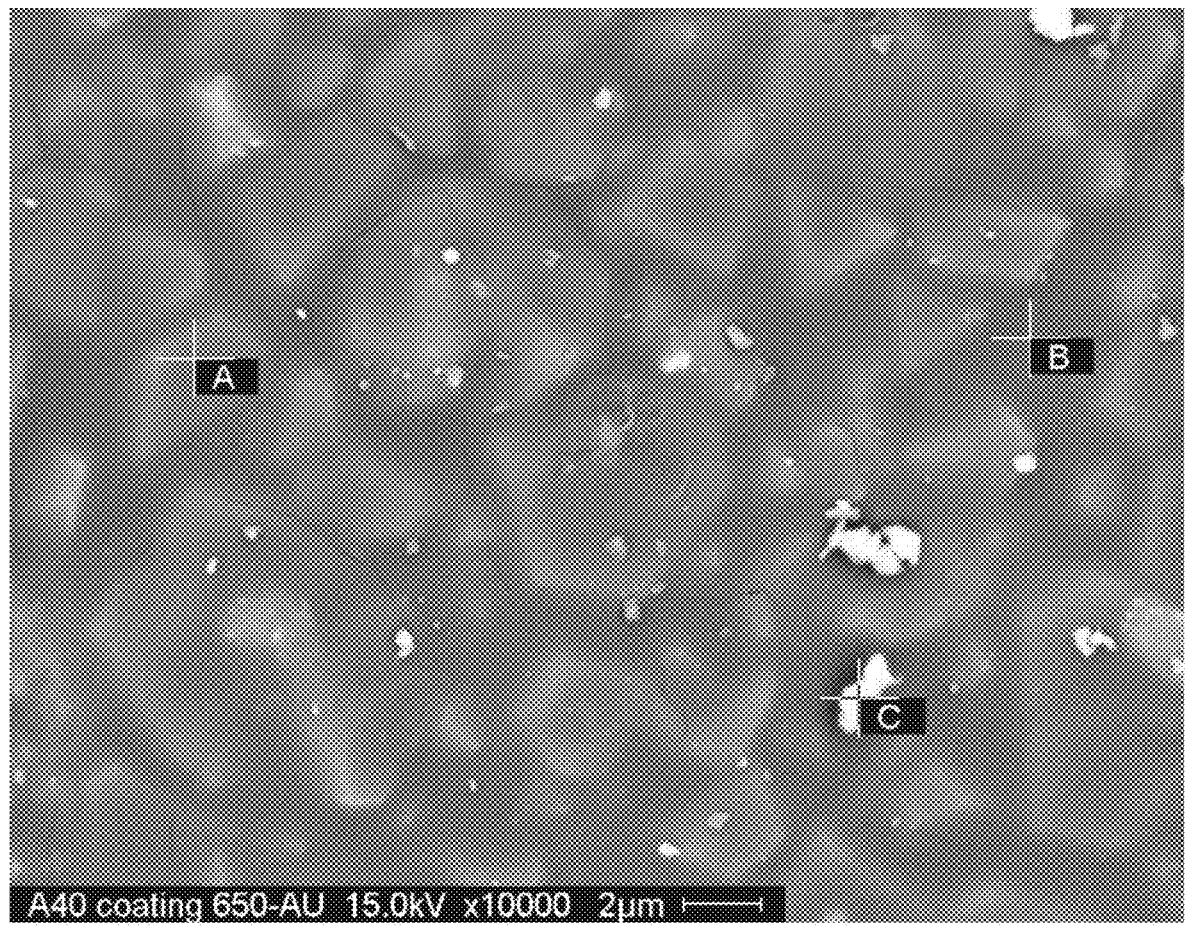
FIG. 3B includes an SEM image of a sample shaped abrasive particle.

FIGS. 3A and 3B include an image of the surface of Sample 2. As shown in FIGS. 3A and 3B, the surface of Sample 2 was imaged using a Scanning Electron Microscope (SEM), SEM model Quanta 200, manufactured by FEI, 5350 NE Dawson Creek Drive, Hillsboro, Oreg. 97124 USA. The SEM was equipped with an Energy Dispersive Spectroscopy (EDS) detector, model EDAX Genesis 2, manufactured by EDAX Inc., 91 McKee Drive Mahwah, N.J. 07430. FIGS. 3A and 3B show that the cryolite ($Na_3AlF_6$) is in a phase distinct from the phase of the amorphous material.

Example 3

A sample of coated abrasive particles Sample 3 was formed according to the same method used for Sample 1 except that 50 grams of an iron oxide ($Fe_2O_3$) powder was added to the mixer along with the powdered amorphous material.

Example 4

A sample of coated abrasive particles Sample 4 was formed according to the same method used for Sample 1 except that 25 grams of a cryolite ($Na_3AlF_6$) powder and 25 grams of an iron oxide ($Fe_2O_3$) powder was added to the mixer along with the powdered amorphous material.

Figure 4A:
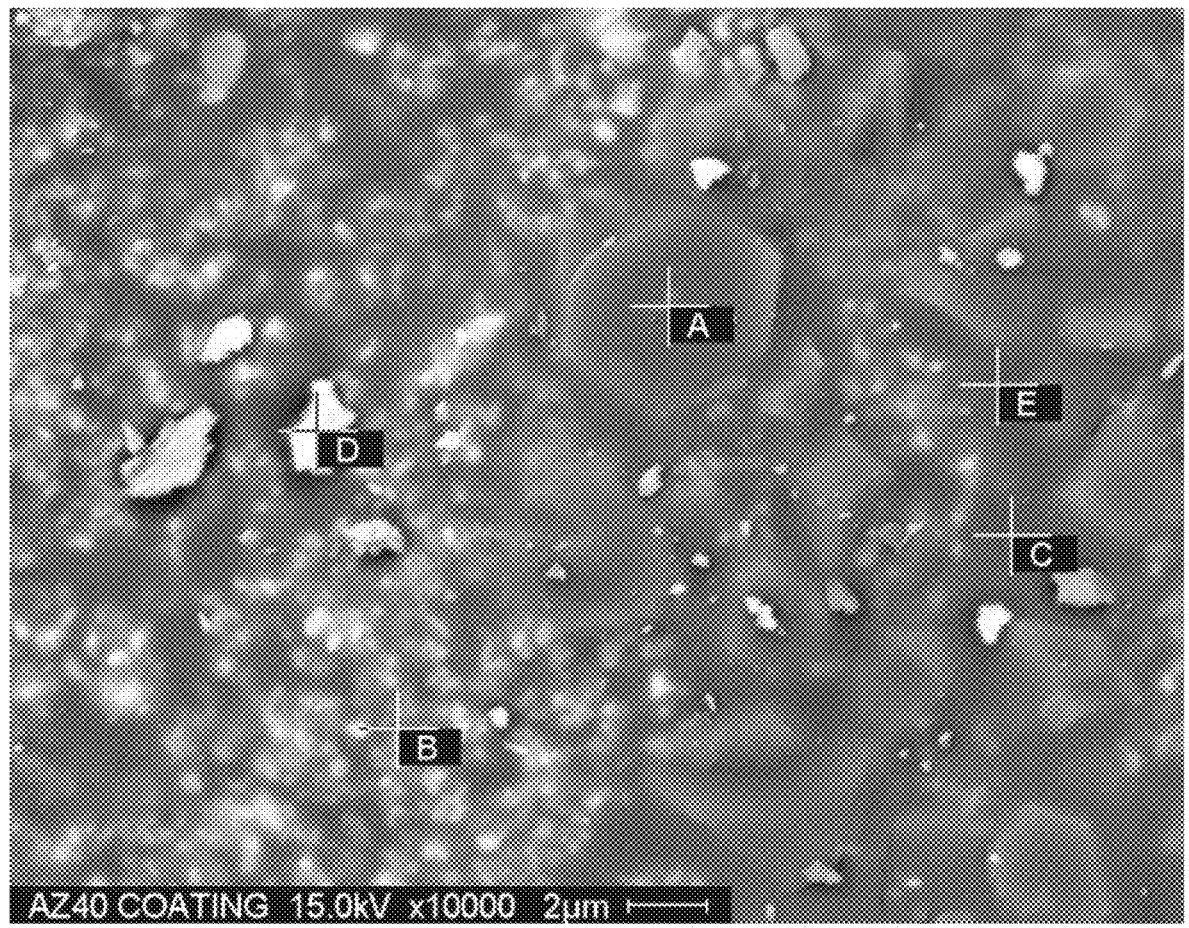
FIG. 4A includes an SEM image of a sample shaped abrasive particle.
Figure 4B:
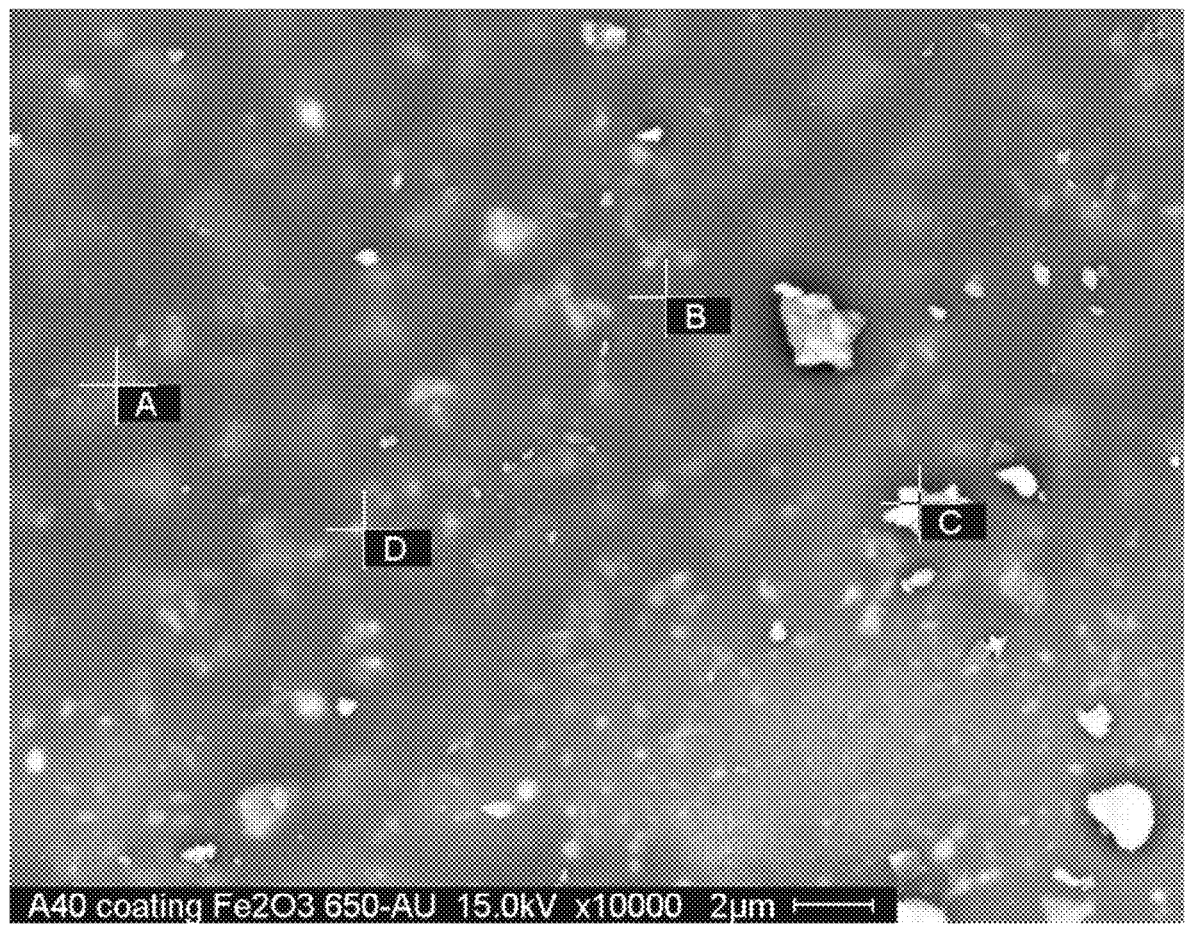
FIG. 4B includes an SEM image of a sample shaped abrasive particle.

FIGS. 4A and 4B include an image of the surface of Sample 4. As shown in FIGS. 4A and 4B, the surface of Sample 4 was imaged using SEM. FIGS. 4A and 4B show that the cryolite ($Na_3AlF_6$) is in a phase distinct from the phase of the amorphous material, and that the cryolite ($Na_3AlF_6$) is in a phase distinct from the phase of the iron oxide ($Fe_2O_3$).

Each of Samples 1, 2, 3, and 4 were analyzed using an inductively coupled plasma (ICP) Optical emission spectrometer, Varian 720-ES, manufactured by Varian Medical Systems, Inc. 3100 Hansen Way Palo Alto, Calif. 94304-1038. For each sample, 0.2 grams of sample were submerged in a mixture of 8 mL of 70% nitric acid ($HNO_3$) and 2 mL of 40% hydrofluoric acid (HF). This mixture was placed in a 50 mL covered PTFE bottle. The PTFE bottle was placed in distilled water container in air and heated in a pressurized environment to approximately 105° C. for approximately 3 hours. The PTFE bottle was allowed to cool, and the resulting liquid was diluted with deionized water to 100 mL and analyzed to determine boron (B) and lithium (Li) content. Then an additional 0.5000±0.0010 grams of sample were placed into a Pt/Au crucible, 3.00 grams of lithium tetraborate (99.998%) were added to the crucible, mixed well, and 200 microliters solution of lithium bromide were added. The crucible was placed on a fusion machine, model Phoenix VFD6000, manufactured by XRF Scientific, Ltd., 98 Guthrie Street, Osborne Park Wash.

6017, Australia. The temperature of the crucible was set to 1300° C.±30. The time sequence was 60 seconds pre-melt, 120 seconds melting, and 240 seconds swirling. A clear melt was obtained at the end of the time sequence, and the crucible was cooled with compressed air and the contents were removed by gently tapping the bottom on a soft surface. Approximately 125 mL of deionized water and 20 mL of hydrochloric acid (HCl) (37% (m/m) solution—GR Grade) was added to a glass beaker which was covered with a watch glass, and the melt was dissolved on a hotplate. Once the dissolution was complete, the beaker was removed from the hotplate and the solution allowed to cool. The solution was transferred into a 250 mL volumetric flask and allowed to cool. Then the solution was diluted with deionized water to the 250 mL mark and mixed well. The solution was used for the analysis of Al, Ba, Ca, Ce, Co, Cr, Cu, Fe, Ga, Hf, K, La, Mn, Mo, Na, Nb, Nd, Ni, Si, Ta, Ti, V, Y, Zn, Zr.

The results for this analysis are shown in Table 1 with a margin of error of approximately 10%. The values are given as weight percentages of the composition of the entire sample of coated abrasive particles.

TABLE 1

ICP analysis

| Component | Samples (Element Weight % Ratio to Entire Particle) | | | |
|---|---|---|---|---|
| | 1 | 2 | 3 | 4 |
| $Al_2O_3$ | 49.8 | 38.8 | 49.6 | 32.2 |
| CaO | 0.17 | 0.14 | 0.15 | 0.12 |
| $CeO_2$ | 0.019 | 0.015 | 0.019 | 0.013 |
| $Fe_2O_3$ | 0.44 | 0.20 | 2.21 | 0.98 |
| $HfO_2$ | 0.75 | 0.59 | 0.71 | 0.49 |
| $K_2O$ | 0.14 | 0.06 | 0.13 | 0.09 |
| $MnO_2$ | 0.021 | 0.006 | 0.034 | 0.012 |
| $Na_2O$ | 0.15 | 0.08 | 0.14 | 0.41 |
| $SiO_2$ | 0.63 | 0.32 | 0.61 | 0.46 |
| $TiO_2$ | 0.080 | 0.062 | 0.077 | 0.053 |
| $Y_2O_3$ | 0.38 | 0.31 | 0.34 | 0.25 |
| ZnO | 0.15 | 0.07 | 0.15 | 0.11 |
| $ZrO_2$ | 47.28 | 58.91 | 45.02 | 64.12 |

Example 5

A sample of coated abrasive particles Sample 5 was formed according to a process similar to that used for Sample 1, except that the amorphous material was milled to a D50 equal to 17 microns and sintering was conducted at 600° C.

A sample of coated abrasive particles Sample 6 was formed according to a process similar to that used for Sample 2, except that the amorphous material was milled to a D50 equal to 17 microns and sintering was conducted at 600° C.

A sample of coated abrasive particles Sample 7 was formed according to a process similar to that used for Sample 3, except that the amorphous material was milled to a D50 equal to 17 microns and sintering was conducted at 600° C.

A sample of coated abrasive particles Sample 8 was formed according to a process similar to that used for Sample 2, except that the amorphous material was milled to a D50 equal to 17 microns and sintering was conducted at 700° C.

A sample of coated abrasive particles Sample 9 was formed according to a process similar to that used for Sample 3, except that the amorphous material was milled to a D50 equal to 17 microns and sintering was conducted at 700° C.

Samples 5-9 were tested to determine the G-ratio and specific grinding energy relative to uncoated abrasive grains. The G-ratio represents the ratio between the weight loss of the workpiece and the weightloss of the sample abrasive grain. The specific grinding energy represents the power required. The test was conducted using the parameters in Table 2.

TABLE 2

Grinding test parameters

| | |
|---|---|
| Testing equipment | Okamoto grinder: ACC520DX |
| Contact Wheel (contact surface) Hardness | Rigid structure (100 Shore A Hardness) |
| Contact Wheel diameter | 125 mm |
| RPM | 3600 |
| Workpiece material | 304SS |
| Workpiece contact surface dimension | 18 × 76 mm |
| Test cycle condition | 0.0015", 0.004" in-feed depth each cut |

The grinding performance of Samples 5-9 is shown in Table 3.

TABLE 3

Grinding Performance of Samples 5-9

| Sample | G-ratio | Specific Grinding Energy |
|---|---|---|
| Uncoated grain | 100% | 100% |
| Sample 5 | 104% | 88% |
| Sample 6 | 124% | 74% |
| Sample 7 | 102% | 101% |
| Sample 8 | 125% | 75% |
| Sample 9 | 112% | 92% |

Example 6

Figure 5A:
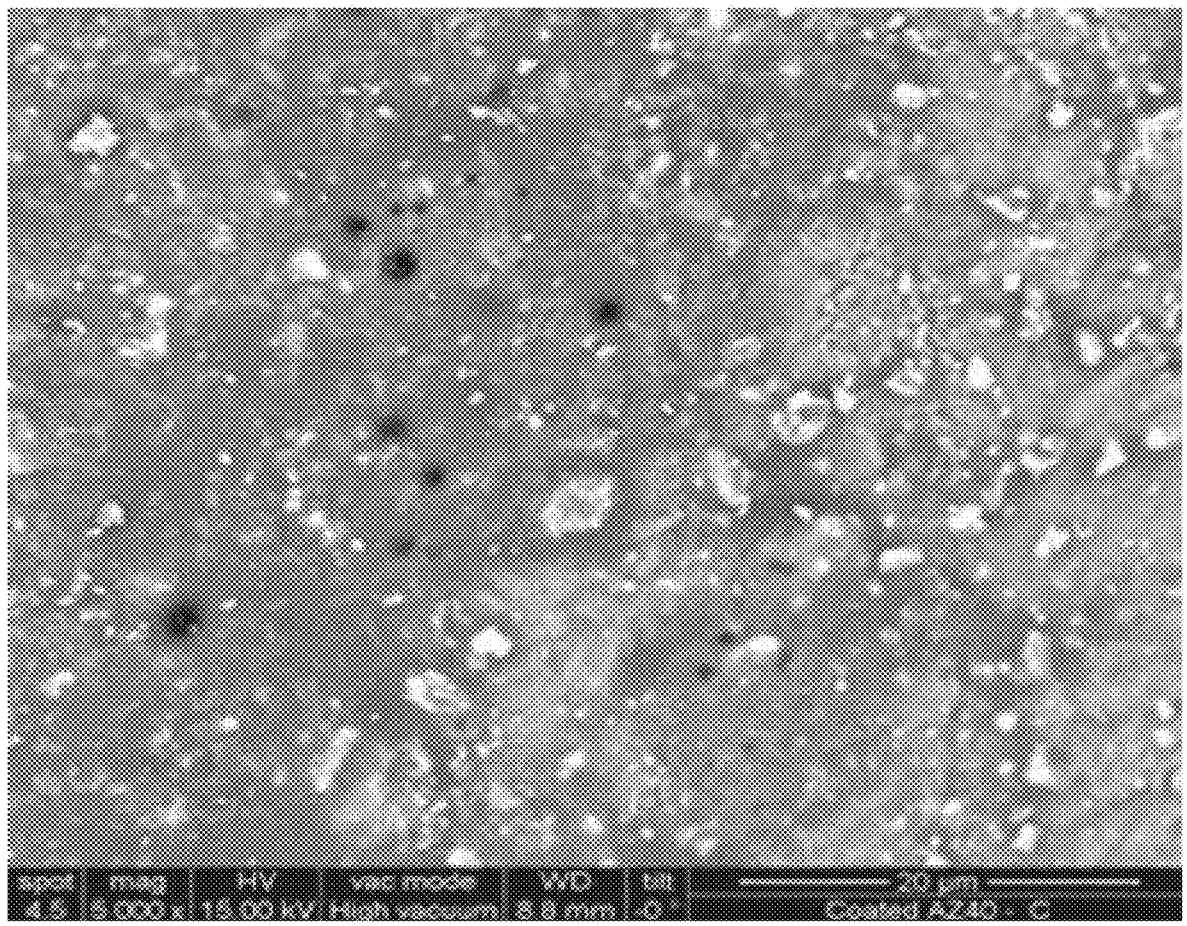
FIG. 5A includes an SEM image of a sample shaped abrasive particle.
Figure 5B:
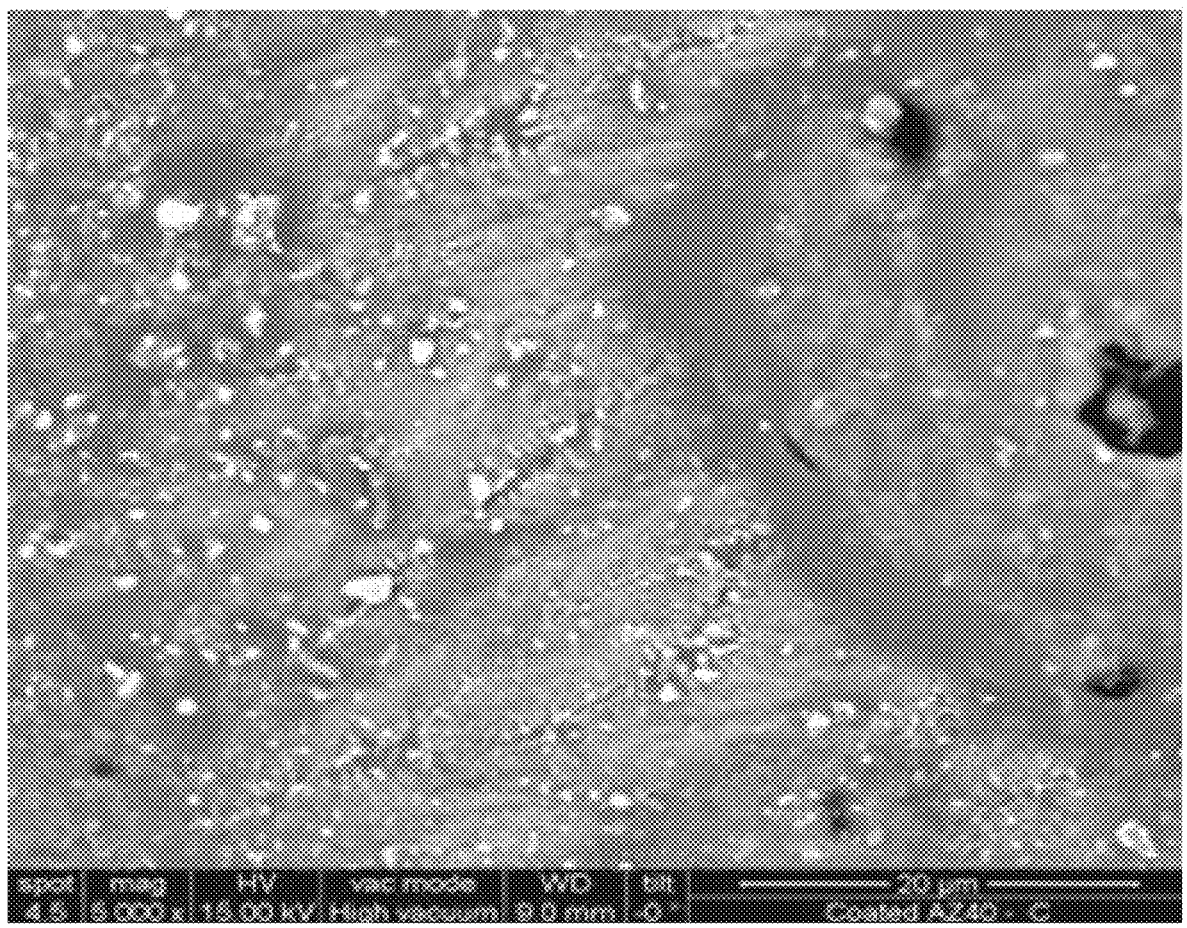
FIG. 5B includes an SEM image of a sample shaped abrasive particle.

A sample of coated abrasive particles Sample 10 was formed according to a process similar to that used for Sample 2, except that the amorphous material was not milled and had a D50 equal to at least 60 microns. FIGS. 5A and 5B include an image of the surface of Sample 10. As shown in FIGS. 5A and 5B, the surface of Sample 10 was imaged using a Scanning Electron Microscope (SEM), SEM model Quanta 200, manufactured by FEI, 5350 NE Dawson Creek Drive, Hillsboro, Oreg. 97124 USA. The SEM was equipped with an Energy Dispersive Spectroscopy (EDS) detector, model EDAX Genesis 2, manufactured by EDAX Inc., 91 McKee Drive Mahwah, N.J. 07430. FIGS. 5A and 5B show that the cryolite ($Na_3AlF_6$) is in a phase distinct from the phase of the amorphous material.

A sample of coated abrasive particles Sample 11 was formed according to a process similar to that used for Sample 4, except that the amorphous material was not milled and had a D50 equal to at least 60 microns.

A sample of coated abrasive particles Sample 12 was formed according to a process similar to that used for Sample 4, except that the amorphous material was not milled and had a D50 equal to at least 60 microns.

Figure 6A:
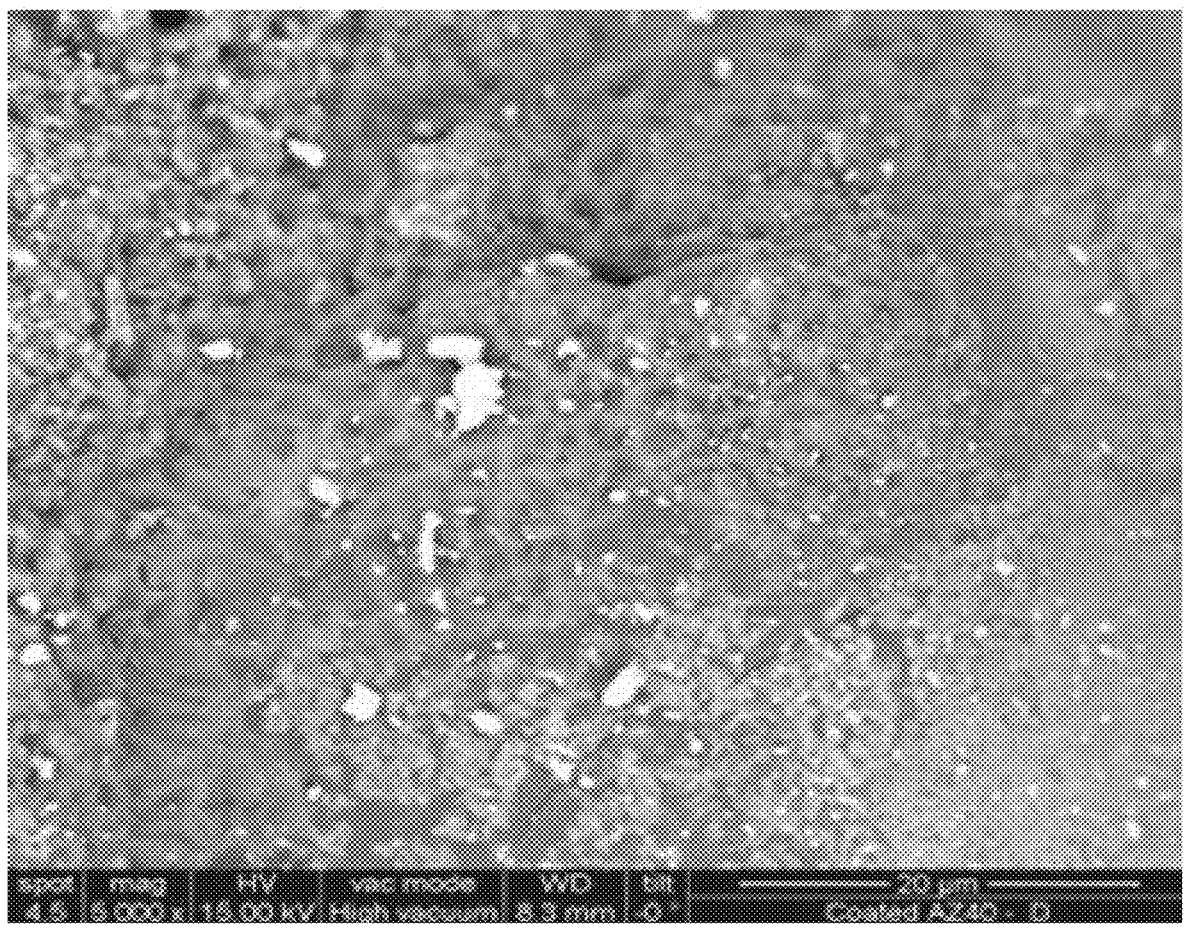
FIG. 6A includes an SEM image of a sample shaped abrasive particle.
Figure 6B:
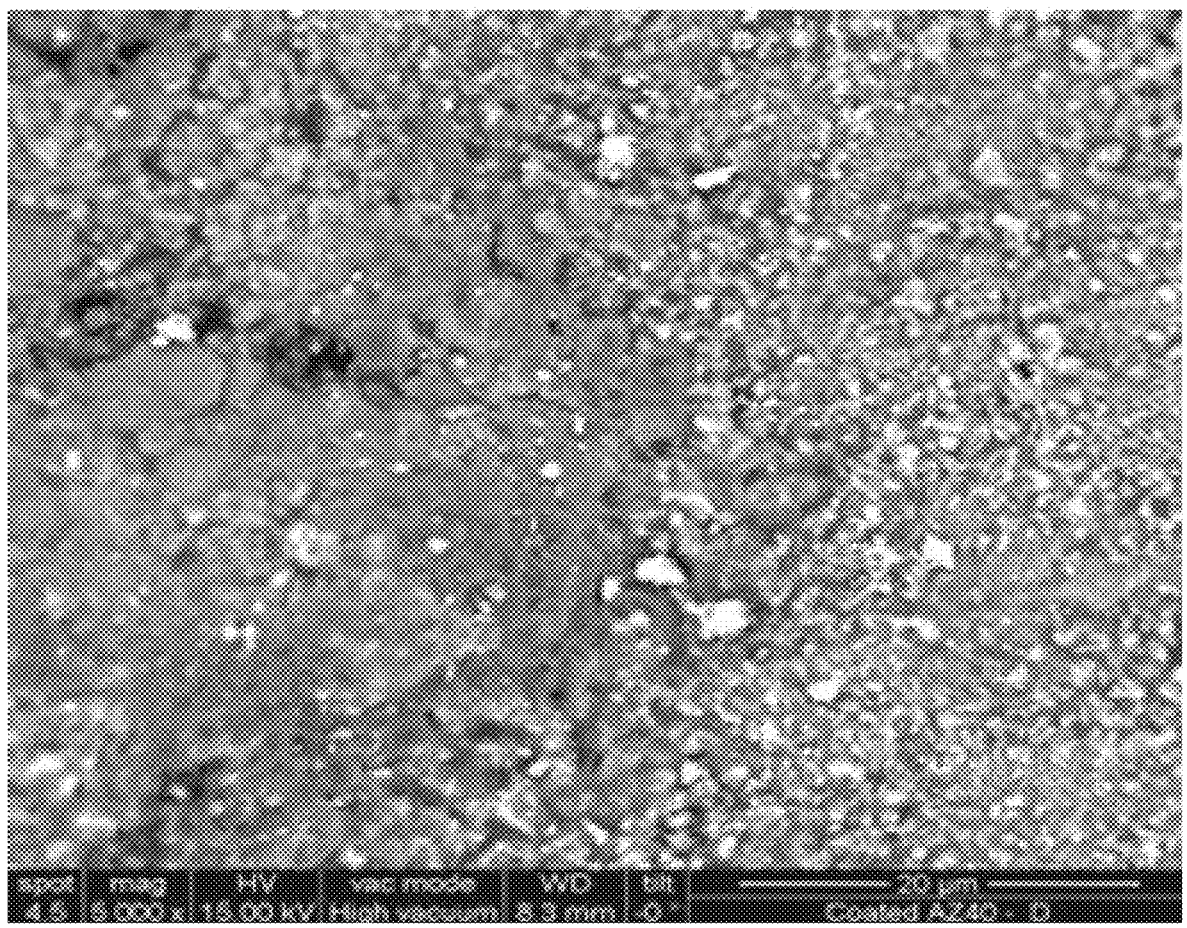
FIG. 6B includes an SEM image of a sample shaped abrasive particle.

FIGS. 6A and 6B include an image of the surface of a sample formed according to a process similar to that used for Sample 4, except that the amorphous material was not milled and had a D50 equal to at least 60 microns. As shown in FIGS. 6A and 6B, the surface of the sample was imaged using SEM. FIGS. 6A and 6B show that the cryolite ($Na_3AlF_6$) is in a phase distinct from the phase of the amorphous material, and that the cryolite ($Na_3AlF_6$) is in a phase distinct from the phase of the iron oxide ($Fe_2O_3$).

A sample of coated abrasive particles Sample 13 was formed according to a process similar to that used for Sample 4, except that the amorphous material was not milled and had a D50 equal to at least 60 microns and sintering was conducted at 700° C.

Samples 10-13 were tested to determine the G-ratio and specific grinding energy relative to uncoated abrasive grains. The test was conducted using the parameters in Table 2. The grinding performance of Samples 10-13 is shown in Table 4.

TABLE 4

Grinding Performance of Samples 10-13

| Sample | 0.0015" depth of cut | | 0.004" depth of cut | |
|---|---|---|---|---|
| | G-ratio | Specific Grinding Energy | G-ratio | Specific Grinding Energy |
| Uncoated grain | 100% | 100% | 100% | 100% |
| Sample 10 | 103% | 94% | 98% | 95% |
| Sample 11 | 110% | 107% | 110% | 87% |
| Sample 12 | 110% | 88% | 110% | 87% |
| Sample 13 | 105% | 87% | 114% | 85% |

Example 7

A sample of coated abrasive particles Sample 14 was formed according to the same method used for Sample 1 except that 50 grams of potassium fluoroaluminate ($K_3AlF_6$) was added to the mixer along with the powdered amorphous material.

A sample of coated abrasive particles Sample 15 was formed according to the same method used for Sample 1 except that 50 grams of chromium carbide ($Cr_3C_2$) powder was added to the mixer along with the powdered amorphous material.

A sample of coated abrasive particles Sample 16 was formed according to the same method used for Sample 1 except that 50 grams of sodium fluoroborate ($NaBF_4$) powder was added to the mixer along with the powdered amorphous material.

A sample of coated abrasive particles Sample 17 was formed according to the same method used for Sample 1 except that 50 grams of calcium fluoride ($CaF_2$) powder was added to the mixer along with the powdered amorphous material.

A sample of coated abrasive particles Sample 18 was formed according to the same method used for Sample 1 except that 50 grams of calcium carbonate ($CaCO_3$) powder was added to the mixer along with the powdered amorphous material.

A sample of coated abrasive particles Sample 19 was formed according to the same method used for Sample 1 except that 50 grams of calcium potassium fluoroborate ($KBF_4$) powder was added to the mixer along with the powdered amorphous material.

A sample of coated abrasive particles Sample 20 was formed according to the same method used for Sample 1 except that 50 grams of zirconium dioxide ($ZrO_2$) powder was added to the mixer along with the powdered amorphous material.

Example 8

A sample of coated abrasive particles Sample 21 was formed according to the same method used for Sample 1 except that 30 grams of a cryolite ($Na_3AlF_6$) powder and 30 grams of an iron oxide ($Fe_2O_3$) powder were added to the mixer along with the 25 grams of powdered amorphous material.

Example 9

A sample of coated abrasive particles Sample 22 was formed according to the same method used for Sample 1 except that 40 grams of a cryolite ($Na_3AlF_6$) powder and 40 grams of an iron oxide ($Fe_2O_3$) powder were added to the mixer along with the 25 grams of powdered amorphous material.

Example 10

A sample of coated abrasive particles Sample 23 was formed according to the same method used for Sample 1 except that 50 grams of a cryolite ($Na_3AlF_6$) powder and 50 grams of an iron oxide ($Fe_2O_3$) powder were added to the mixer along with the 25 grams of powdered amorphous material.

Example 11

A sample of coated abrasive particles Sample 24 was formed according to the same method used for Sample 1 except that 40 grams of a cryolite ($Na_3AlF_6$) powder and 40 grams of an iron oxide ($Fe_2O_3$) powder were added to the mixer along with the 25 grams of powdered amorphous material.

Example 12

A sample of coated abrasive particles Sample 25 was formed according to the same method used for Sample 1 except that 40 grams of a cryolite ($Na_3AlF_6$) powder and 20 grams of an iron oxide ($Fe_2O_3$) powder were added to the mixer along with the 25 grams of powdered amorphous material.

Example 13

A sample of coated abrasive particles Sample 26 was formed according to the same method used for Sample 1 except that 40 grams of a potassium fluoroaluminate ($KAlF_4$) powder and 20 grams of an iron oxide ($Fe_2O_3$) powder were added to the mixer along with the 25 grams of powdered amorphous material.

Each of Samples 15-20 and 24-26 were analyzed using an inductively coupled plasma (ICP) Optical emission spectrometer, Varian 720-ES, manufactured by Varian Medical Systems, Inc. 3100 Hansen Way Palo Alto, Calif. 94304-1038. For each sample, 0.2 grams of sample were submerged in a mixture of 8 mL of 70% nitric acid ($HNO_3$) and 2 mL of 40% hydrofluoric acid (HF). This mixture was placed in a 50 mL covered PTFE bottle. The PTFE bottle was placed in distilled water container in air and heated in a pressurized environment to approximately 105° C. for approximately 3 hours. The PTFE bottle was allowed to cool, and the resulting liquid was diluted with deionized water to 100 mL and analyzed to determine boron (B) and lithium (Li) content. Then an additional 0.5000±0.0010 grams of sample were placed into a Pt/Au crucible, 3.00 grams of lithium tetraborate (99.998%) were added to the crucible, mixed well, and 200 microliters solution of lithium bromide were added. The crucible was placed on a fusion machine, model Phoenix VFD6000, manufactured by XRF Scientific, Ltd., 98 Guthrie Street, Osborne Park Wash. 6017, Australia. The temperature of the crucible was set to 1300° C.±30. The time sequence was 60 seconds pre-melt, 120 seconds melting, and 240 seconds swirling. A clear melt was obtained at the end of the time sequence, and the crucible was cooled with compressed air and the contents were removed by gently tapping the bottom on a soft surface. Approximately 125 mL of deionized water and 20 mL of hydrochloric acid (HCl) (37% (m/m) solution—GR Grade) was added to a glass beaker which was covered with a watch glass, and the melt was dissolved on a hotplate. Once the dissolution was complete, the beaker was removed from the hotplate and the solution allowed to cool. The solution was transferred into a 250 mL volumetric flask and allowed to cool. Then the solution was diluted with deionized water to the 250 mL mark and mixed well. The solution was used for the analysis of Al, Ba, Ca, Ce, Co, Cr, Cu, Fe, Ga, Hf, K, La, Mn, Mo, Na, Nb, Nd, Ni, Si, Ta, Ti, V, Y, Zn, Zr.

Sample 25 was also analyzed using combustion ion chromatography to determine the content of fluorine (F).

The results for this analysis are shown in Table 5 with a margin of error of approximately 10%. The values are given as weight percentages of the composition of the entire sample of coated abrasive particles and represent the amount of the elemental components in the coated abrasive particle from the coating (i.e., the amorphous material and the filler materials). The amount of the elemental components in the coated abrasive particle from the coating are calculated by subtracting the elemental contents of the components in the abrasive particle without the coating as also measured using ICP analysis.

TABLE 6

Grinding Performance of Samples 14-18 and 21-23

|  | 0.0015" depth of cut | | | 0.004" depth of cut | | |
| --- | --- | --- | --- | --- | --- | --- |
| Sample | G-ratio | Specific Grinding Energy | MRR % | G-ratio | Specific Grinding Energy | MRR % |
| Uncoated Grain | 100% | 100% | 100% | 100% | 100% | 100% |
| Sample 14 (K$_3$AlF$_6$) | 113% | 90% | — | 121% | 90% | — |
| Sample 15 (Cr$_3$C$_2$) | 107% | 89% | 103% | 113% | 86% | 112% |
| Sample 16 (NaBF$_4$) | 118% | 85% | 124% | 118% | 85% | 125% |
| Sample 17 (CaF$_2$) | 113% | 90% | 120% | 106% | 97% | 106% |
| Sample 18 (CaCO$_3$) | 112% | 92% | 123% | 102% | 101% | 105% |
| Sample 21 (Na$_3$AlF$_6$ & Fe$_2$O$_3$) | 121% | 84% | 108% | 118% | 88% | 121% |
| Sample 22 (Na$_3$AlF$_6$ & Fe$_2$O$_3$) | 121% | 85% | 122% | 120% | 85% | 125% |
| Sample 23 (Na$_3$AlF$_6$ & Fe$_2$O$_3$) | 133% | 80% | 122% | 123% | 87% | 120% |

Figure 7A:
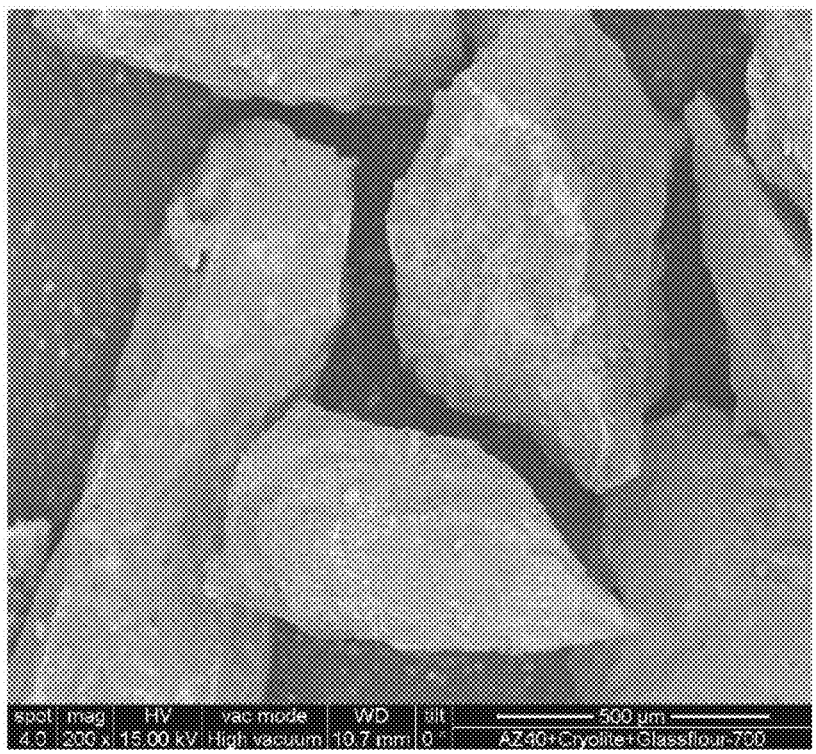
FIG. 7A includes an SEM image of a sample shaped abrasive particle.
Figure 7B:
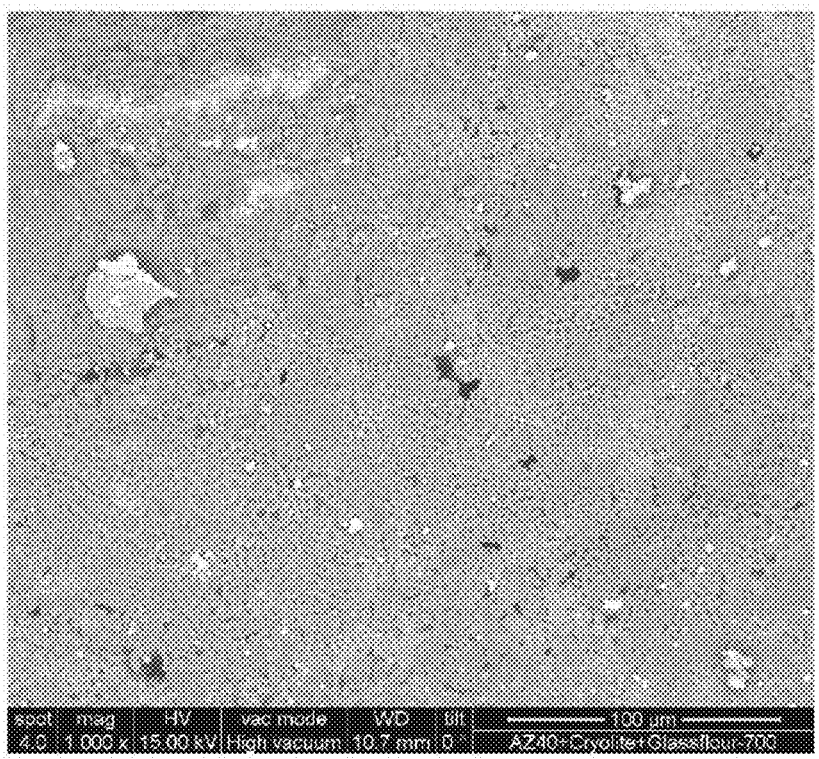
FIG. 7B includes an SEM image of a sample shaped abrasive particle.
Figure 8:
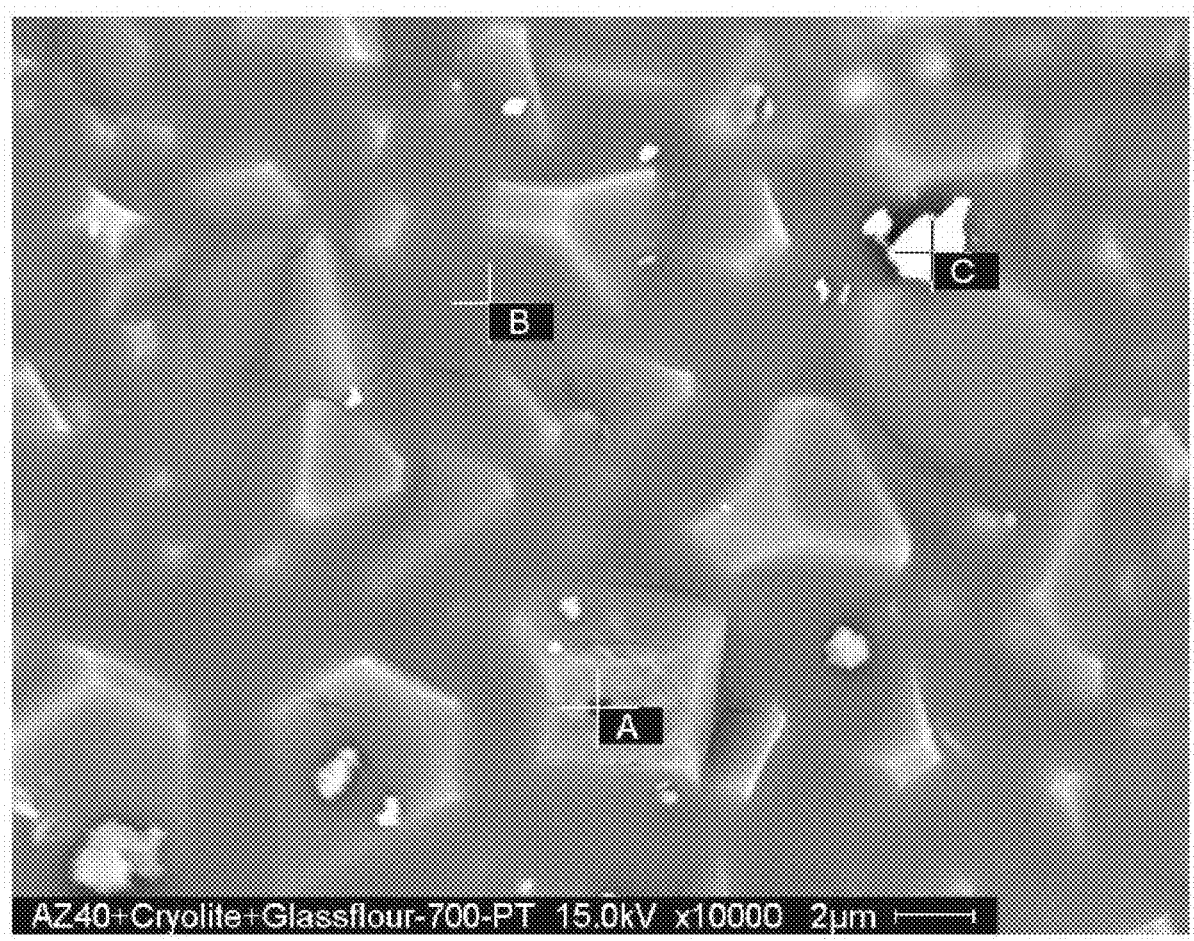
FIG. 8 includes an SEM image of a sample shaped abrasive particle.
Figure 9A:
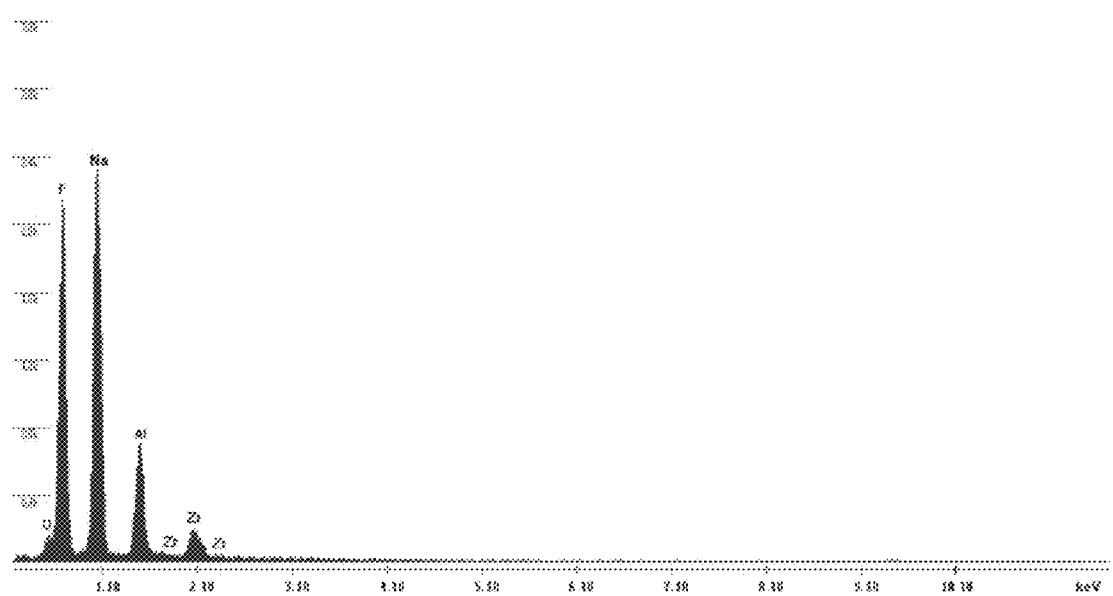
FIG. 9A includes an ED spectrum of the sample shaped abrasive particle shown in FIG. 8 taken at point A.
Figure 9B:
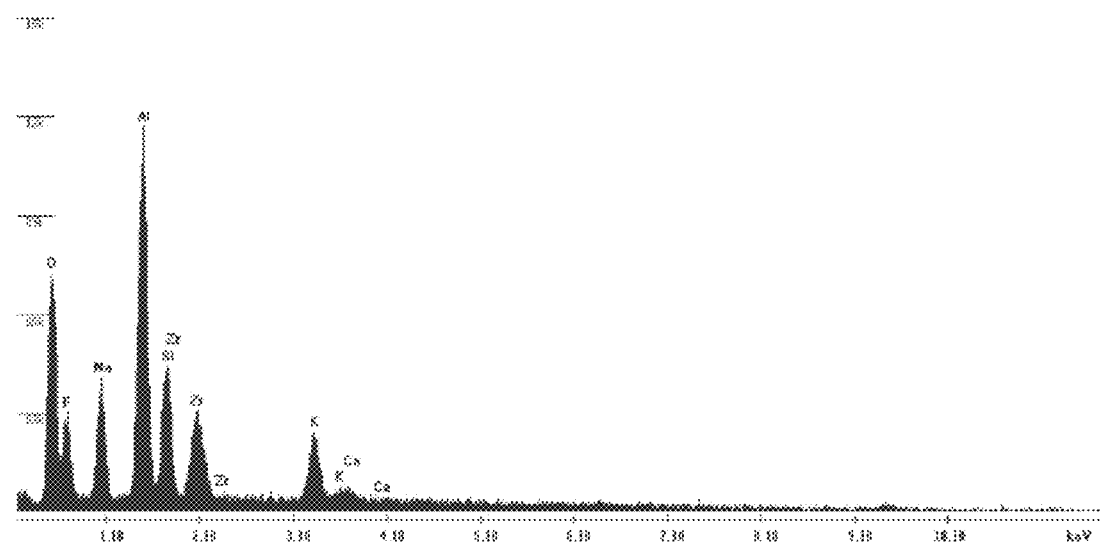
FIG. 9B includes an ED spectrum of the sample shaped abrasive particle shown in FIG. 8 taken at point B.
Figure 9C:
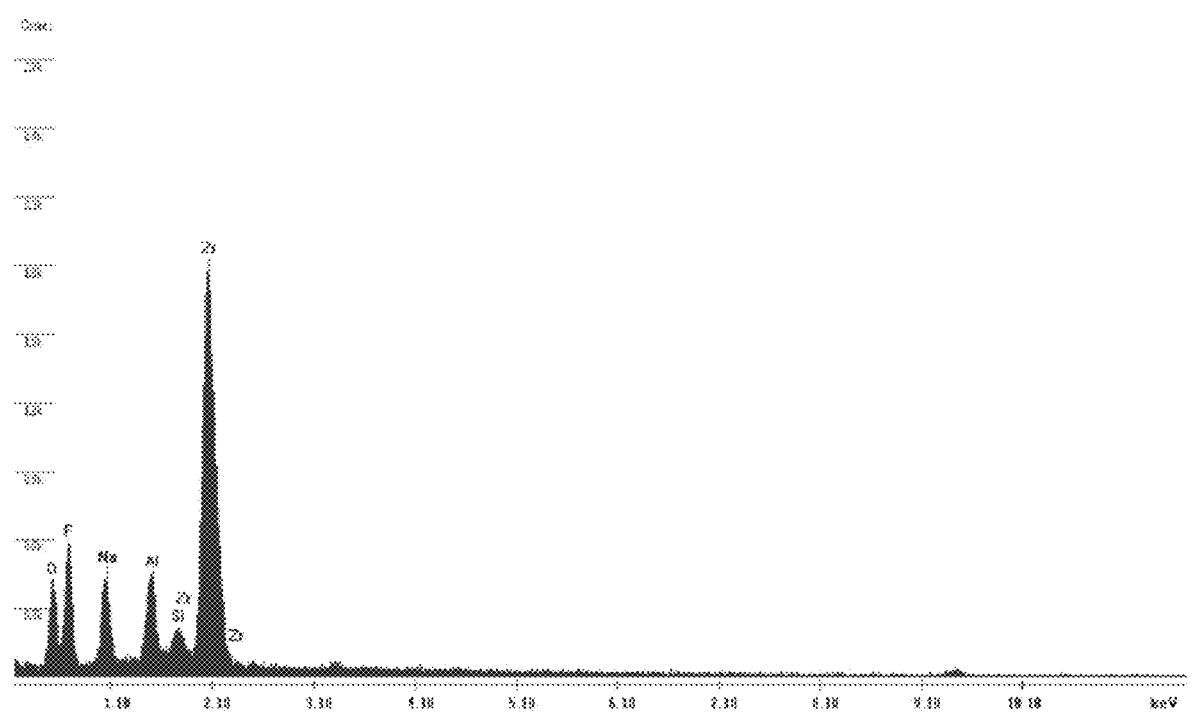
FIG. 9C includes an ED spectrum of the sample shaped abrasive particle shown in FIG. 8 taken at point C.

FIGS. 7A, 7B and 8 include SEM images of a sample shaped abrasive particle that includes a cryolite filler in the amorphous coating material. FIG. 9A includes an ED spectrum of the sample shaped abrasive particle shown in FIG. 8 taken at point A. FIG. 9B includes an ED spectrum of the sample shaped abrasive particle shown in FIG. 8 taken at point B. FIG. 9C includes an ED spectrum of the sample shaped abrasive particle shown in FIG. 8 taken at point C.

Figure 10:
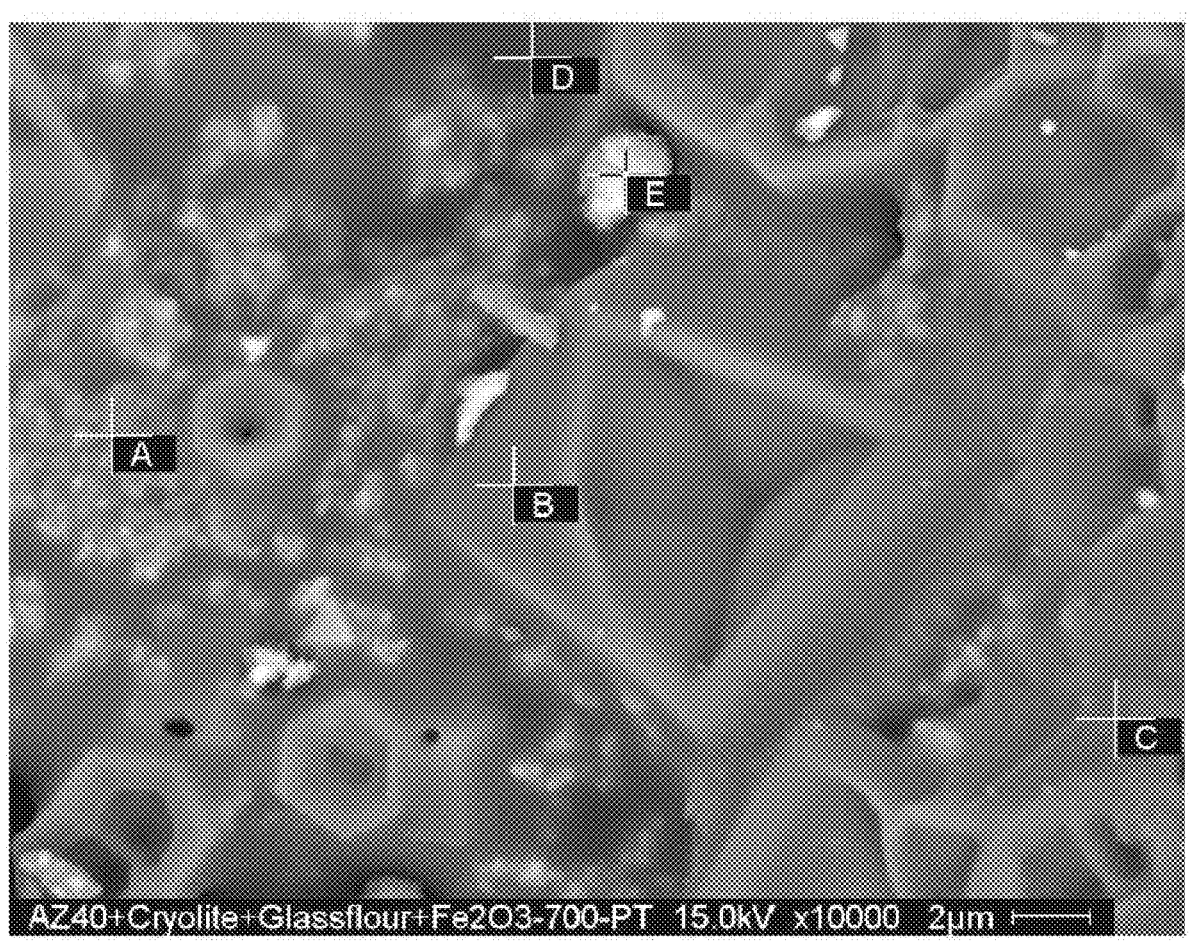
FIG. 10 includes an SEM image of a sample shaped abrasive particle.
Figure 11A:
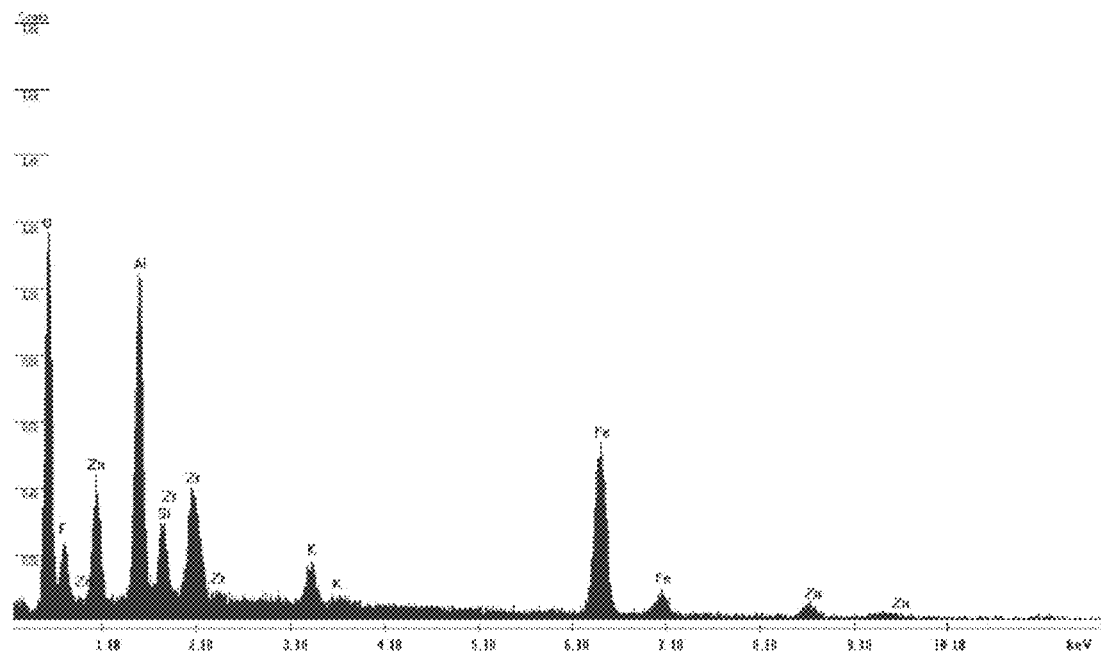
FIG. 11A includes an ED spectrum of the sample shaped abrasive particle shown in FIG. 10 taken at point A.
Figure 11B:
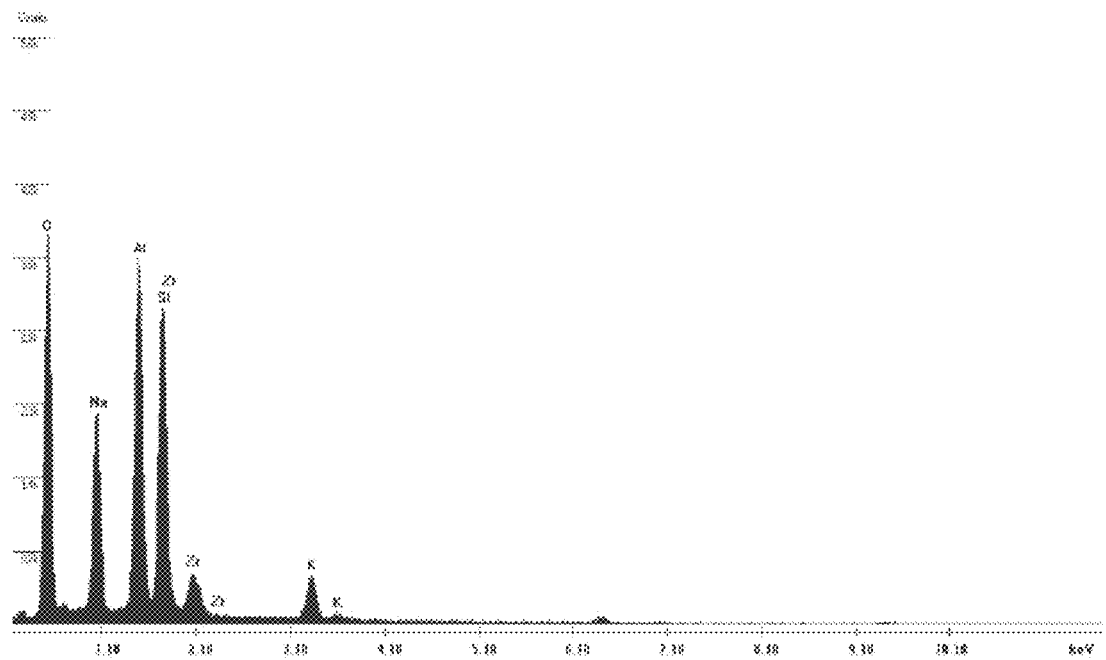
FIG. 11B includes an ED spectrum of the sample shaped abrasive particle shown in FIG. 10 taken at point B.

FIG. 10 includes an SEM image of a sample shaped abrasive particle that includes a cryolite filler and an iron oxide filler in the amorphous coating material. FIG. 11A includes an ED spectrum of the sample shaped abrasive particle shown in FIG. 10 taken at point A. FIG. 11B includes an ED spectrum of the sample shaped abrasive

TABLE 5

ICP/CIC Analysis

| | Samples (Element Weight Ratio %) | | | | | | | |
| --- | --- | --- | --- | --- | --- | --- | --- | --- |
| Element Components | 15 (Cr$_3$C$_2$) | 16 (NaBF$_4$) | 17 (CaF$_2$) | 18 (CaCO$_3$) | 19 (KBF$_4$) | 20 (ZrO$_2$) | 24 (Na$_3$AlF$_6$ & Fe$_2$O$_3$) | 25 (KAlF$_4$ & Fe$_2$O$_3$) |
| Si | 0.26 | 0.22 | 0.24 | 0.24 | 0.29 | 0.25 | 0.16 | 0.05 |
| Zn | 0.09 | 0.11 | 0.08 | 0.08 | 0.11 | 0.09 | 0.05 | 0.02 |
| Ca | — | — | 0.7 | 0.63 | — | — | — | — |
| B | 0.29 | 0.57 | 0.23 | 0.23 | 0.43 | 0.25 | 0.15 | 0.09 |
| Fe | 0.21 | 0.18 | 0.26 | 0.25 | 0.46 | 0.34 | 1.21 | 0.42 |
| Na | 0.11 | 0.60 | 0.1 | 0.10 | 0.12 | 0.11 | 0.58 | 0.05 |
| K | 0.09 | 0.11 | 0.09 | 0.09 | 0.86 | 0.09 | 0.05 | 0.43 |
| Li | 0.05 | 0.04 | 0.05 | 0.05 | 0.05 | 0.05 | 0.03 | 0.03 |
| Cr | 1.89 | — | — | — | — | — | — | — |
| F | — | — | — | — | — | — | — | 0.70 |

Figure 11C:
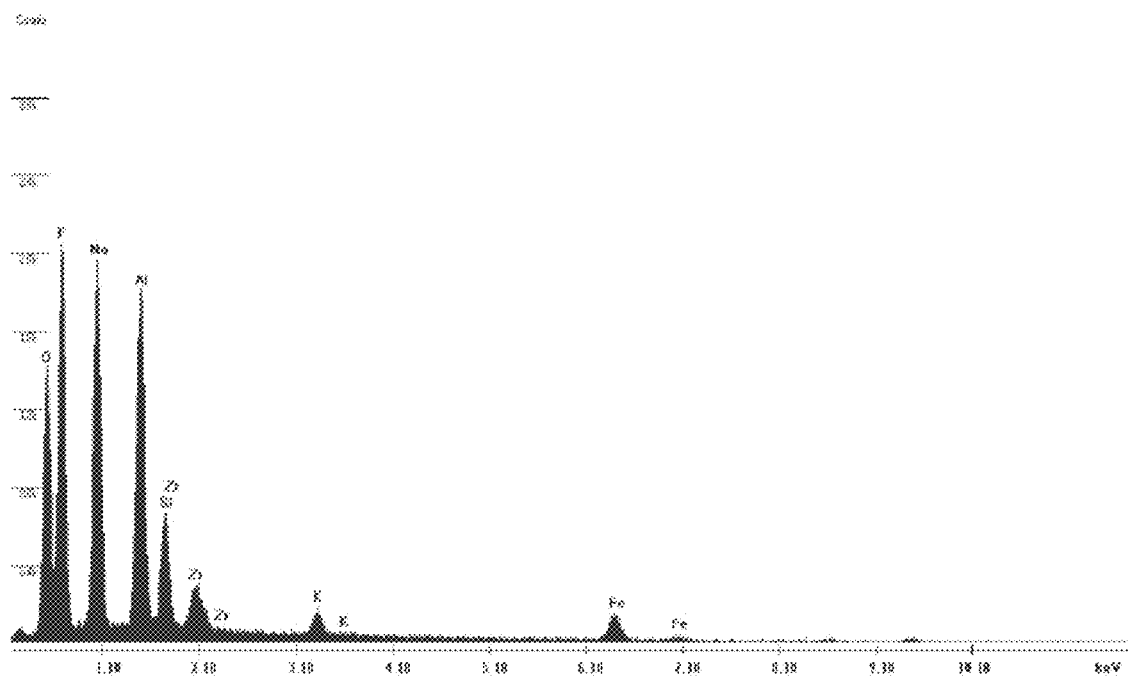
FIG. 11C includes an ED spectrum of the sample shaped abrasive particle shown in FIG. 10 taken at point C.
Figure 11D:
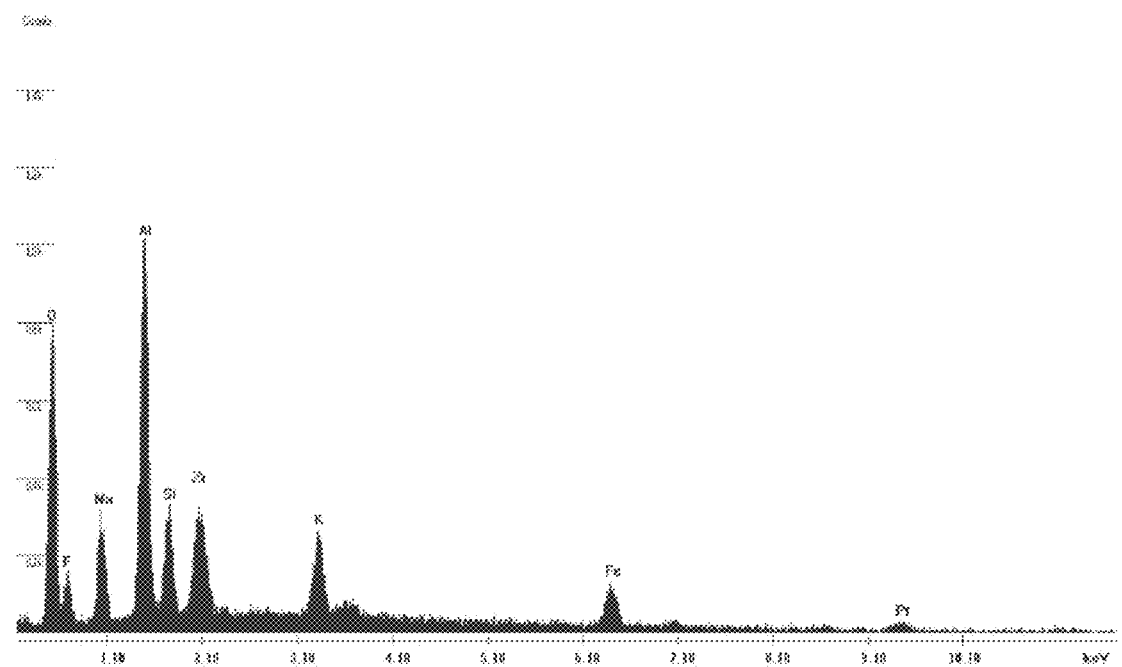
FIG. 11D includes an ED spectrum of the sample shaped abrasive particle shown in FIG. 10 taken at point D.
Figure 11E:
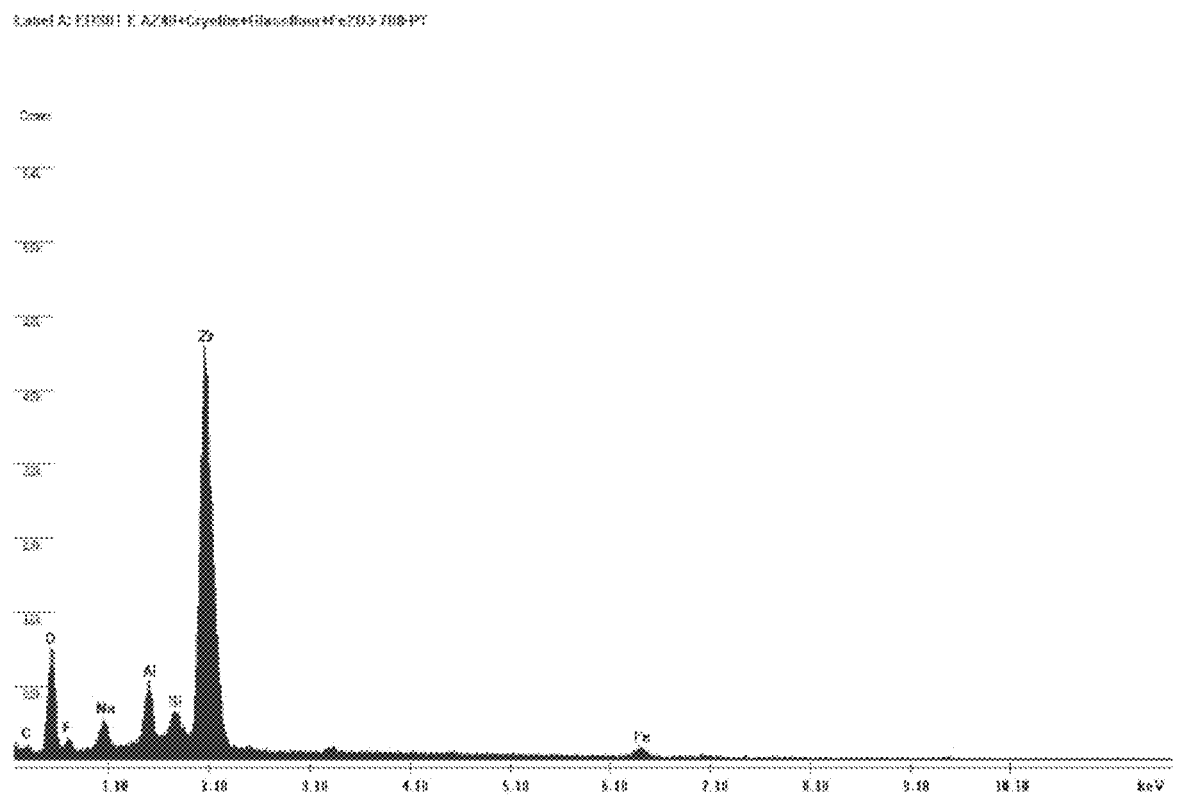
FIG. 11E includes an ED spectrum of the sample shaped abrasive particle shown in FIG. 10 taken at point E.

Samples 14-18 and 21-23 were tested to determine the G-ratio and specific grinding energy relative to uncoated abrasive grains. The test was conducted using the parameters in Table 2. The grinding performance of Samples 14-18 and 21-23 are shown in Table 6.

particle shown in FIG. 10 taken at point B. FIG. 11C includes an ED spectrum of the sample shaped abrasive particle shown in FIG. 10 taken at point C. FIG. 11D includes an ED spectrum of the sample shaped abrasive particle shown in FIG. 10 taken at point D. FIG. 11E includes an ED spectrum of the sample shaped abrasive particle shown in FIG. 10 taken at point E.

Figure 12A:
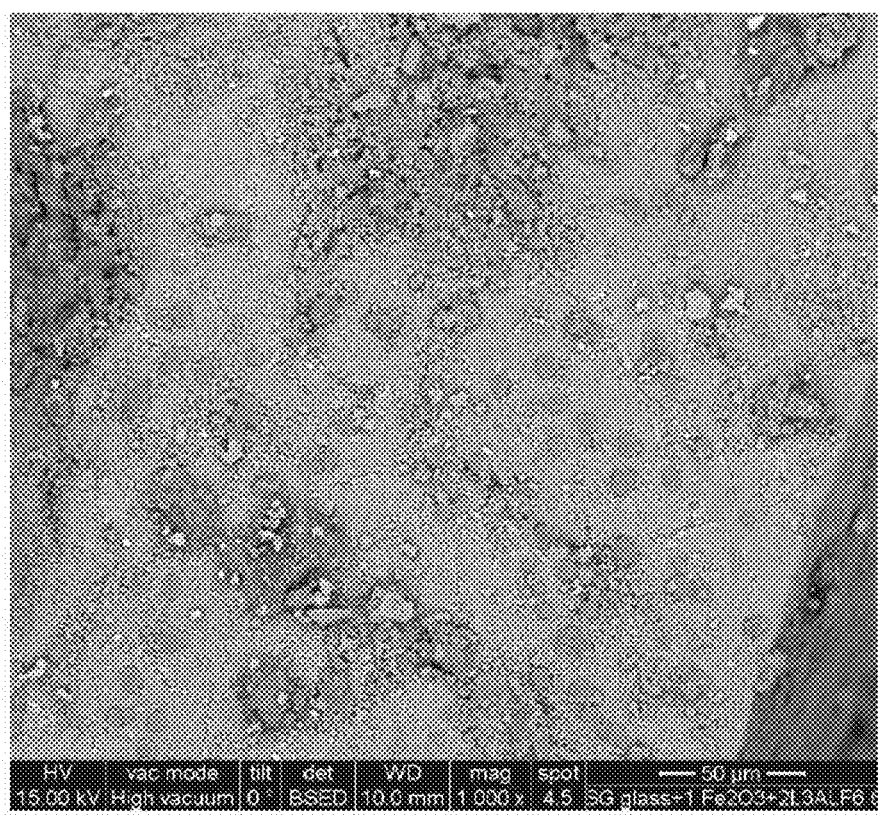
FIG. 12A includes an SEM image of a sample shaped abrasive particle.
Figure 12B:
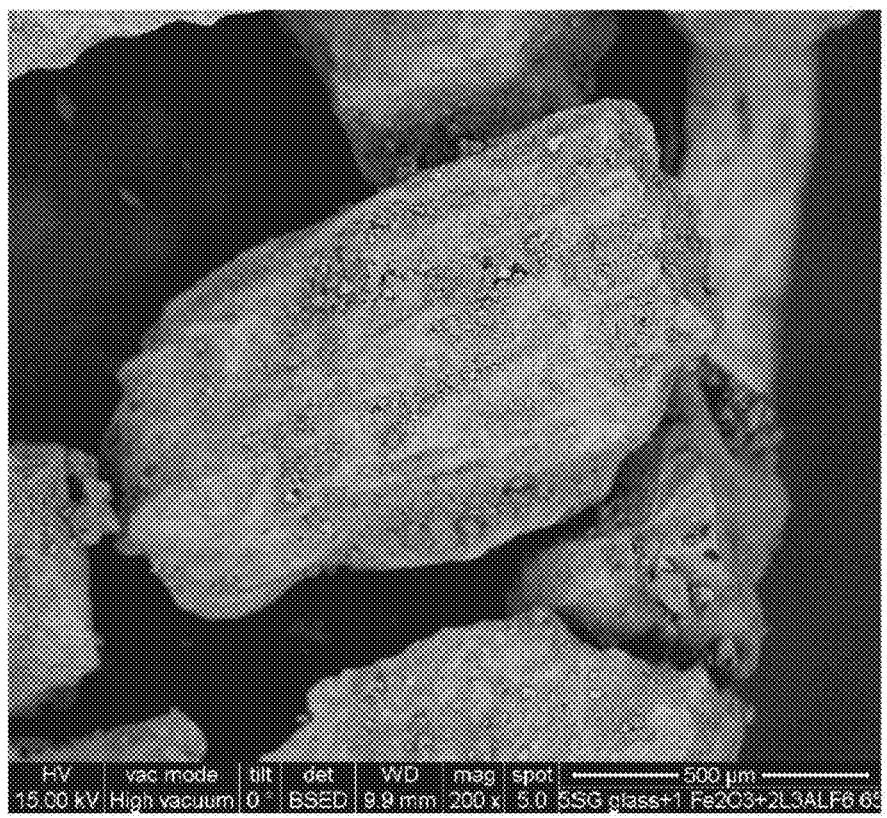
FIG. 12B includes an SEM image of a sample shaped abrasive particle.
Figure 13:
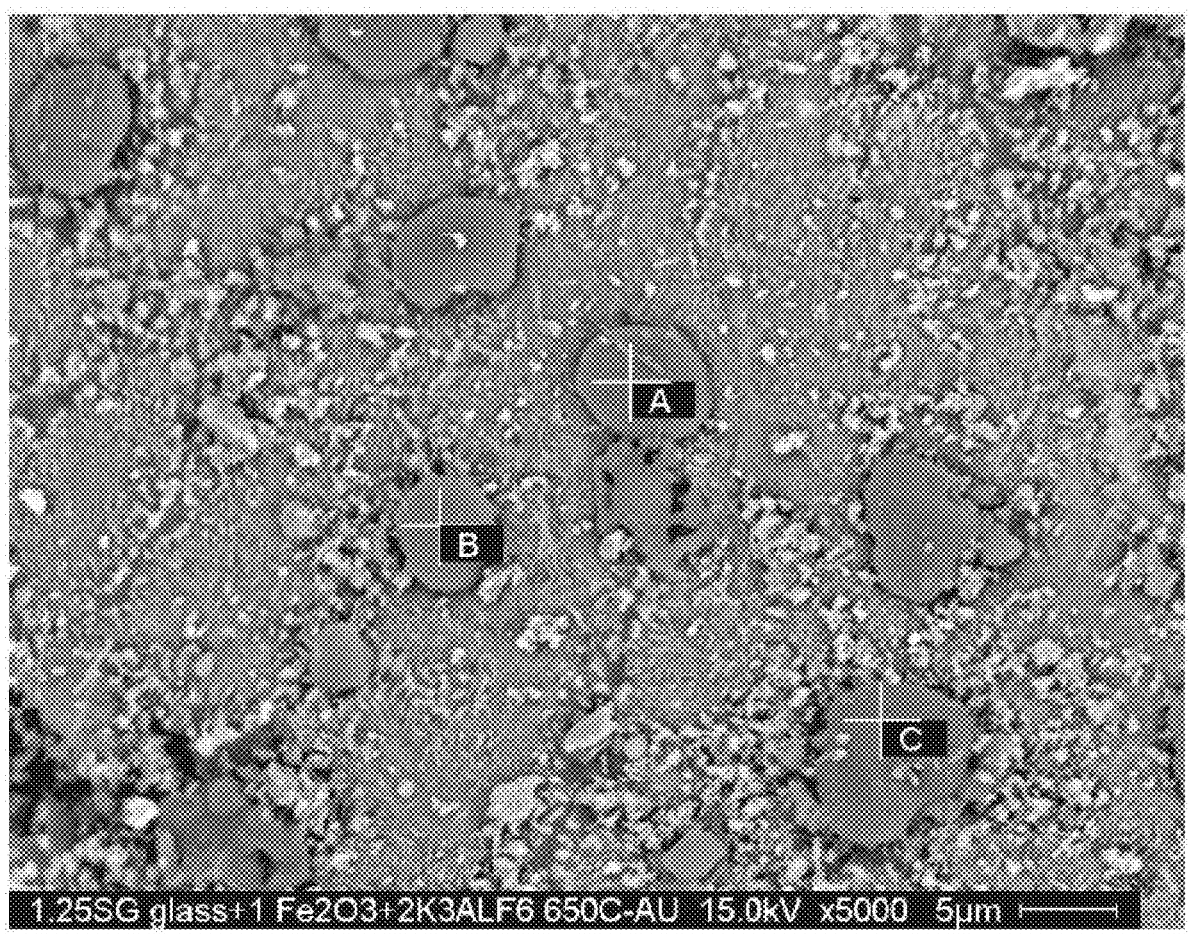
FIG. 13 includes an SEM image of a sample shaped abrasive particle.
Figure 14A:
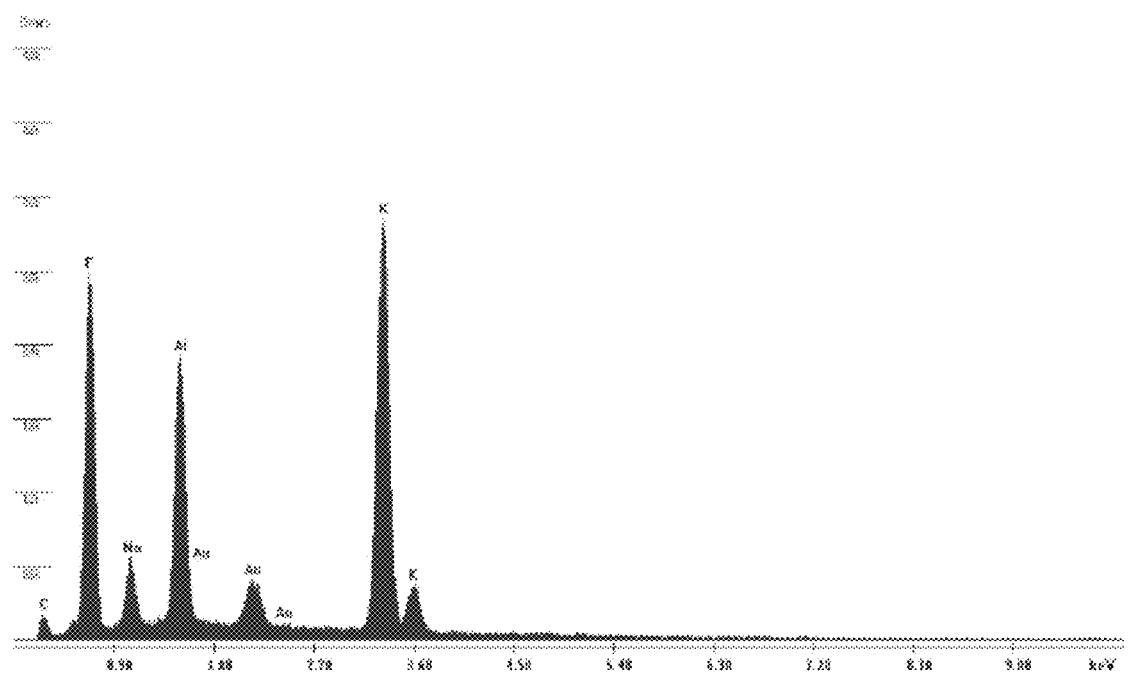
FIG. 14A includes an ED spectrum of the sample shaped abrasive particle shown in FIG. 13 taken at point A.
Figure 14B:
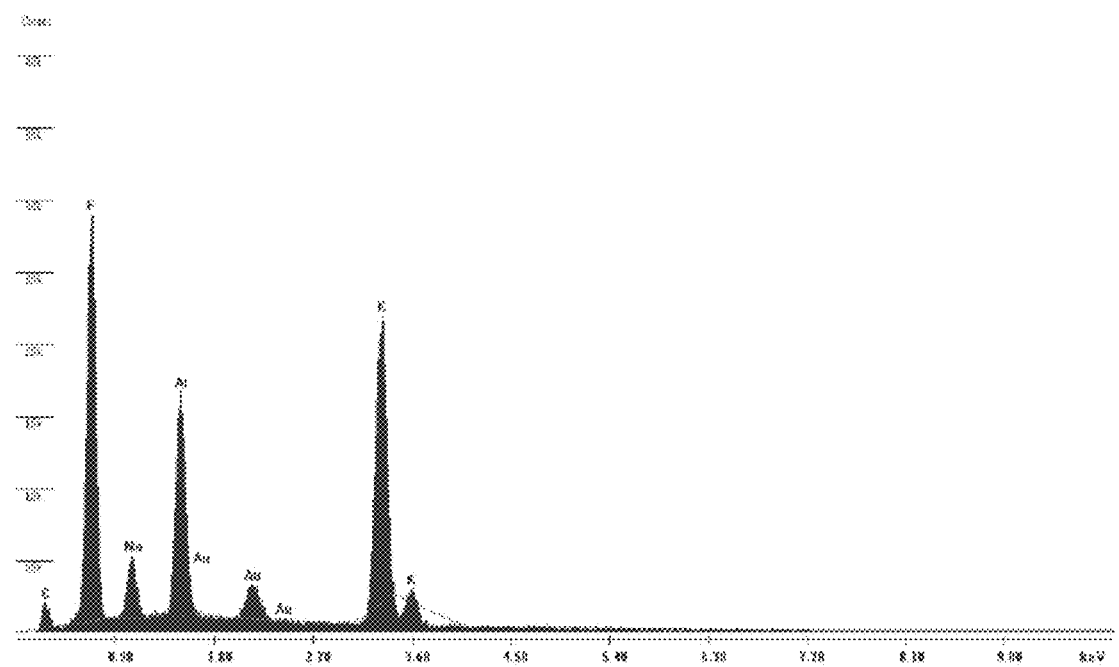
FIG. 14B includes an ED spectrum of the sample shaped abrasive particle shown in FIG. 13 taken at point B.
Figure 14C:
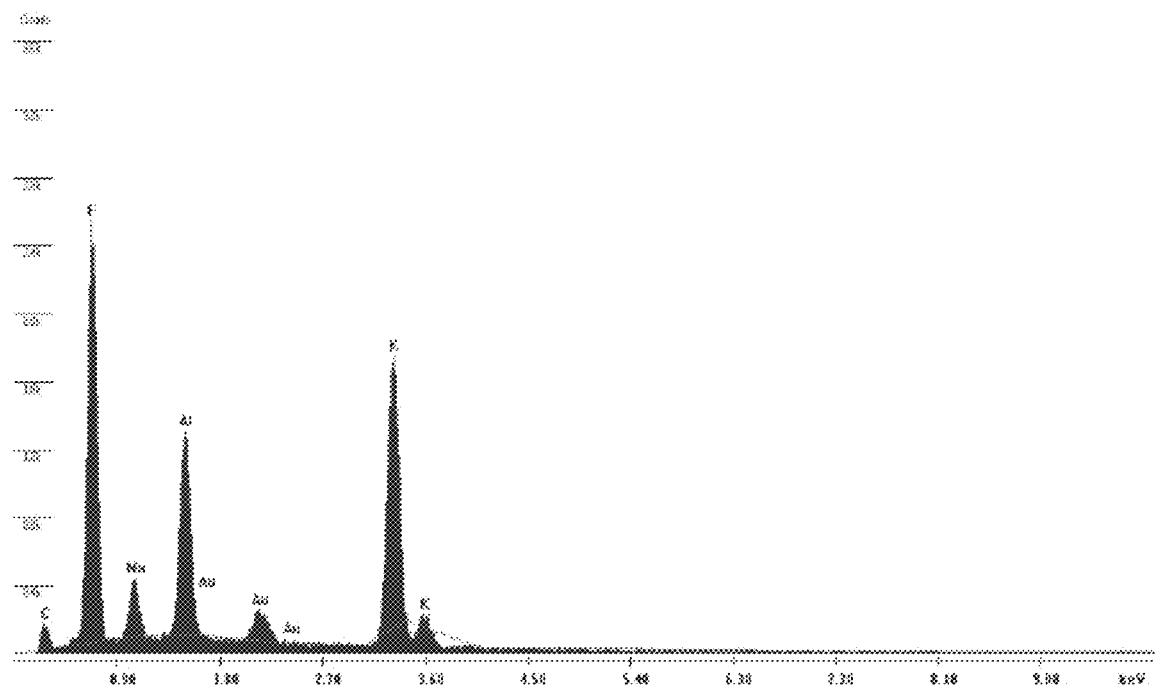
FIG. 14C includes an ED spectrum of the sample shaped abrasive particle shown in FIG. 13 taken at point C.

FIGS. 12A, 12B and 13 include SEM images of a sample shaped abrasive particle that includes an iron oxide filler and a potassium fluoroaluminate filler (a majority $KAlF_4$/a minority $K_3AlF_6$) in the amorphous coating material. FIG. 14A includes an ED spectrum of the sample shaped abrasive particle shown in FIG. 13 taken at point A. FIG. 14B includes an ED spectrum of the sample shaped abrasive particle shown in FIG. 13 taken at point B. FIG. 14C includes an ED spectrum of the sample shaped abrasive particle shown in FIG. 13 taken at point C.

Figure 15:
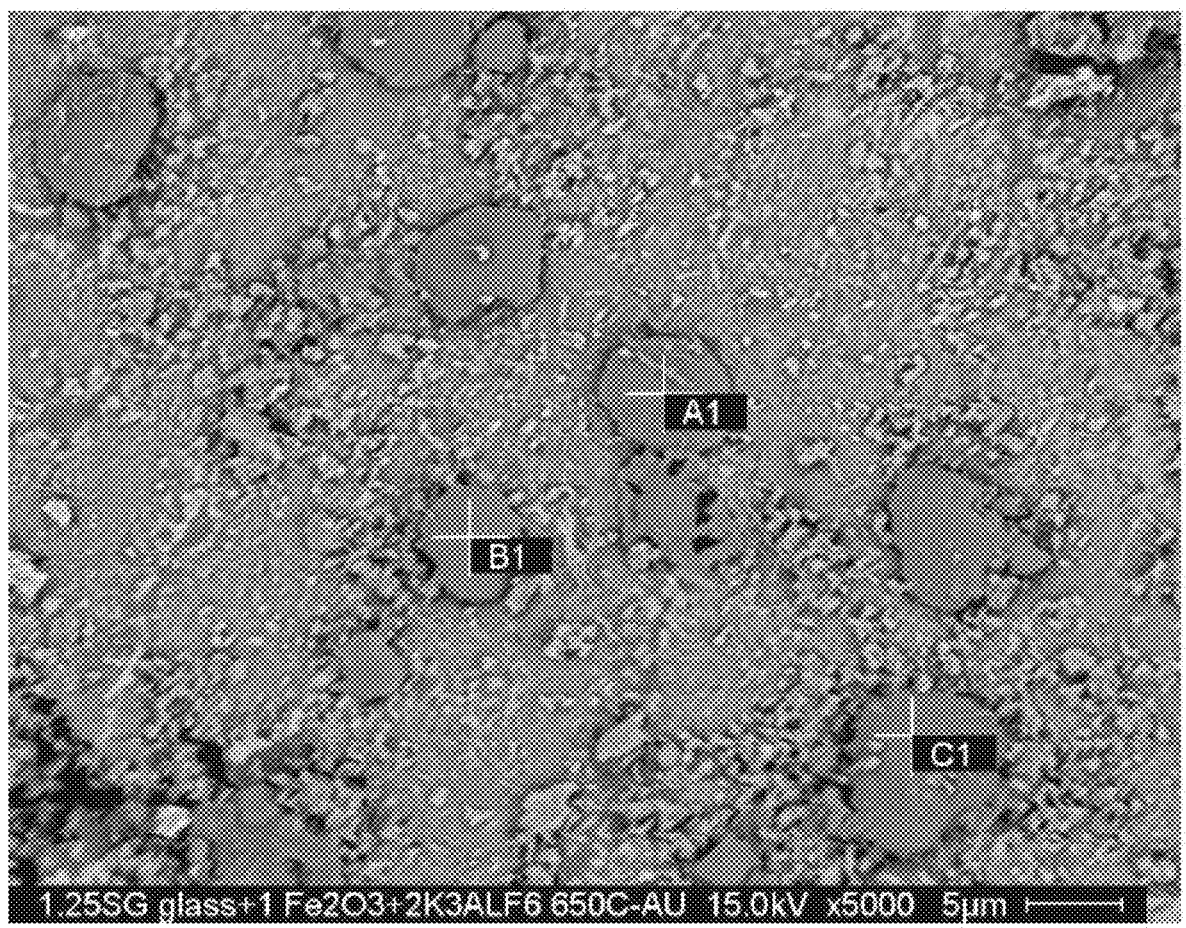
FIG. 15 includes an SEM image of a sample shaped abrasive particle.
Figure 16A:
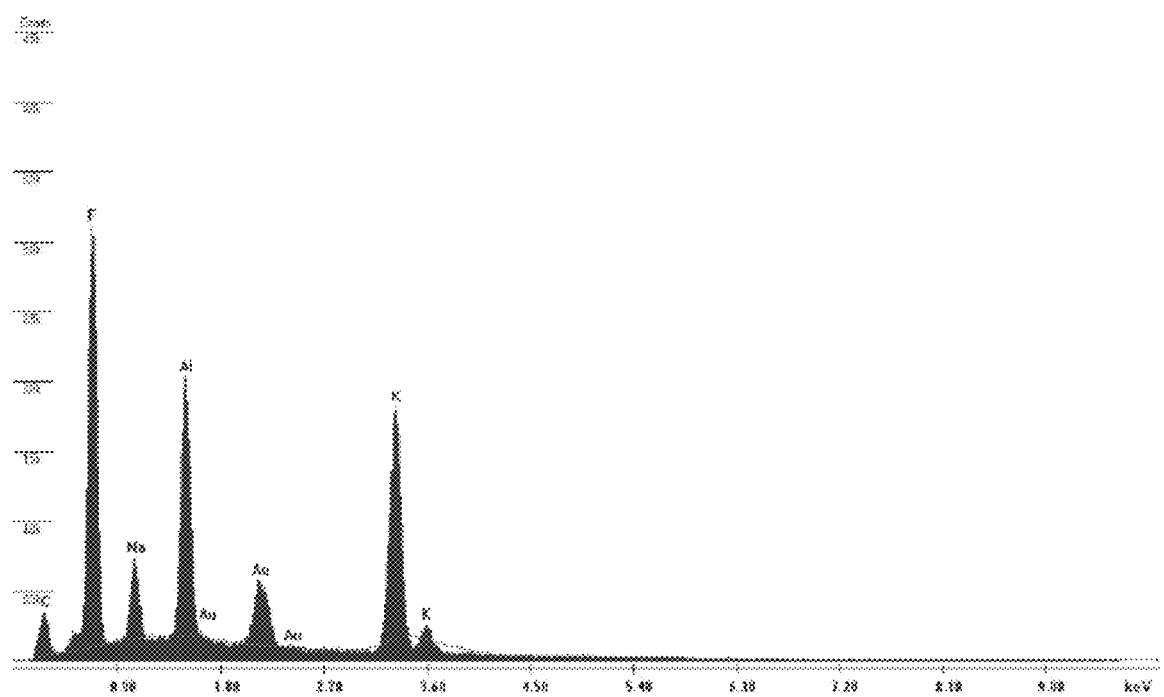
FIG. 16A includes an ED spectrum of the sample shaped abrasive particle shown in FIG. 15 taken at point A1.
Figure 16B:
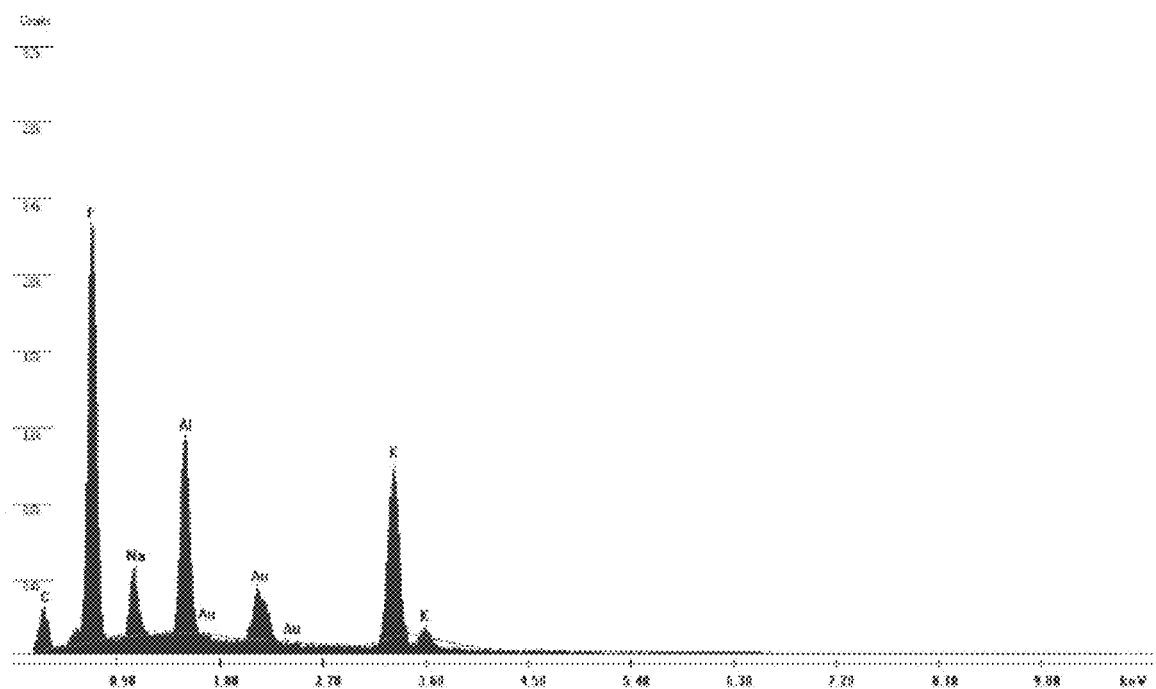
FIG. 16B includes an ED spectrum of the sample shaped abrasive particle shown in FIG. 15 taken at point B1.
Figure 16C:
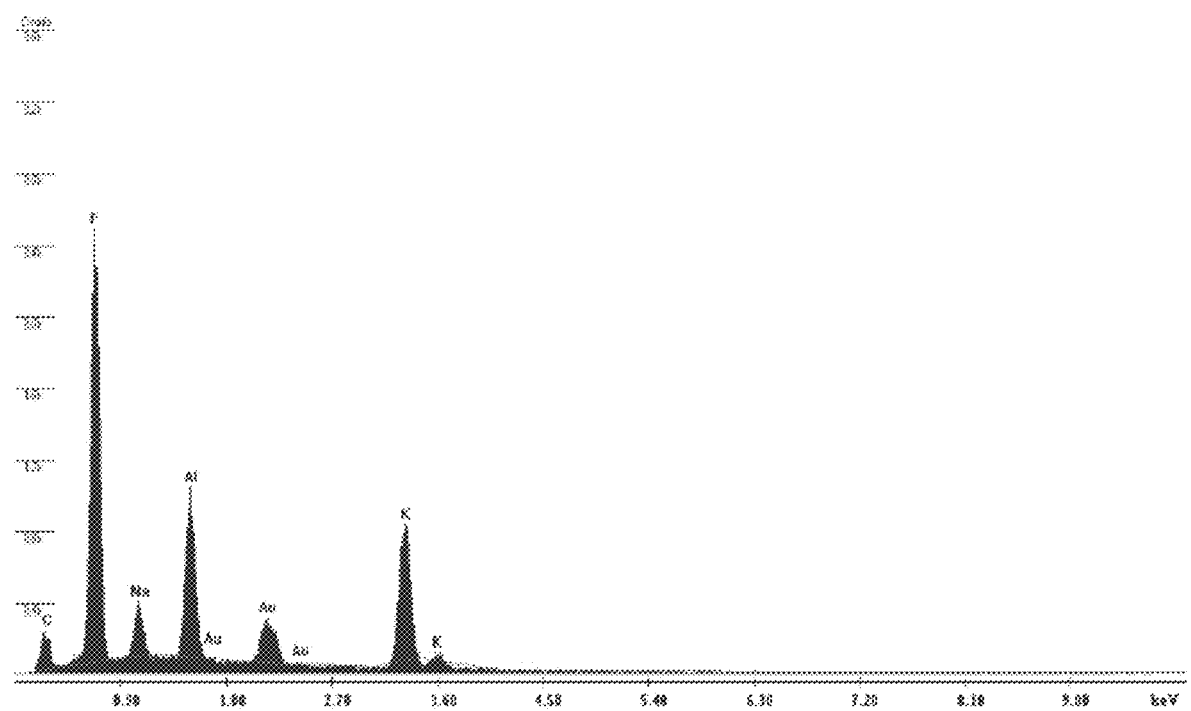
FIG. 16C includes an ED spectrum of the sample shaped abrasive particle shown in FIG. 15 taken at point C1.

FIG. 15 includes an SEM image of a sample shaped abrasive particle that includes an iron oxide filler and a $K_3AlF_6$ filler in the amorphous coating material. FIG. 16A includes an ED spectrum of the sample shaped abrasive particle shown in FIG. 15 taken at point A1. FIG. 16B includes an ED spectrum of the sample shaped abrasive particle shown in FIG. 15 taken at point B1. FIG. 16C includes an ED spectrum of the sample shaped abrasive particle shown in FIG. 15 taken at point $C_1$.

Figure 17A:
FIG. 17A includes an SEM image of a sample shaped abrasive particle.
Figure 17B:
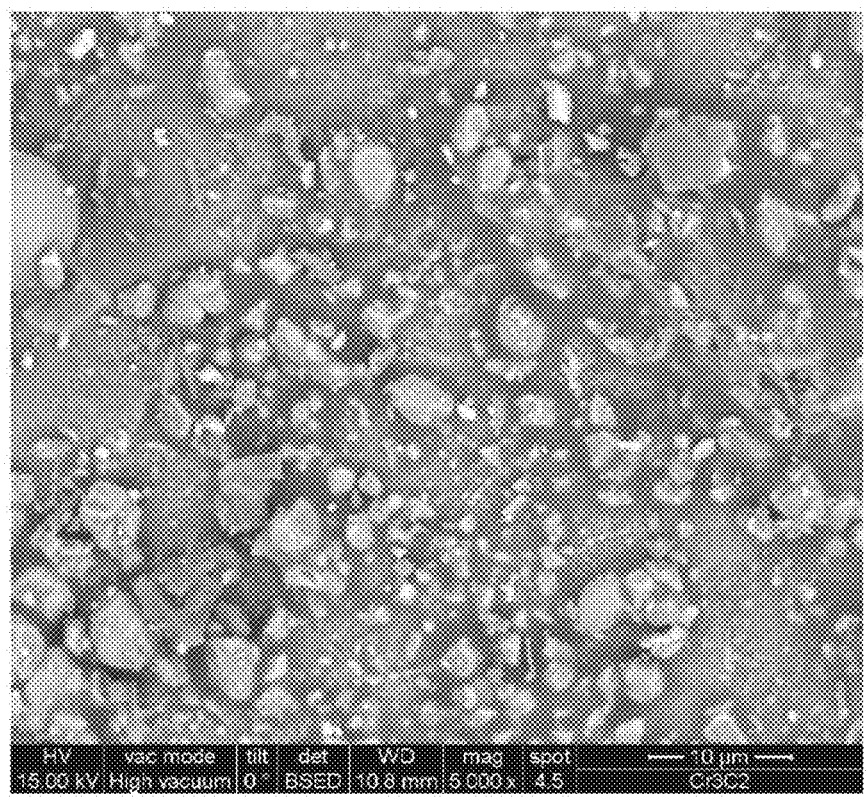
FIG. 17B includes an SEM image of a sample shaped abrasive particle.
Figure 18:
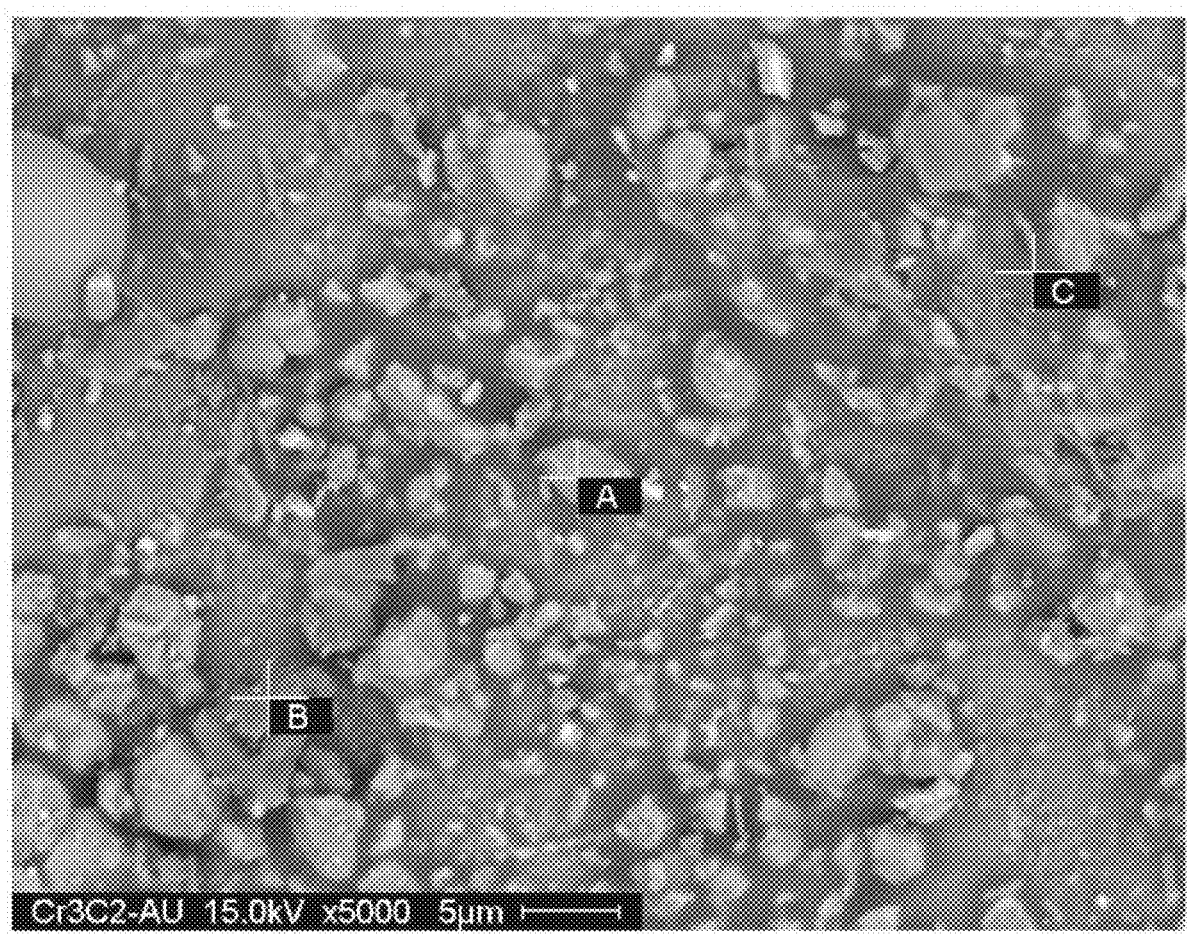
FIG. 18 includes an SEM image of a sample shaped abrasive particle.
Figure 19A:
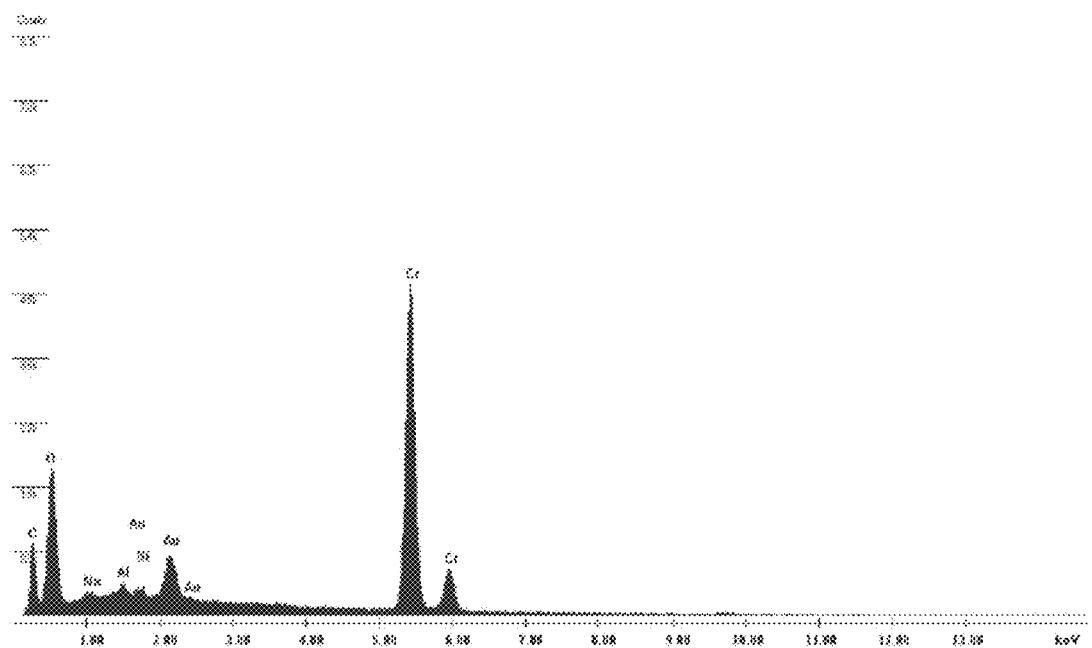
FIG. 19A includes an ED spectrum of the sample shaped abrasive particle shown in FIG. 18 taken at point A.
Figure 19B:
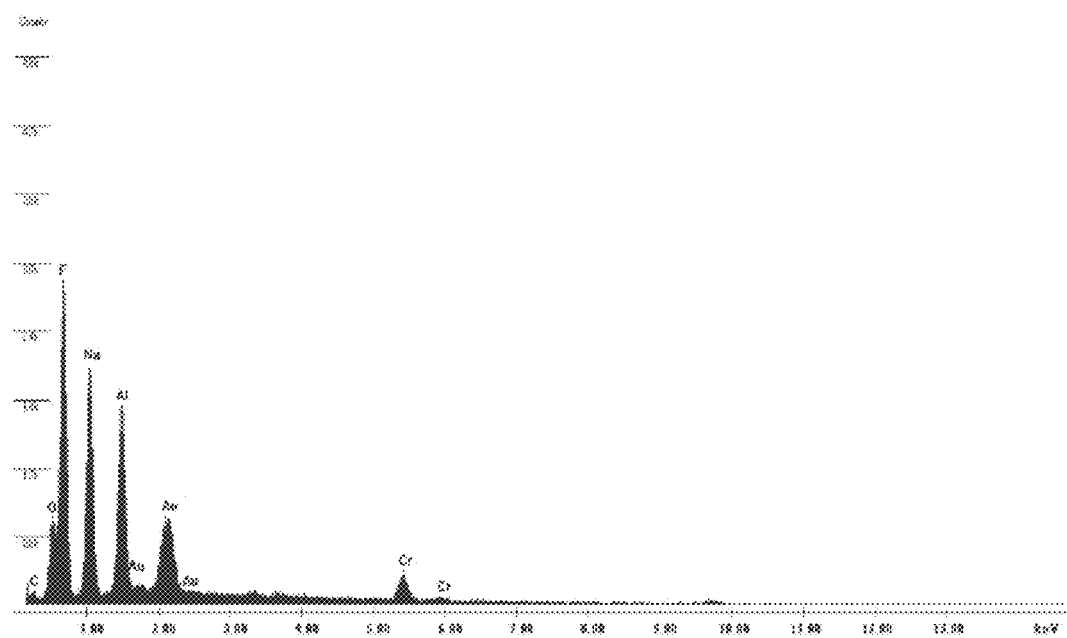
FIG. 19B includes an ED spectrum of the sample shaped abrasive particle shown in FIG. 18 taken at point B.
Figure 19C:
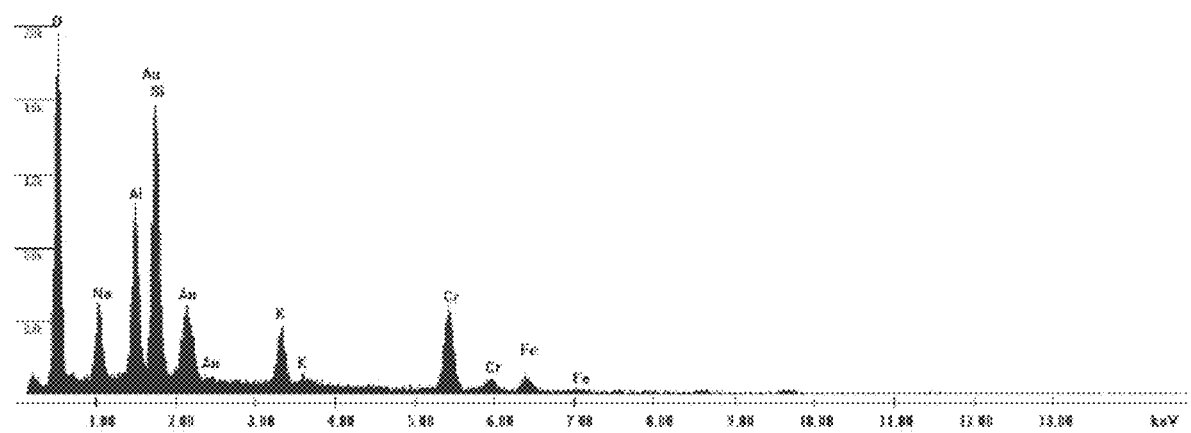
FIG. 19C includes an ED spectrum of the sample shaped abrasive particle shown in FIG. 18 taken at point C.

FIGS. 17A, 17B and 18 include SEM images of a sample shaped abrasive particle that includes a chromium carbide ($Cr_3C_2$) filer in the amorphous coating material. FIG. 19A includes an ED spectrum of the sample shaped abrasive particle shown in FIG. 18 taken at point A. FIG. 19B includes an ED spectrum of the sample shaped abrasive particle shown in FIG. 18 taken at point B. FIG. 19C includes an ED spectrum of the sample shaped abrasive particle shown in FIG. 18 taken at point C.

Figure 20:
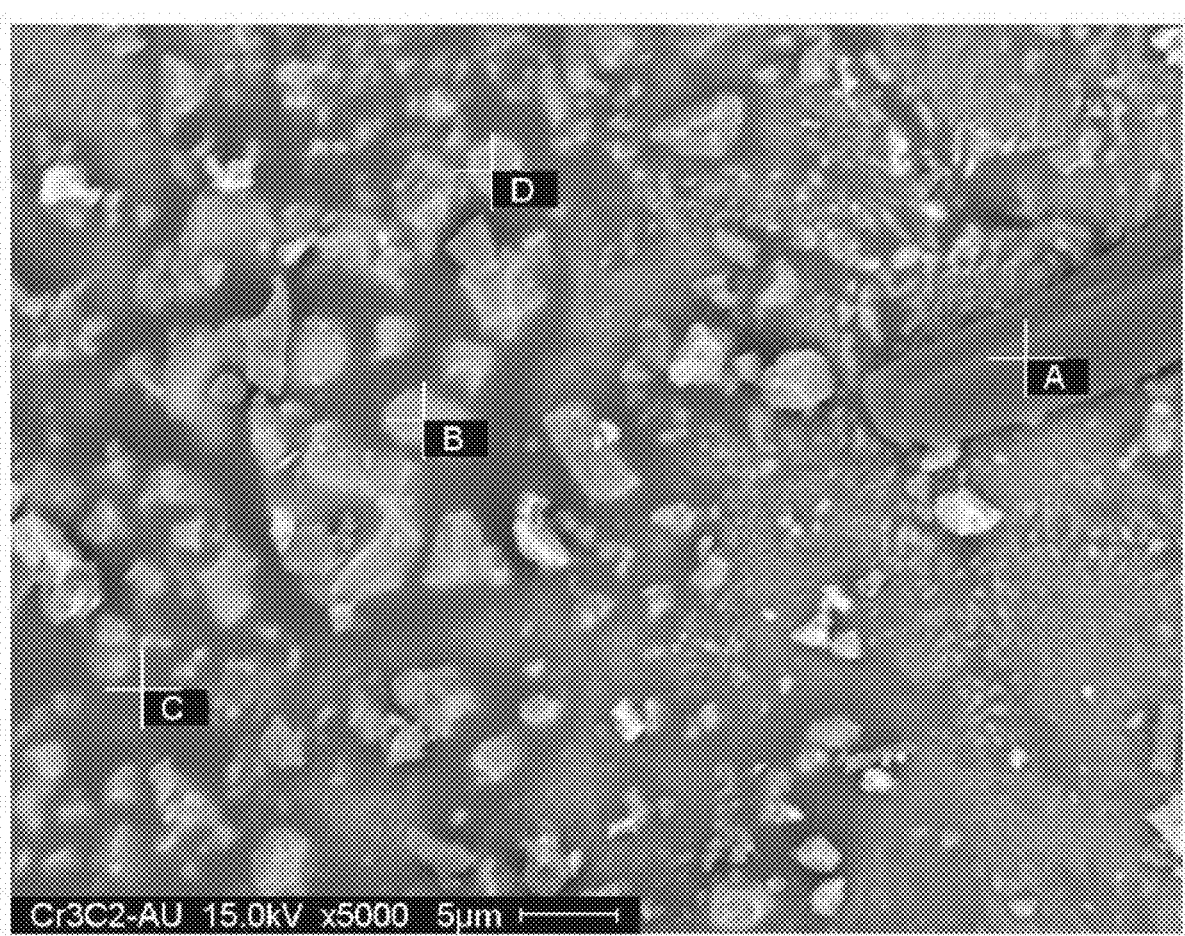
FIG. 20 includes an SEM image of a sample shaped abrasive particle.
Figure 21A:
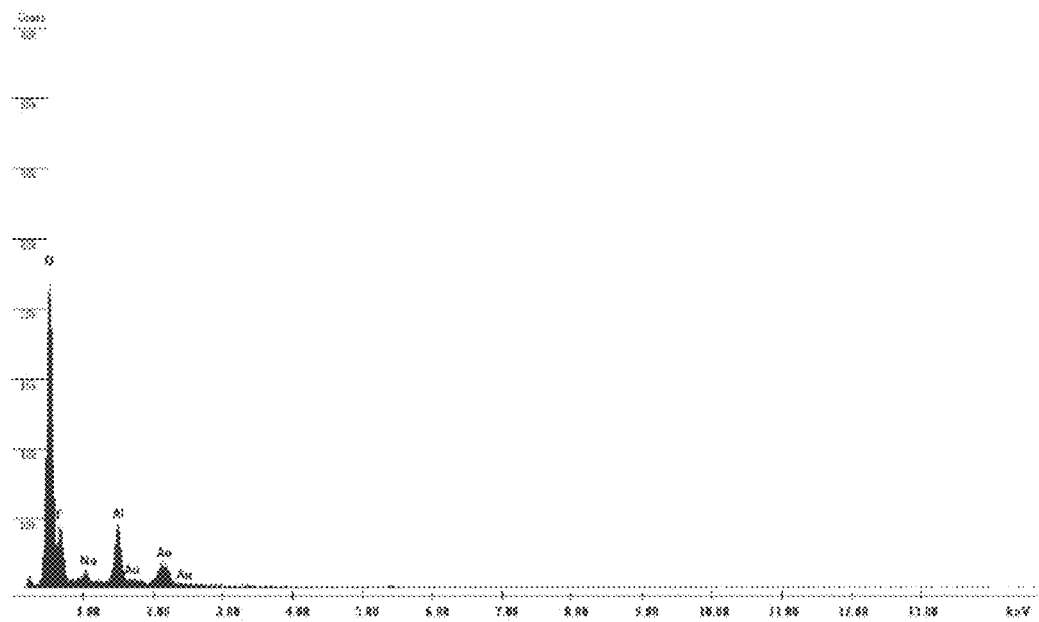
FIG. 21A includes an ED spectrum of the sample shaped abrasive particle shown in FIG. 20 taken at point A.
Figure 21B:
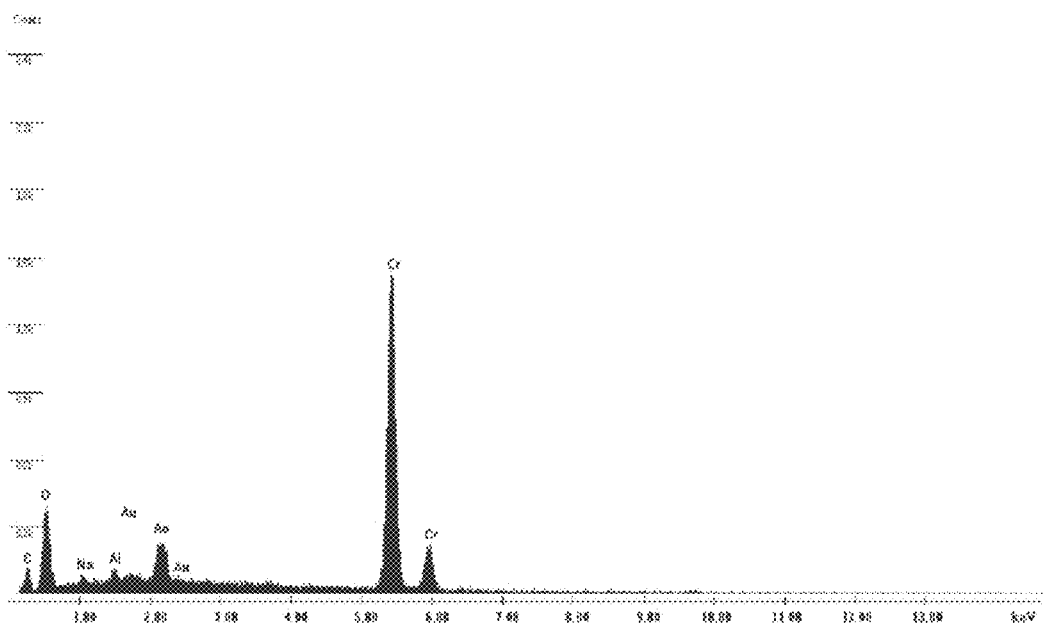
FIG. 21B includes an ED spectrum of the sample shaped abrasive particle shown in FIG. 20 taken at point B.
Figure 21C:
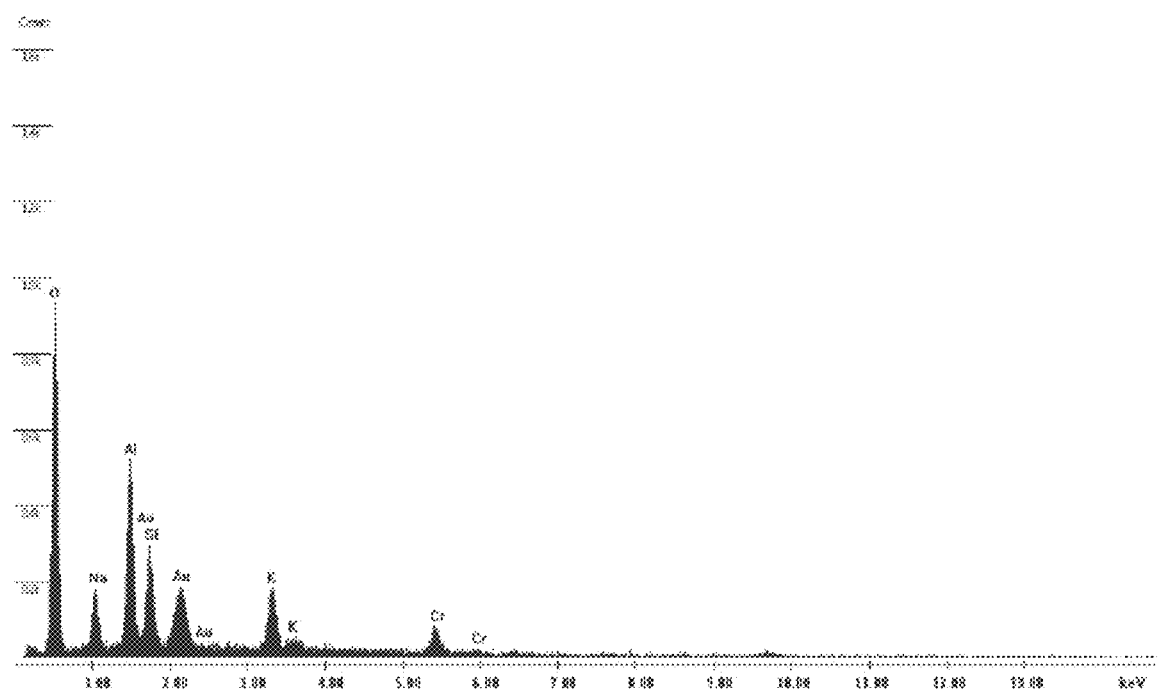
FIG. 21C includes an ED spectrum of the sample shaped abrasive particle shown in FIG. 20 taken at point C.
Figure 21D:
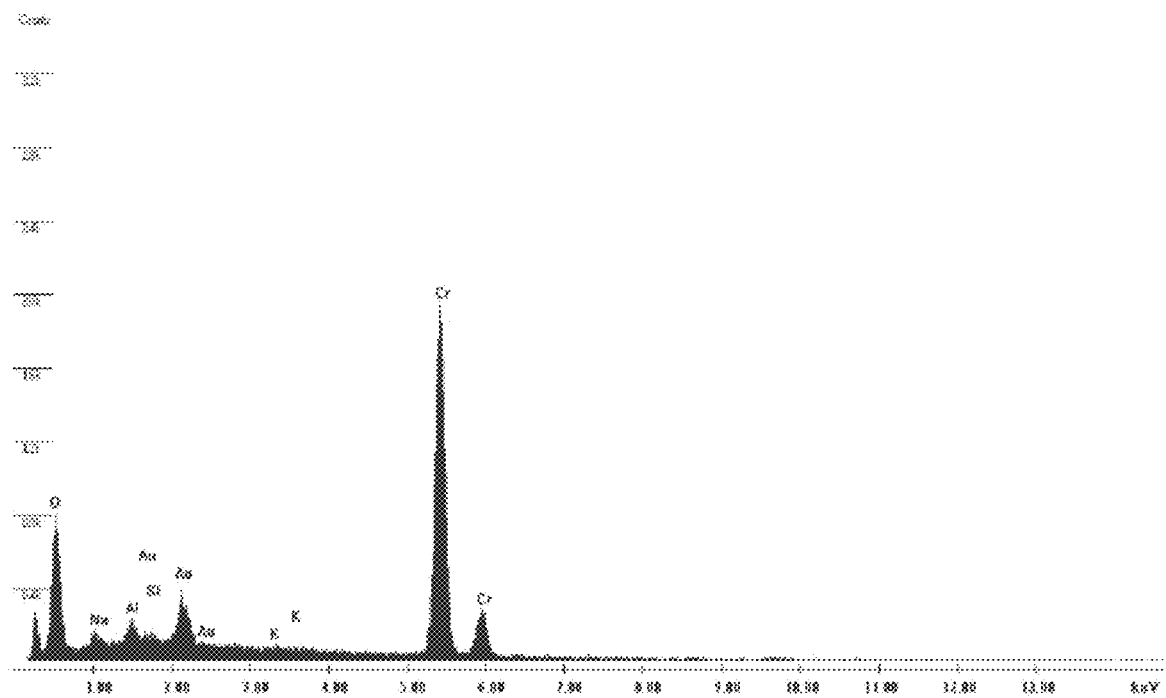
FIG. 21D includes an ED spectrum of the sample shaped abrasive particle shown in FIG. 20 taken at point D.

FIG. 20 includes an SEM image of a sample shaped abrasive particle that includes a chromium carbide ($Cr_3C_2$) filer in the amorphous coating material. FIG. 21A includes an ED spectrum of the sample shaped abrasive particle shown in FIG. 20 taken at point A. FIG. 21B includes an ED spectrum of the sample shaped abrasive particle shown in FIG. 20 taken at point B. FIG. 21C includes an ED spectrum of the sample shaped abrasive particle shown in FIG. 20 taken at point C. FIG. 21D includes an ED spectrum of the sample shaped abrasive particle shown in FIG. 20 taken at point D.

Figure 22A:
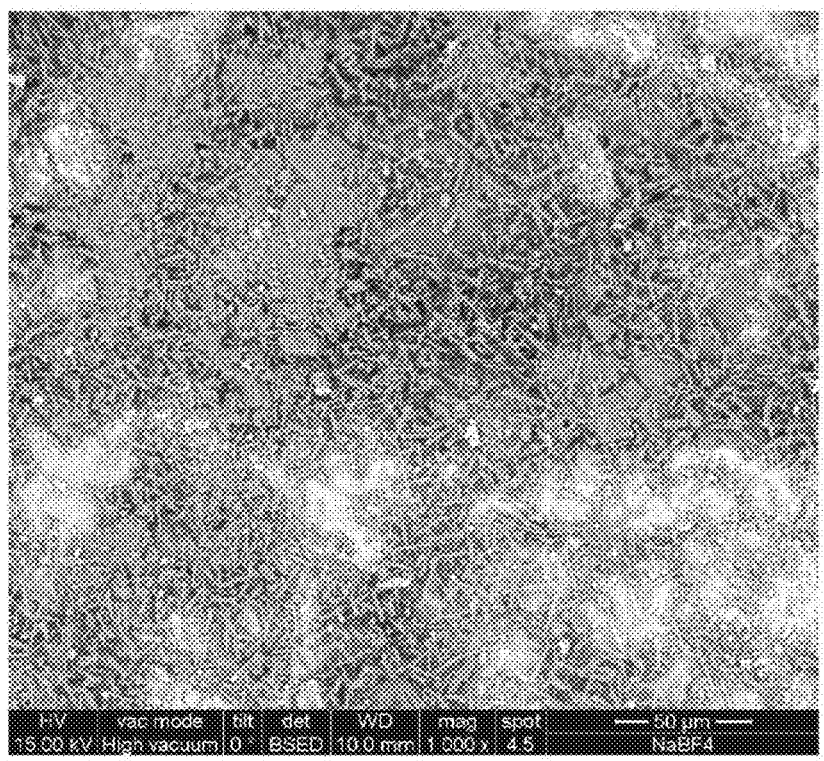
FIG. 22A includes an SEM image of a sample shaped abrasive particle.
Figure 22B:
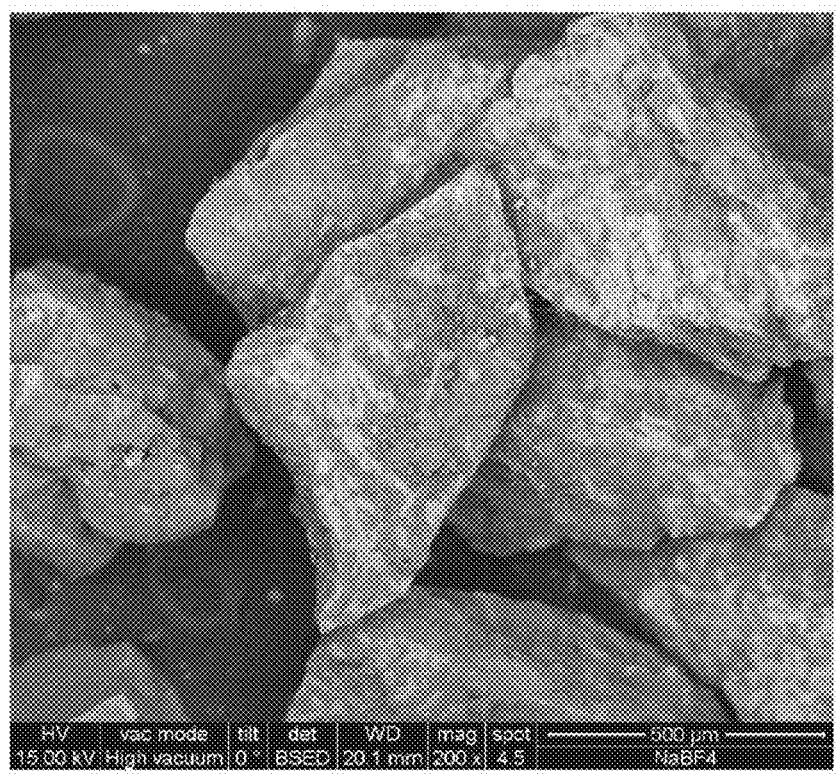
FIG. 22B includes an SEM image of a sample shaped abrasive particle.
Figure 23:
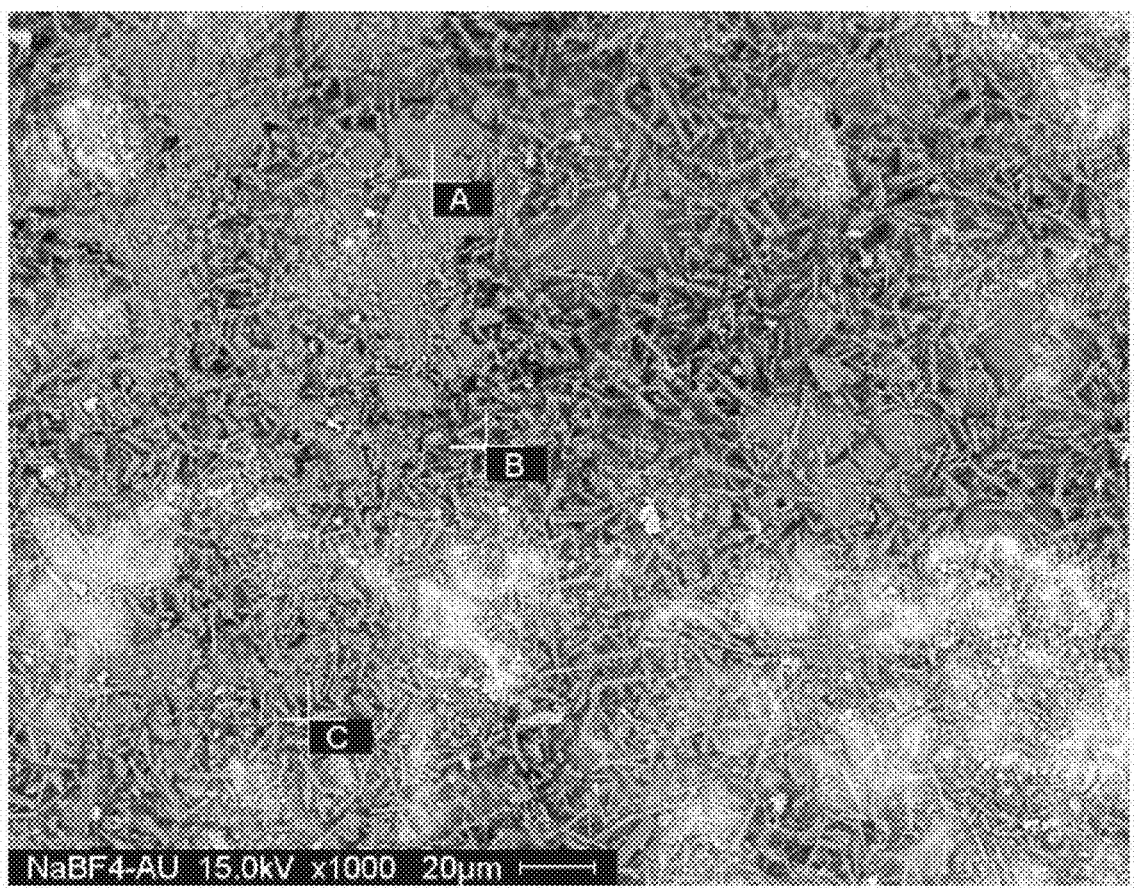
FIG. 23 includes an SEM image of a sample shaped abrasive particle.
Figure 24A:
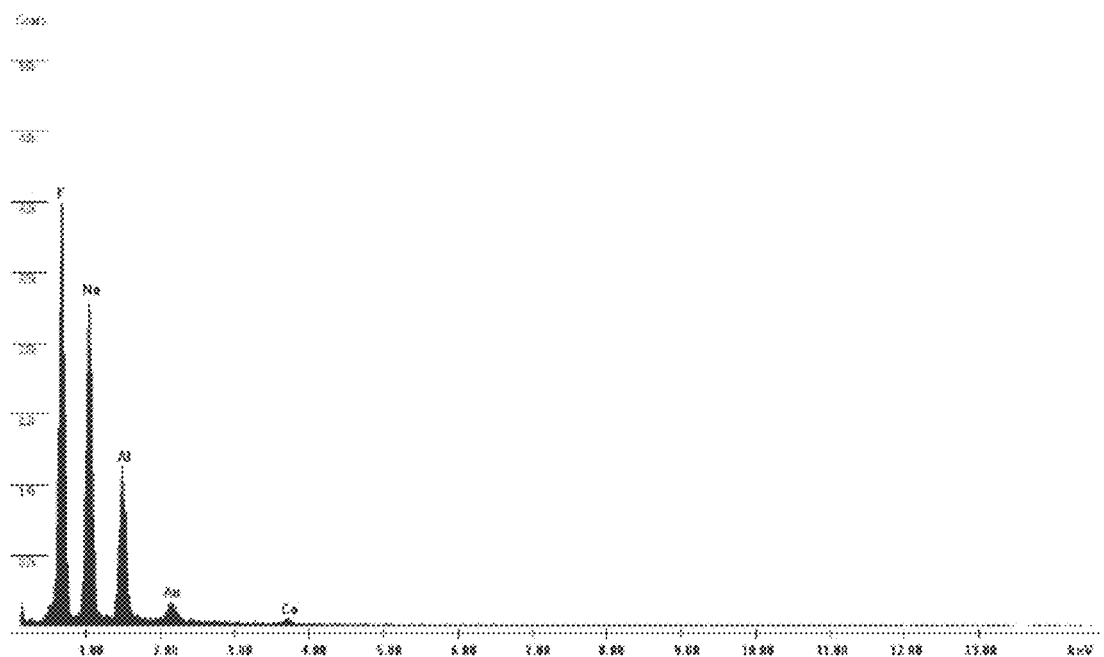
FIG. 24A includes an ED spectrum of the sample shaped abrasive particle shown in FIG. 23 taken at point A.
Figure 24B:
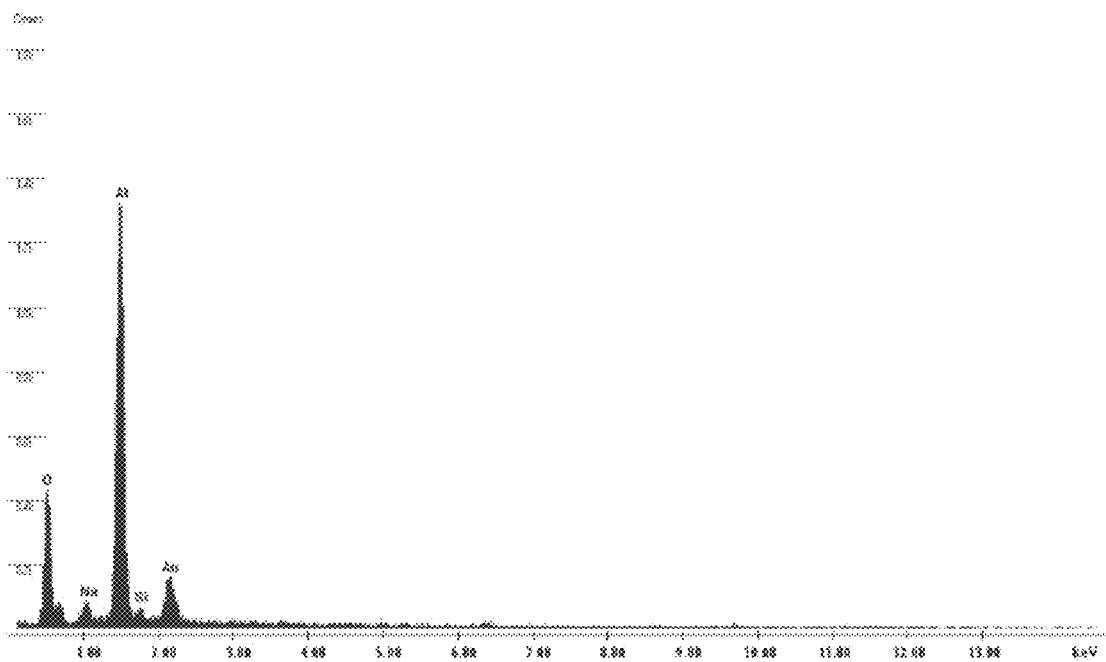
FIG. 24B includes an ED spectrum of the sample shaped abrasive particle shown in FIG. 23 taken at point B.
Figure 24C:
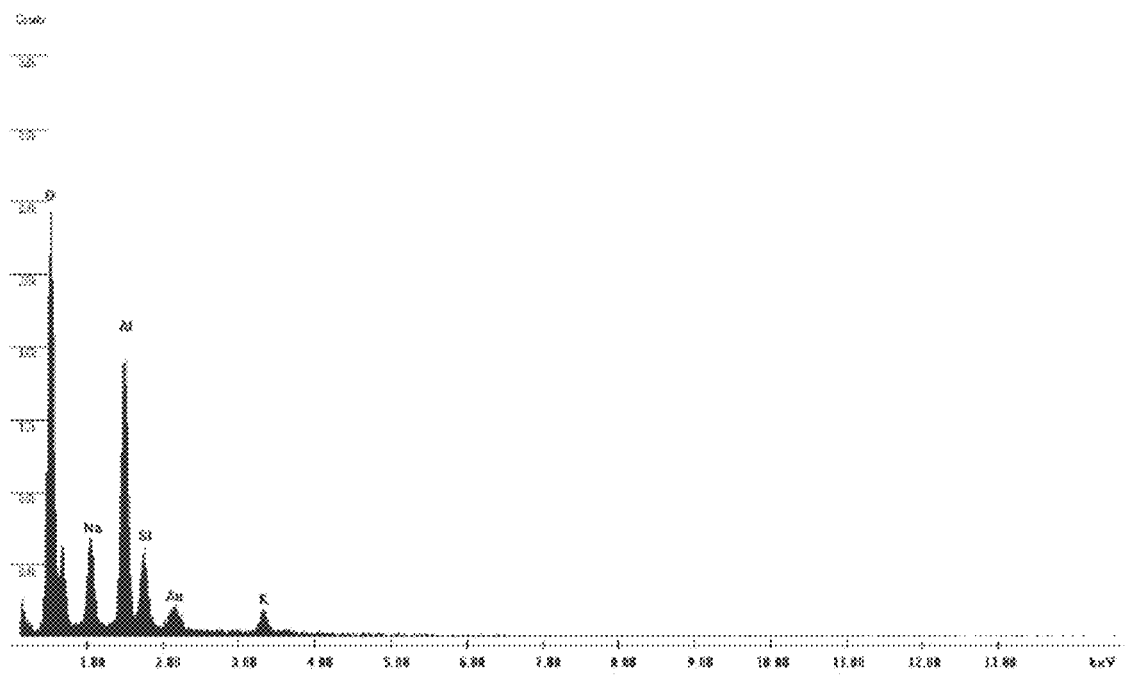
FIG. 24C includes an ED spectrum of the sample shaped abrasive particle shown in FIG. 23 taken at point C.

FIGS. 22A, 22B and 23 include SEM images of a sample shaped abrasive particle that includes a $NaBF_4$ filler in the amorphous coating material. FIG. 24A includes an ED spectrum of the sample shaped abrasive particle shown in FIG. 23 taken at point A. FIG. 24B includes an ED spectrum of the sample shaped abrasive particle shown in FIG. 23 taken at point B. FIG. 24C includes an ED spectrum of the sample shaped abrasive particle shown in FIG. 23 taken at point C.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

EMBODIMENTS

Embodiment 1

An abrasive particle comprising: a body, and a coating overlying the body; wherein the coating comprises an amorphous material, and at least one filler contained within the amorphous material.

Embodiment 2

The abrasive particle of embodiment 1, wherein the at least one filler comprises at least one phase distinct from the amorphous material.

Embodiment 3

The abrasive particle of embodiment 1, wherein the body comprises alumina and zirconia.

Embodiment 4

The abrasive particle of embodiment 1, wherein the body consists essentially of alumina and zirconia.

Embodiment 5

The abrasive particle of embodiment 1, wherein the body consists essentially of alumina.

Embodiment 6

The abrasive particle of embodiment 1, wherein the body comprises not greater than 75 wt. % alumina for the total weight of the body, or not greater than 70 wt. %, or not greater than 65 wt. %, or not greater than 60 wt. %, or not greater than 59 wt. %, or not greater than 58 wt. %, or not greater than 57 wt. %, or not greater than 56 wt. %, or not greater than 55 wt. %, or not greater than 54 wt. %, or not greater than 53 wt. %, or not greater than 52 wt. %, or not greater than 51 wt. %, or not greater than 50 wt. %, or not greater than 49 wt. %, or not greater than 48 wt. %, or not greater than 47 wt. %, or not greater than 46 wt. %, or not greater than 45 wt. %, or not greater than 44 wt. %, or not greater than 43 wt. %, or not greater than 42 wt. %, or not greater than 40 wt. %.

Embodiment 7

The abrasive particle of embodiment 1, wherein the body comprises at least 35 wt. % alumina for the total weight of the body, or at least 40 wt. %, or at least 42 wt. %, or at least 43 wt. %, or at least 44 wt. %, or at least 45 wt. %, or at least 46 wt. %, or at least 47 wt. %, or at least 48 wt. %, or at least 49 wt. %, or at least 50 wt. %, or at least 51 wt. %, or at least 52 wt. %, or at least 53 wt. %, or at least 54 wt. %, or at least 55 wt. %, or at least 56 wt. %, or at least 57 wt. %, or at least 58 wt. %, or at least 59 wt. %, or at least 60 wt. %, or at least 65 wt. %, or at least 70 wt. %.

Embodiment 8

The abrasive particle of embodiment 1, wherein the body comprises not greater than 60 wt. % zirconia for a total weight of the body, or not greater than 50 wt. %, or not greater than 49 wt. %, or not greater than 48 wt. %, or not greater than 47 wt. %, or not greater than 46 wt. %, or not greater than 45 wt. %, or not greater than 44 wt. %, or not greater than 43 wt. %, or not greater than 42 wt. %, or not greater than 41 wt. %, or not greater than 40 wt. %, or not greater than 39 wt. %, or not greater than 38 wt. %, or not greater than 37 wt. %, or not greater than 36 wt. %, or not greater than 35 wt. %, or not greater than 34 wt. %, or not greater than 33 wt. %, or not greater than 32 wt. %, or not greater than 31 wt. %, or not greater than 30 wt. %.

Embodiment 9

The abrasive particle of embodiment 1, wherein the body comprises at least 20 wt. % zirconia for a total weight of the body, or at least 30 wt. %, or at least 31 wt. %, or at least 32 wt. %, or at least 33 wt. %, or at least 34 wt. %, or at least 35 wt. %, or at least 36 wt. %, or at least 37 wt. %, or at least 38 wt. %, or at least 39 wt. %, or at least 40 wt. %, or at least 41 wt. %, or at least 42 wt. %, or at least 43 wt. %, or at least 44 wt. %, or at least 45 wt. %, or at least 46 wt. %, or at least 47 wt. %, or at least 48 wt. %, or at least 49 wt. %, or at least 50 wt. %.

Embodiment 10

The abrasive particle of embodiment 1, the body is substantially free of nitrides, borides, or any combination thereof.

Embodiment 11

The abrasive particle of embodiment 1, wherein the body is substantially free of metals, metal alloys, or any combination thereof.

Embodiment 12

The abrasive particle of embodiment 1, wherein the body comprises a median particle size (D50) of not greater than 40000 microns or not greater than 30000 microns or not greater than 20000 microns or not greater than 10000 microns or not greater than 5000 microns or not greater than 4000 microns or not greater than 3000 microns or not greater than 2000 microns or not greater than 1000 microns or not greater than 500 microns or not greater than 200 microns or not greater than 100 microns or not greater than 80 microns or not greater than 50 microns or not greater than 40 microns or not greater than 20 microns or not greater than 10 microns.

Embodiment 13

The abrasive particle of embodiment 1, wherein the body comprises a median particle size (D50) of at least 1 micron or at least 5 microns or at least 10 microns or at least 20 microns or at least 40 microns or at least 50 microns or at least 80 microns or at least 100 microns or at least 200 microns or at least 500 microns or at least 1000 microns or at least 2000 microns or at least 3000 microns or at least 4000 microns or at least 5000 microns or at least 10000 microns or at least 20000 microns or at least 30000 microns.

Embodiment 14

The abrasive particle of embodiment 1, wherein the coating covers not greater than 99% of the outer surface of the body or not greater than 98% or not greater than 97% or not greater than 96% or not greater than 95% or not greater than 90% or not greater than 85% or not greater than 80% or not greater than 75% or not greater than 70% or not greater than 65% or not greater than 60% or not greater than 55% or not greater than 50% or not greater than 45% or not greater than 40% or not greater than 35% or not greater than 30% or not greater than 25% or not greater than 20% or not greater than 15% or not greater than 10%.

Embodiment 15

The abrasive particle of embodiment 1, wherein the coating covers at least 1% of the outer surface body or at least 2% or at least 3% or at least 4% or at least 5% or at least 10% or at least 15% or at least 20% or at least 25% or at least 30% or at least 35% or at least 40% or at least 45% or at least 50% or at least 55% or at least 60% or at least 65% or at least 70% or at least 75% or at least 80% or at least 85% or at least 90% or at least 95% or at least 96% or at least 97% or at least 98% or at least 99%.

Embodiment 16

The abrasive particle of embodiment 1, wherein the coating covers a majority of the outer surface of the body.

Embodiment 17

The abrasive particle of embodiment 1, wherein the weight of the coating is not greater than 10 wt. % of the total weight of the abrasive particle including the body and the coating or not greater than 9 wt. % or not greater than 8 wt. % or not greater than 7 wt. % or not greater than 6 wt. % or not greater than 5 wt. % or not greater than 4 wt. % or not greater than 3 wt. % or not greater than 2 wt. % or not greater than 1.5 wt. % or not greater than 1 wt. %.

Embodiment 18

The abrasive particle of embodiment 1, wherein the weight of the coating is at least 0.1 wt. % of the weight of the abrasive particle including the body and the coating or at least 0.5 wt. % or at least 1 wt. % or at least 1.5 wt. % or at least 2 wt. % or at least 2.5 wt. % or at least 3 wt. % or at least 4 wt. % or at least 5 wt. % or at least 6 wt. % or at least 7 wt. % or at least 8 wt. % or at least 9 wt. %.

Embodiment 19

The abrasive particle of embodiment 1, wherein the coating has a softening point of not greater than 700° C. or not greater than 690° C. or not greater than 680° C. or not greater than 670° C. or not greater than 660° C. or not greater than 650° C. or not greater than 640° C. or not greater than 630° C. or not greater than 620° C. or not greater than 610° C. or not greater than 600° C. or not greater than 590° C. or not greater than 580° C. or not greater than 570° C. or not greater than 560° C. or not greater than 550° C. or not greater than 540° C. or not greater than 530° C. or not greater than 520° C. or not greater than 510° C. or not greater than 500° C. or not greater than 490° C. or not greater than 480° C. or not greater than 470° C. or not greater than 460° C. or not greater than 450° C.

Embodiment 20

The abrasive particle of embodiment 1, wherein the coating has a softening point of at least 400° C. or at least 410° C. or at least 420° C. or at least 430° C. or at least 440° C. or at least 450° C. or at least 460° C. or at least 470° C. or at least 480° C. or at least 490° C. or at least 500° C. or at least 510° C. or at least 520° C. or at least 530° C. or at least 540° C. or at least 550° C. or at least 560° C. or at least 570° C. or at least 580° C. or at least 590° C. or at least 600° C. or at least 610° C. or at least 620° C. or at least 630° C. or at least 640° C. or at least 650° C. or at least 660° C. or at least 670° C. or at least 680° C. or at least 690° C.

Embodiment 21

The abrasive particle of embodiment 1, wherein the coating has a softening point within a range of 400° C. to not greater than 700° C.

Embodiment 22

The abrasive particle of embodiment 1, wherein the coating comprises silicon.

Embodiment 23

The abrasive particle of embodiment 1, wherein the coating comprises boron.

Embodiment 24

The abrasive particle of embodiment 1, wherein the coating comprises zinc.

Embodiment 25

The abrasive particle of embodiment 1, wherein the coating comprises iron.

Embodiment 26

The abrasive particle of embodiment 1, wherein the coating comprises sodium.

Embodiment 27

The abrasive particle of embodiment 1, wherein the coating comprises potassium.

Embodiment 28

The abrasive particle of embodiment 1, wherein the coating comprises lithium.

Embodiment 29

The abrasive particle of embodiment 1, wherein the amorphous material comprises silicon.

Embodiment 30

The abrasive particle of embodiment 1, wherein the amorphous material comprises boron.

Embodiment 31

The abrasive particle of embodiment 1, wherein the amorphous material comprises zinc.

Embodiment 32

The abrasive particle of embodiment 1, wherein the amorphous material comprises iron.

Embodiment 33

The abrasive particle of embodiment 1, wherein the amorphous material comprises sodium.

Embodiment 34

The abrasive particle of embodiment 1, wherein the amorphous material comprises potassium.

Embodiment 35

The abrasive particle of embodiment 1, wherein the amorphous material comprises lithium.

Embodiment 36

The abrasive particle of embodiment 1, wherein the coating comprises a silicate.

Embodiment 37

The abrasive particle of embodiment 1, wherein the coating comprises a borosilicate.

Embodiment 38

The abrasive particle of embodiment 1, wherein the coating comprises zinc oxide.

Embodiment 39

The abrasive particle of embodiment 1, wherein the coating comprises iron oxide.

Embodiment 40

The abrasive particle of embodiment 1, wherein the coating comprises sodium oxide.

Embodiment 41

The abrasive particle of embodiment 1, wherein the coating comprises potassium oxide.

Embodiment 42

The abrasive particle of embodiment 1, wherein the coating comprises lithium oxide.

Embodiment 43

The abrasive particle of embodiment 1, wherein the coating is essentially free of at least one of aluminum oxide, cobalt oxide, magnesium oxide, tin oxide, calcium oxide, or any combination thereof.

Embodiment 44

The abrasive particle of embodiment 1, wherein the amorphous material comprises a silicate.

Embodiment 45

The abrasive particle of embodiment 1, wherein the amorphous material comprises a borosilicate.

Embodiment 46

The abrasive particle of embodiment 1, wherein the amorphous material comprises zinc oxide.

Embodiment 47

The abrasive particle of embodiment 1, wherein the amorphous material comprises iron oxide.

Embodiment 48

The abrasive particle of embodiment 1, wherein the amorphous material comprises sodium oxide.

Embodiment 49

The abrasive particle of embodiment 1, wherein the amorphous material comprises potassium oxide.

Embodiment 50

The abrasive particle of embodiment 1, wherein the amorphous material comprises lithium oxide.

Embodiment 51

The abrasive particle of embodiment 1, wherein the amorphous material is essentially free of at least one of aluminum oxide, cobalt oxide, magnesium oxide, tin oxide, calcium oxide, or any combination thereof.

Embodiment 52

The abrasive particle of embodiment 1, wherein the coating comprises no greater than 10 wt. % of any one of aluminum oxide, cobalt oxide, magnesium oxide, tin oxide, calcium oxide, zirconium oxide, barium oxide, or bismuth oxide, or no greater than 8 wt. %, or no greater than 6 wt. %, or no greater than 4 wt. %, or no greater than 2 wt. %, or no greater than 1 wt. %, or no greater than 0.5 wt. %.

Embodiment 53

The abrasive particle of embodiment 1, wherein the coating comprises no greater than 10 wt. % of any combination of aluminum oxide, cobalt oxide, magnesium oxide, tin oxide, calcium oxide, zirconium oxide, barium oxide, or bismuth oxide, or no greater than 8 wt. %, or no greater than 6 wt. %, or no greater than 4 wt. %, or no greater than 2 wt. %, or no greater than 1 wt. %, or no greater than 0.5 wt. %.

Embodiment 54

The abrasive particle of embodiment 1, wherein the coating is essentially free of at least one of aluminum oxide, cobalt oxide, magnesium oxide, tin oxide, calcium oxide, zirconium oxide, barium oxide, bismuth oxide, or any combination thereof.

Embodiment 55

The abrasive particle of embodiment 1, wherein the amorphous material comprises a weight ratio of boron to silicon [B:Si] of at least 0.8:1 or at least 0.9:1 or at least 1:1 or at least 1.1:1 or at least 1.2:1 or at least 1.3:1 or at least 1.4:1 or at least 1.5:1 or at least 1.6:1 or at least 1.7:1 or at least 1.8:1 or at least 1.9:1 or at least 2:1 or at least 2.2:1 or at least 2.4:1 or at least 2.5:1 or at least 2.6:1 or at least 2.8:1 or at least 3:1 or at least 3.5:1 or at least 4:1 or at least 5:1 or at least 6:1 or at least 7:1 or at least 8:1 or at least 9:1 or at least 10:1 or at least 12:1 or at least 15:1 or at least 20:1 or at least 30:1.

Embodiment 56

The abrasive particle of embodiment 1, wherein the amorphous material comprises a weight ratio of boron to silicon [B:Si] of not greater than 40:1 or not greater than 30:1 or not greater than 20:1 or not greater than 15:1 or not greater than 12:1 or not greater than 10:1 or not greater than 9:1 or not greater than 8:1 or not greater than 7:1 or not greater than 6:1 or not greater than 5:1 or not greater than 4:1 or not greater than 3.5:1 or not greater than 3:1 or not greater than 2.8:1 or not greater than 2.6:1 or not greater than 2.5:1 or not greater than 2.4:1 or not greater than 2.2:1 or not greater than 2:1 or not greater than 1.9:1 or not greater than 1.8:1 or not greater than 1.7:1 or not greater than 1.6:1 or not greater than 1.5:1 or not greater than 1.4:1 or not greater than 1.3:1 or not greater than 1.2:1 or not greater than 1.1:1 or not greater than 1:1 or not greater than 0.9:1.

Embodiment 57

The abrasive particle of embodiment 1, wherein the coating comprises a ratio (wt. %) of boron oxide to silicon dioxide [B2O3:SiO2] of at least 1:1 or at least 1.1:1 or at least 1.2:1 or at least 1.3:1 or at least 1.4:1 or at least 1.5:1 or at least 1.6:1 or at least 1.7:1 or at least 1.8:1 or at least 1.9:1 or at least 2:1 or at least 2.2:1 or at least 2.4:1 or at least 2.5:1 or at least 2.6:1 or at least 2.8:1 or at least 3:1 or at least 3.5:1 or at least 4:1 or at least 5:1.

Embodiment 58

The abrasive particle of embodiment 1, wherein the coating comprises a ratio (wt. %) of boron oxide to silicon dioxide [B2O3:SiO2] of not greater than 20:1 or not greater than 15:1 or not greater than 12:1 or not greater than 10:1 or not greater than 9:1 or not greater than 8:1 or not greater than 7:1 or not greater than 6:1 or not greater than 5:1 or not greater than 4:1 or not greater than 3.5:1 or not greater than 3:1 or not greater than 2.8:1 or not greater than 2.6:1 or not greater than 2.5:1 or not greater than 2.4:1 or not greater than 2.2:1 or not greater than 2:1 or not greater than 1.9:1 or not greater than 1.8:1 or not greater than 1.7:1 or not greater than 1.6:1 or not greater than 1.5:1 or not greater than 1.4:1 or not greater than 1.3:1 or not greater than 1.2:1.

Embodiment 59

The abrasive particle of embodiment 1, wherein the amorphous material comprises at least 7.5 wt. % silicon of a total weight of the amorphous material, or at least 8 wt. % or at least 8.5 wt. % or at least 9 wt. % or at least 9.5 wt. % or at least 10 wt. % or at least 10.5 wt. % or at least 11 wt. % or at least 11.5 wt. % or at least 12 wt. %.

Embodiment 60

The abrasive particle of embodiment 1, wherein the amorphous material comprises not greater than 15 wt. % silicon of a total weight of the amorphous material, or not greater than 14 wt. % or not greater than 12.5 wt. % or not greater than 12 wt. % or not greater than 11.5 wt. % or not greater than 11 wt. % or not greater than 10.5 wt. % or not greater than 10 wt. % or not greater than 9.5 wt. % or not greater than 9 wt. % or not greater than 8.5 wt. %.

Embodiment 61

The abrasive particle of embodiment 1, wherein the coating comprises at least 15 wt. % silicon dioxide for a total weight of the coating, or at least 16 wt. % or at least 17 wt. % or at least 18 wt. % or at least 19 wt. % or at least 20 wt. % or at least 21 wt. % or at least 22 wt. % or at least 23 wt. % or at least 24 wt. %.

Embodiment 62

The abrasive particle of embodiment 1, wherein the coating comprises not greater than 30 wt. % silicon dioxide for a total weight of the coating or not greater than 28 wt. % or not greater than 25 wt. % or not greater than 24 wt. % or not greater than 23 wt. % or not greater than 22 wt. % or not greater than 21 wt. % or not greater than 20 wt. % or not greater than 19 wt. % or not greater than 18 wt. % or not greater than 17 wt. %.

Embodiment 63

The abrasive particle of embodiment 1, wherein the amorphous material comprises at least 10 wt. % boron of a total weight of the amorphous material, or at least 10.7 wt. % or at least 11.4 wt. % or at least 12 wt. % or at least 12.7 wt. % or at least 13.4 wt. % or at least 14 wt. % or at least 14.7 wt. % or at least 15.4 wt. % or at least 16 wt. % or at least 16.7 wt. %.

Embodiment 64

The abrasive particle of embodiment 1, wherein the amorphous material comprises not greater than 20 wt. % boron of a total weight of the amorphous material or not greater than 19.4 wt. % or not greater than 18.7 wt. % or not greater than 18 wt. % or not greater than 17.4 wt. % or not greater than 16.7 wt. % or not greater than 16 wt. % or not greater than 15.4 wt. % or not greater than 14.7 wt. % or not greater than 14 wt. % or not greater than 13.3 wt. % or not greater than 12.7 wt. % or not greater than 12 wt. % or not greater than 11.4 wt. % or not greater than 10.7 wt. %.

Embodiment 65

The abrasive particle of embodiment 1, wherein the coating comprises at least 30 wt. % boron oxide for a total weight of the coating, or at least 32 wt. % or at least 34 wt. % or at least 36 wt. % or at least 38 wt. % or at least 40 wt. % or at least 42 wt. % or at least 44 wt. % or at least 46 wt. % or at least 48 wt. % or at least 50 wt. %.

Embodiment 66

The abrasive particle of embodiment 1, wherein the coating comprises not greater than 60 wt. % boron oxide for a total weight of the coating or not greater than 58 wt. % or not greater than 56 wt. % or not greater than 54 wt. % or not greater than 52 wt. % or not greater than 50 wt. % or not greater than 48 wt. % or not greater than 46 wt. % or not greater than 44 wt. % or not greater than 42 wt. % or not greater than 40 wt. % or not greater than 38 wt. % or not greater than 36 wt. % or not greater than 34 wt. % or not greater than 32 wt. %.

Embodiment 67

The abrasive particle of embodiment 1, wherein the amorphous material comprises alkali metals selected from the group consisting of sodium oxide, potassium oxide, lithium oxide, and a combination thereof.

Embodiment 68

The abrasive particle of embodiment 1, wherein the amorphous material comprises alkali oxides selected from the group consisting of sodium, potassium, lithium, and a combination thereof.

Embodiment 69

The abrasive particle of embodiment 1, wherein the amorphous material comprises a weight ratio of silicon to alkali metals [Si:X] of at least 1:1 or at least 1.1:1 or at least 1.2:1 or at least 1.3:1 or at least 1.4:1 or at least 1.5:1 or at least 1.6:1 or at least 1.7:1 or at least 1.8:1 or at least 1.9:1 or at least 2:1 or at least 2.2:1 or at least 2.4:1 or at least 2.5:1 or at least 2.6:1 or at least 2.8:1 or at least 3:1 or at least 3.5:1 or at least 4:1 or at least 5:1 or at least 6:1 or at least 7:1 or at least 8:1 or at least 9:1 or at least 10:1, wherein X is the total content of alkali metals in the amorphous material.

Embodiment 70

The abrasive particle of embodiment 1, wherein the amorphous material comprises a weight ratio of silicon to alkali metals [Si:X] of not greater than 11:1 or not greater than 10:1 or not greater than 9:1 or not greater than 8:1 or not greater than 7:1 or not greater than 6:1 or not greater than 5:1 or not greater than 4:1 or not greater than 3.5:1 or not greater than 3:1 or not greater than 2.8:1 or not greater than 2.6:1 or not greater than 2.5:1 or not greater than 2.4:1 or not greater than 2.2:1 or not greater than 2:1 or not greater than 1.9:1 or not greater than 1.8:1 or not greater than 1.7:1 or not greater than 1.6:1 or not greater than 1.5:1 or not greater than 1.4:1 or not greater than 1.3:1 or not greater than 1.2:1, wherein X is the total content of alkali metals in the amorphous material.

Embodiment 71

The abrasive particle of embodiment 1, wherein the coating comprises a ratio (wt. %) of silicon dioxide to alkali oxides [SiO2:X2O], wherein X2O is the total content of alkali oxides, and wherein the ratio of silicon dioxide to alkali oxides [SiO2:X2O] is at least 1:1 or at least 1.1:1 or at least 1.2:1 or at least 1.3:1 or at least 1.4:1 or at least 1.5:1 or at least 1.6:1 or at least 1.7:1 or at least 1.8:1 or at least 1.9:1 or at least 2:1 or at least 2.2:1 or at least 2.4:1 or at least 2.5:1 or at least 2.6:1 or at least 2.8:1 or at least 3:1 or at least 3.5:1 or at least 4:1 or at least 5:1.

Embodiment 72

The abrasive particle of embodiment 1, wherein the coating comprises a ratio (wt. %) of silicon dioxide to alkali oxides [SiO2:X2O], wherein X2O is the total content of alkali oxides, and wherein the ratio of silicon dioxide to alkali oxides [SiO2:X2O] is not greater than 6:1 or not greater than 5:1 or not greater than 4:1 or not greater than 3.5:1 or not greater than 3:1 or not greater than 2.8:1 or not greater than 2.6:1 or not greater than 2.5:1 or not greater than 2.4:1 or not greater than 2.2:1 or not greater than 2:1 or not greater than 1.9:1 or not greater than 1.8:1 or not greater than 1.7:1 or not greater than 1.6:1 or not greater than 1.5:1 or not greater than 1.4:1 or not greater than 1.3:1 or not greater than 1.2:1.

Embodiment 73

The abrasive particle of embodiment 1, wherein the amorphous material comprises a total content of alkali metals of at least 4 wt. % of a total weight of the amorphous material or at least 4.5 wt. % or at least 5 wt. % or at least 5.5 wt. % or at least 6 wt. % or at least 6.5 wt. % or at least 7 wt. % or at least 7.5 wt. % or at least 8 wt. % or at least 8.5 wt. % or at least 9 wt. % or at least 9.5 wt. % or at least 10 wt. % or at least 10.5 wt. % or at least 11 wt. % or at least 11.5 wt. % or at least 12 wt. %.

Embodiment 74

The abrasive particle of embodiment 1, wherein the amorphous material comprises a total content of alkali metals not greater than 13 wt. % of a total weight of the amorphous material or not greater than 12 wt. % or not greater than 11.5 wt. % or not greater than 11 wt. % or not greater than 10.5 wt. % or not greater than 10 wt. % or not greater than 9.5 wt. % or not greater than 9 wt. % or not greater than 8.5 wt. % or not greater than 8 wt. % or not greater than 7.5 wt. % or not greater than 7 wt. % or not greater than 6.5 wt. % or not greater than 6 wt. % or not greater than 5.5 wt. % or not greater than 5 wt. %.

Embodiment 75

The abrasive particle of embodiment 1, wherein the coating comprises a total content of alkali oxides of at least 8 wt. % for a total weight of the coating or at least 9 wt. % or at least 10 wt. % or at least 11 wt. % or at least 12 wt. % or at least 13 wt. % or at least 14 wt. % or at least 15 wt. % or at least 16 wt. %.

Embodiment 76

The abrasive particle of embodiment 1, wherein the coating comprises a total content of alkali oxides not greater than 20 wt. % for a total weight of the coating or not greater than 19 wt. % or not greater than 18 wt. % or not greater than 17 wt. % or not greater than 16 wt. % or not greater than 15 wt. % or not greater than 14 wt. % or not greater than 13 wt. % or not greater than 12 wt. % or not greater than 11 wt. % or not greater than 10 wt. %.

Embodiment 77

The abrasive particle of embodiment 1, wherein a content (wt. %) of sodium is greater than a content (wt. %) of lithium, and wherein a content (wt. %) of potassium is greater than a content (wt. %) of lithium.

Embodiment 78

The abrasive particle of embodiment 1, wherein a content (wt. %) of sodium oxide is greater than a content (wt. %) of lithium oxide, and wherein a content (wt. %) of potassium oxide is greater than a content (wt. %) of lithium oxide.

Embodiment 79

The abrasive particle of embodiment 1, wherein the amorphous material comprises a content (wt. %) of sodium of at least 1 wt. % of a total weight of the coating or at least 1.5 wt. % or at least 2 wt. % or at least 2.5 wt. % or at least 3 wt. % or at least 3.5 wt. % or at least 4 wt. % or at least 4.5 wt. % or at least 5 wt. %.

Embodiment 80

The abrasive particle of embodiment 1, wherein the amorphous material comprises a content (wt. %) of sodium of not greater than 6 wt. % of a total weight of the amorphous material or not greater than 5 wt. % or not greater than 4.5 wt. % or not greater than 4 wt. % or not greater than 3.5 wt. % or not greater than 3 wt. % or not greater than 2.5 wt. % or not greater than 2 wt. %.

Embodiment 81

The abrasive particle of embodiment 1, wherein the amorphous material comprises a content (wt. %) of sodium oxide of at least 2 wt. % of a total weight of the coating or at least 3 wt. % or at least 4 wt. % or at least 5 wt. % or at least 6 wt. %.

Embodiment 82

The abrasive particle of embodiment 1, wherein the amorphous material comprises a content (wt. %) of sodium oxide of not greater than 10 wt. % of a total weight of the amorphous material or not greater than 9 wt. % or not greater than 8 wt. % or not greater than 7 wt. % or not greater than 6 wt. % or not greater than 5 wt. % or not greater than 4 wt. %.

Embodiment 83

The abrasive particle of embodiment 1, wherein the amorphous material comprises a content (wt. %) of potassium of at least 1.5 wt. % of a total weight of the coating or at least 2 wt. % or at least 2.5 wt. % or at least 3 wt. % or at least 3.5 wt. % or at least 4 wt. % or at least 4.5 wt. % or at least 5 wt. % or at least 5.5 wt. %.

Embodiment 84

The abrasive particle of embodiment 1, wherein the amorphous material comprises a content (wt. %) of potassium of not greater than 7 wt. % of a total weight of the coating or not greater than 6 wt. % or not greater than 5.5 wt. % or not greater than 5 wt. % or not greater than 4.5 wt. % or not greater than 4 wt. % or not greater than 3.5 wt. % or not greater than 3 wt. %.

Embodiment 85

The abrasive particle of embodiment 1, wherein the amorphous material comprises a content (wt. %) of potassium oxide of at least 2 wt. % of a total weight of the coating or at least 3 wt. % or at least 4 wt. % or at least 5 wt. % or at least 6 wt. %.

Embodiment 86

The abrasive particle of embodiment 1, wherein the amorphous material comprises a content (wt. %) of potassium oxide of not greater than 10 wt. % of a total weight of the coating or not greater than 9 wt. % or not greater than 8 wt. % or not greater than 7 wt. % or not greater than 6 wt. % or not greater than 5 wt. % or not greater than 4 wt. %.

Embodiment 87

The abrasive particle of embodiment 1, wherein the amorphous material comprises a content (wt. %) of lithium of at least 0.3 wt. % of a total weight of the amorphous material or at least 0.7 wt. % or at least 1 wt. % or at least 1.1 wt. % or at least 1.2 wt. % or at least 1.3 wt. % or at least 1.4 wt. % or at least 1.5 wt. % or at least 1.6 wt. % or at least 1.7 wt. % or at least 1.8 wt. % or at least 1.9 wt. % or at least 2 wt. % or at least 2.1 wt. % or at least 2.2 wt. % or at least 2.3 wt. % or at least 2.4 wt. % or at least 2.5 wt. %.

Embodiment 88

The abrasive particle of embodiment 1, wherein the amorphous material comprises a content (wt. %) of lithium of not greater than 3 wt. % of a total weight of the amorphous material or not greater than 2.5 wt. % or not greater than 2.4 wt. % or not greater than 2.3 wt. % or not greater than 2.2 wt. % or not greater than 2.1 wt. % or not greater than 2 wt. % or not greater than 1.9 wt. % or not greater than 1.8 wt. % or not greater than 1.7 wt. % or not greater than 1.6 wt. % or not greater than 1.5 wt. % or not greater than 1.4 wt. % or not greater than 1.3 wt. % or not greater than 1.2 wt. % or not greater than 1.1 wt. % or not greater than 1 wt. % or not greater than 0.7 wt. %.

Embodiment 89

The abrasive particle of embodiment 1, wherein the amorphous material comprises a content (wt. %) of lithium oxide of at least 1 wt. % of a total weight of the amorphous material or at least 2 wt. % or at least 3 wt. % or at least 4 wt. %.

Embodiment 90

The abrasive particle of embodiment 1, wherein the amorphous material comprises a content (wt. %) of lithium oxide of not greater than 6 wt. % of a total weight of the amorphous material or not greater than 5 wt. % or not greater than 4 wt. % or not greater than 3 wt. % or not greater than 2 wt. %.

Embodiment 91

The abrasive particle of embodiment 1, wherein the amorphous material comprises a weight ratio of silicon to iron [Si:Fe] of at least 0.7:1 or at least 0.9:1 or at least 1.1:1 or at least 1.2:1 or at least 1.3:1 or at least 1.4:1 or at least 1.5:1 or at least 1.6:1 or at least 1.7:1 or at least 1.8:1 or at least 1.9:1 or at least 2:1 or at least 2.2:1 or at least 2.4:1 or at least 2.5:1 or at least 2.6:1 or at least 2.8:1 or at least 3:1 or at least 3.5:1 or at least 4:1 or at least 5:1.

Embodiment 92

The abrasive particle of embodiment 1, wherein the amorphous material comprises a ratio (wt. %) of silicon to iron [Si:Fe] of not greater than 6:1 or not greater than 5:1 or not greater than 4:1 or not greater than 3.5:1 or not greater than 3:1 or not greater than 2.8:1 or not greater than 2.6:1 or not greater than 2.5:1 or not greater than 2.4:1 or not greater than 2.2:1 or not greater than 2:1 or not greater than 1.9:1 or not greater than 1.8:1 or not greater than 1.7:1 or not greater than 1.6:1 or not greater than 1.5:1 or not greater than 1.4:1 or not greater than 1.3:1 or not greater than 1.2:1 or not greater than 1.1:1 or not greater than 1:1 or not greater than 0.9:1.

Embodiment 93

The abrasive particle of embodiment 1, wherein the amorphous material comprises a weight ratio of silicon oxide to iron oxide [SiO2:Fe2O3] of at least 1:1 or at least 1.1:1 or at least 1.2:1 or at least 1.3:1 or at least 1.4:1 or at least 1.5:1 or at least 1.6:1 or at least 1.7:1 or at least 1.8:1 or at least 1.9:1 or at least 2:1 or at least 2.2:1 or at least 2.4:1 or at least 2.5:1 or at least 2.6:1 or at least 2.8:1 or at least 3:1 or at least 3.5:1 or at least 4:1 or at least 5:1.

Embodiment 94

The abrasive particle of embodiment 1, wherein the amorphous material comprises a ratio (wt. %) of silicon oxide to iron oxide [SiO2:Fe2O3] of not greater than 6:1 or not greater than 5:1 or not greater than 4:1 or not greater than 3.5:1 or not greater than 3:1 or not greater than 2.8:1 or not greater than 2.6:1 or not greater than 2.5:1 or not greater than 2.4:1 or not greater than 2.2:1 or not greater than 2:1 or not greater than 1.9:1 or not greater than 1.8:1 or not greater than 1.7:1 or not greater than 1.6:1 or not greater than 1.5:1 or not greater than 1.4:1 or not greater than 1.3:1 or not greater than 1.2:1.

Embodiment 95

The abrasive particle of embodiment 1, wherein the amorphous material comprises a content (wt. %) of iron of at least 5.3 wt. % of a total weight of the amorphous material or at least 6 wt. % or at least 6.7 wt. % or at least 7.4 wt. % or at least 8 wt. % or at least 8.7 wt. %.

Embodiment 96

The abrasive particle of embodiment 1, wherein the amorphous material comprises a content (wt. %) of iron of not greater than 12 wt. % of a total weight of the amorphous material or not greater than 10 wt. % or not greater than 9.3 wt. % or not greater than 8.7 wt. % or not greater than 8 wt. % or not greater than 7.3 wt. % or not greater than 6.7 wt. % or not greater than 6 wt. %.

Embodiment 97

The abrasive particle of embodiment 1, wherein the amorphous material comprises a content (wt. %) of iron oxide of at least 8 wt. % of a total weight of the amorphous material or at least 9 wt. % or at least 10 wt. % or at least 11 wt. % or at least 12 wt. % or at least 13 wt. %.

Embodiment 98

The abrasive particle of embodiment 1, wherein the amorphous material comprises a content (wt. %) of iron oxide of not greater than 18 wt. % of a total weight of the amorphous material or not greater than 15 wt. % or not greater than 14 wt. % or not greater than 13 wt. % or not greater than 12 wt. % or not greater than 11 wt. % or not greater than 10 wt. % or not greater than 9 wt. %.

Embodiment 99

The abrasive particle of embodiment 1, wherein the amorphous material comprises a content (wt. %) of zinc of at least 1 wt. % of a total weight of the amorphous material or at least 2 wt. % or at least 3 wt. % or at least 4 wt. % or at least 5 wt. % or at least 6 wt. %.

Embodiment 100

The abrasive particle of embodiment 1, wherein the amorphous material comprises a content (wt. %) of zinc of not greater than 10 wt. % of a total weight of the amorphous material or not greater than 9 wt. % or not greater than 8 wt. % or not greater than 7 wt. % or not greater than 6 wt. % or not greater than 5 wt. % or not greater than 4 wt. % or not greater than 3 wt. %.

Embodiment 101

The abrasive particle of embodiment 1, wherein the amorphous material comprises a content (wt. %) of zinc oxide of at least 1 wt. % of a total weight of the amorphous material or at least 2 wt. % or at least 3 wt. % or at least 4 wt. % or at least 5 wt. % or at least 6 wt. %.

Embodiment 102

The abrasive particle of embodiment 1, wherein the amorphous material comprises a content (wt. %) of zinc oxide of not greater than 10 wt. % of a total weight of the amorphous material or not greater than 9 wt. % or not greater than 8 wt. % or not greater than 7 wt. % or not greater than 6 wt. % or not greater than 5 wt. % or not greater than 4 wt. % or not greater than 3 wt. %.

Embodiment 103

The abrasive particle of embodiment 1, wherein the at least one filler comprises a particulate material.

Embodiment 104

The abrasive particle of embodiment 1, wherein the at least one filler comprises a polycrystalline particulate material.

Embodiment 105

The abrasive particle of embodiment 1, wherein the at least one filler comprises at least one compound selected from the group consisting of oxides, fluorides, sulfides, phosphates, carbonates, halogenides, or any combination thereof.

Embodiment 106

The abrasive particle of embodiment 1, wherein the at least one filler comprises at least one oxide compound including at least one element selected from the group consisting of Fe; Co, Ti, Ni, V, Cr, Sb, Mn, Zn, or any combination thereof.

Embodiment 107

The abrasive particle of embodiment 1, wherein the filler comprises at least one compound selected from the group consisting of $Fe_2O$, $Na_3AlF_6$, $Co_2O_3$, $TiO_2$, $Ni_2O_3$, $Cr_2O_3$ or any combination thereof.

Embodiment 108

The abrasive particle of embodiment 1, wherein the at least one filler comprises a fluorine-containing compound selected from the group consisting of $Na_3AlF_6$, $KNaAlF_6$, $NaSiF_6$, $KSiF_6$, $NaBF_4$, $K_3AlF_6$, $KBF_4$, $Cr_3C_2$, $CaF_2$ or any combination thereof.

Embodiment 109

The abrasive particle of embodiment 1, wherein the at least one filler comprises at least one halogen-containing compound including at least one element selected from the group consisting of Na, K, Mg, Ca, Al, Mn, Cu, Sn, Fe, Ti, Sb, Zn, Bi or any combination thereof.

Embodiment 110

The abrasive particle of embodiment 1, wherein the at least one filler includes a first filler contained in the coating and a second filler contained in the coating, wherein the first filler and second filler, wherein the first filler and second filler are each discrete compounds selected from the group consisting of oxides, fluorides, sulfides, phosphates, carbonates, halogenides, or any combination thereof.

Embodiment 111

The abrasive particle of embodiment 110, wherein the first filler comprises $Fe_2O_3$ and the second filler comprises $Na_3AlF_6$.

Embodiment 112

The abrasive particle of embodiment 1, wherein the at least one filler comprises a particulate material having a median particle size less than a median particle size (D50) of the body.

Embodiment 113

The abrasive particle of embodiment 1, wherein the at least one filler comprises a particulate material having a median particle size (D50) of not greater than 50 microns or not greater than 40 microns or not greater than 30 microns or not greater than 25 microns or not greater than 20 microns or not greater than 15 microns or not greater than 10 microns or not greater than 8 microns or not greater than 6 microns or not greater than 4 microns or not greater than 2 microns or not greater than 1.5 microns or not greater than 1 micron or not greater than 0.8 microns or not greater than 0.6 microns or not greater than 0.4 microns or not greater than 0.2 microns or not greater than 0.1 microns.

Embodiment 114

The abrasive particle of embodiment 1, wherein the at least one filler comprises a particulate material having a median particle size (D50) of at least 0.1 microns or at least 0.2 microns or at least 0.4 microns or at least 0.6 microns or at least 0.8 microns or at least 1 micron or at least 1.5 microns or at least 2 microns or at least 4 microns or at least 6 microns or at least 8 microns or at least 10 microns or at least 15 microns or at least 20 microns or at least 25 microns or at least 30 microns or at least 40 microns.

Embodiment 115

The abrasive particle of embodiment 1, wherein the at least one filler is present in an amount of not greater than 10 wt. % of a total weight of the abrasive particle or not greater than 8 wt. % or not greater than 6 wt. % or not greater than 4 wt. % or not greater than 3 wt. % or not greater than 2.5 wt. % or not greater than 2 wt. % or not greater than 1.5% or not greater than 1 wt. % or not greater than 0.8 wt. % or not greater than 0.5 wt. % or not greater than 0.2 wt. % or not greater than 0.1 wt. %.

Embodiment 116

The abrasive particle of embodiment 1, wherein the at least one filler is present in an amount of at least 0.01 wt. % of a total weight of the abrasive particle or at least 0.1 wt. % or at least 0.2 wt. % or at least 0.5 wt. % or at least 0.8 wt. % or at least 1 wt. % or at least 1.5 wt. % or at least 2 wt. % or at least 2.5 wt. % or at least 3 wt. % or at least 4 wt. % or at least 6 wt. % or at least 8 wt. %.

Embodiment 117

A fixed abrasive article comprising abrasive particles including the abrasive particle of embodiment 1.

Embodiment 118

A method of forming a fixed abrasive article, the method comprising: creating a mixture including a particulate material having a body, a coating precursor material, and at least one filler; forming a coated particulate material from the mixture, the coated particulate material including a coating comprising an amorphous material overlying the body and the at least one filler contained in the coating.

Embodiment 119

The method of embodiment 118, wherein forming includes heating the mixture to a temperature of at least 400° C. and not greater than 700° C.

Embodiment 120

The method of embodiment 118, wherein the mixture further comprises at least one binder selected from the group consisting of wax, polyvinyl acetate (PVA), polyethylene glycol (PEG), water or any combination thereof.

Embodiment 121

The abrasive particle of embodiment 1, wherein the abrasive particle comprises chromium (Cr) from the coating in an amount of at least about 0.2 wt. % for a total weight of the abrasive particle or at least about 0.5 wt. % or at least about 0.7 wt. % or at least about 1.0 wt. % or at least about 1.3 wt. % or at least about 1.5 wt. % or at least about 1.7 wt. % or at least about 2.0 wt. % or at least about 2.3 wt. %.

Embodiment 122

The abrasive particle of embodiment 1, wherein the abrasive particle comprises chromium (Cr) from the coating in an amount not greater than about 20 wt. % for a total weight of the abrasive particle or not greater than about 15 wt. % or not greater than about 10 wt. % or not greater than about 7.0 wt. % or not greater than about 5.0 wt. % or not greater than about 2.5 wt. % or not greater than about 2.4 wt. % or not greater than about 2.3 wt. % or not greater than about 2.2 wt. % or not greater than about 2.1 wt. %.

Embodiment 123

The abrasive particle of embodiment 1, wherein the abrasive particle comprises sodium (Na) from the coating in an amount of at least about 0.01 wt. % for a total weight of the abrasive particle, or at least about 0.05 wt. % or at least about 0.1 wt. % or at least about 0.2 wt. % or at least about 0.3 wt. % or at least about 0.4 wt. % or at least about 0.5 wt. %.

Embodiment 124

The abrasive particle of embodiment 1, wherein the abrasive particle comprises sodium (Na) from the coating in an amount of not greater than about 6.0 wt. % for a total weight of the abrasive particle, or not greater than about 5.0 wt. % or not greater than about 4.0 wt. % or not greater than about 3.0 wt. % or not greater than about 2.0 wt. % or not greater than about 1.0 wt. % or not greater than about 0.9 wt. % or not greater than about 0.8 wt. % or not greater than about 0.7 wt. %.

Embodiment 125

The abrasive particle of embodiment 1, wherein the abrasive particle comprises calcium (Ca) from the coating in an amount of at least about 0.05 wt. % for a total weight of the abrasive particle, or at least about 0.1 wt. % or at least about 0.2 wt. % or at least about 0.3 wt. % or at least about 0.4 wt. % or at least about 0.5 wt. %.

Embodiment 126

The abrasive particle of embodiment 1, wherein the abrasive particle comprises calcium (Ca) from the coating in an amount of not greater than about 7.0 wt. % for a total weight of the abrasive particle, or not greater than about 6.0 wt. % 1.1 wt. % or not greater than about 5.0 wt. % or not greater than about 4.0 wt. % or not greater than about 3.0 wt. % or not greater than about 2.0 wt. % or not greater than about 1.0 wt. % or not greater than about 0.9 wt. %.

Embodiment 127

The abrasive particle of embodiment 1, wherein the abrasive particle comprises potassium (K) from the coating in an amount of at least about 0.01 wt. % for a total weight of the abrasive particle, or at least about 0.05 wt. % or at least about 0.1 wt. % or at least about 0.2 wt. % or at least about 0.3 wt. % or at least about 0.4 wt. % or at least about 0.5 wt. %.

Embodiment 128

The abrasive particle of embodiment 1, wherein the abrasive particle comprises potassium (K) from the coating in an amount of not greater than about 10 wt. % for a total weight of the abrasive particle, or not greater than about 9.0 wt. % or not greater than about 8.0 wt. % or not greater than about 7.0 wt. % or not greater than about 6.0 wt. % or not greater than about 5.0 wt. % or not greater than about 4.0 wt. % or not greater than about 3.0 wt. % or not greater than about 2.0 wt. % or not greater than about 1.0 wt. % or not greater than about 0.9 wt. %.

Embodiment 129

The abrasive particle of embodiment 1, wherein the abrasive particle comprises chromium (Cr) from the coating in a weight percent ratio to the weight of the abrasive particle of at least about 0.2 or at least about 0.5 or at least about 0.7 or at least about 1.0 or at least about 1.3 or at least about 1.5 or at least about 1.7 or at least about 2.0 or at least about 2.3.

Embodiment 130

The abrasive particle of embodiment 1, wherein the abrasive particle comprises chromium (Cr) from the coating in a weight percent ratio to the weight of the abrasive particle of not greater than about 20 or not greater than about 15 or not greater than about 10 or not greater than about 7.0 or not greater than about 5.0 or not greater than about 2.5 or not greater than about 2.4 or not greater than about 2.3 or not greater than about 2.2 or not greater than about 2.1.

Embodiment 131

The abrasive particle of embodiment 1, wherein the abrasive particle comprises sodium (Na) from the in a weight percent ratio to the weight of the abrasive particle of at least about 0.01 or at least about 0.05 or at least about 0.1 or at least about 0.2 or at least about 0.3 or at least about 0.4 or at least about 0.5.

Embodiment 132

The abrasive particle of embodiment 1, wherein the abrasive particle comprises sodium (Na) from the coating in a weight percent ratio to the weight of the abrasive particle of not greater than about 6.0 or not greater than about 5.0 or not greater than about 4.0 or not greater than about 3.0 or not greater than about 2.0 or not greater than about 1.0 or not greater than about 0.9 or not greater than about 0.8 or not greater than about 0.7.

Embodiment 133

The abrasive particle of embodiment 1, wherein the abrasive particle comprises calcium (Ca) from the coating in a weight percent ratio to the weight of the abrasive particle of at least about 0.05 or at least about 0.1 or at least about 0.2 or at least about 0.3 or at least about 0.4 or at least about 0.5.

Embodiment 134

The abrasive particle of embodiment 1, wherein the abrasive particle comprises calcium (Ca) from the coating in a weight percent ratio to the weight of the abrasive particle of not greater than about 7.0 or not greater than about 6.0 or not greater than about 5.0 or not greater than about 4.0 or not greater than about 3.0 or not greater than about 2.0 or not greater than about 1.0 or not greater than about 0.9.

Embodiment 135

The abrasive particle of embodiment 1, wherein the abrasive particle comprises potassium (K) from the coating in a weight percent ratio to the weight of the abrasive particle of at least about 0.01 or at least about 0.05 or at least about 0.1 or at least about 0.2 or at least about 0.3 or at least about 0.4 or at least about 0.5.

Embodiment 136

The abrasive particle of embodiment 1, wherein the abrasive particle comprises potassium (K) from the coating in a weight percent ratio to the weight of the abrasive particle of not greater than about 10 or not greater than about 9.0 or not greater than about 8.0 or not greater than about 7.0 or not greater than about 6.0 or not greater than about 5.0 or not greater than about 4.0 or not greater than about 3.0 or not greater than about 2.0 or not greater than about 1.0 or not greater than about 0.9.

The above-disclosed subject matter is to be considered illustrative, and not restrictive, and the appended items are intended to cover all such modifications, enhancements, and other embodiments, which fall within the true scope of the present invention. Thus, to the maximum extent allowed by law, the scope of the present invention is to be determined by the broadest permissible interpretation of the following items and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description, with each claim standing on its own as defining separately claimed subject matter.

What is claimed is:

1. An abrasive particle comprising:
a body, and
a coating overlying the body;
wherein the coating comprises
an amorphous material, and
at least one filler distinct from the amorphous material and contained within the amorphous material;
wherein the body has a median particle size of at least about 50 microns and not greater than about 4000 microns;
wherein the filler has a median particle size of at least 0.1 microns and not greater than 10 microns;
wherein the filler comprises a particulate material;
wherein the filler comprises at least one oxide compound comprising at least one element selected from the group consisting of Fe, Co, Ti, Ni, V, Vr, Sb, Mn, Zn, and combinations thereof;
wherein the weight of the coating is at least 0.1 wt. % and not greater than 10 wt. % of the total weight of the abrasive particle including the body and the coating; and
wherein the filler comprises a polycrystalline particulate material.

2. The abrasive particle of claim 1, wherein the body comprises alumina and zirconia.

3. The abrasive particle of claim 1, wherein the body consists essentially of alumina and zirconia.

4. The abrasive particle of claim 1, wherein the body consists essentially of alumina.

5. The abrasive particle of claim 1, wherein the body comprises at least 35 wt. % alumina and not greater than 75 wt. % alumina for the total weight of the body.

6. The abrasive particle of claim 1, wherein the body comprises at least 20 wt. % zirconia and not greater than 60 wt. % zirconia for a total weight of the body.

7. The abrasive particle of claim 1, the body is substantially free of nitrides, borides, or any combination thereof.

8. The abrasive particle of claim 1, wherein the body is substantially free of metals, metal alloys, or any combination thereof.

9. The abrasive particle of claim 1, wherein the coating covers at least 1% and not greater than 99% of the outer surface of the body.

10. The abrasive particle of claim 1, wherein the coating has a softening point within a range of 400° C. to not greater than 700° C.

11. The abrasive particle of claim 1, wherein the coating comprises silicon, boron, zinc, iron, sodium, potassium, lithium or combinations thereof.

12. The abrasive particle of claim 1, wherein the coating comprises boron.

13. The abrasive particle of claim 1, wherein the abrasive particle comprises chromium (Cr) from the coating in an amount of at least about 0.2 wt. % and not greater than about 20 wt. % for a total weight of the abrasive particle.

14. The abrasive particle of claim 1, wherein the abrasive particle comprises sodium (Na) from the coating in an amount of at least about 0.01 wt. % and not greater than about 6.0 wt. % for a total weight of the abrasive particle.

15. The abrasive particle of claim 1, wherein the abrasive particle comprises calcium (Ca) from the coating in an amount of at least about 0.05 wt. % and not greater than about 7.0 wt. % for a total weight of the abrasive particle.

16. The abrasive particle of claim 1, wherein the abrasive particle comprises potassium (K) from the coating in an amount of at least about 0.01 wt. % and not greater than about 10 wt. % for a total weight of the abrasive particle.

* * * * *